United States Patent [19]

Supernaw-Issen et al.

[11] Patent Number: 5,778,225
[45] Date of Patent: Jul. 7, 1998

[54] METHOD AND APPARATUS FOR SHARING OBJECTS AMONG A PLURALITY OF PROCESSES

[76] Inventors: Daniel Aaron Supernaw-Issen, 3500 Greystone Dr., #213, Austin, Tex. 78731; Michael David McCartney, 9417 Great Hills Trail, #1081, Austin, Tex. 78759

[21] Appl. No.: 599,054

[22] Filed: Feb. 9, 1996

[51] Int. Cl.$^6$ .................................................. G06F 9/46
[52] U.S. Cl. ....................... 395/673; 395/674; 364/228.7; 364/230.1; 364/281.8
[58] Field of Search ............................ 395/673, 674, 395/228.7, 230.1, 281.8

[56] References Cited

U.S. PATENT DOCUMENTS

| 4,104,718 | 8/1978 | Poublan et al. | 395/608 |
| 4,847,755 | 7/1989 | Morrison et al. | 395/379 |
| 5,379,428 | 1/1995 | Belo | 395/673 |

OTHER PUBLICATIONS

*Object–Oriented Technology: A Manager's Guide*, Taylor, D., Addison–Wesley (1994), Chapter 13: Acyclic Graphs, pp. 297–311.

"Recovery in Distributed Systems Using Optimistic Message Logging and Checkpointing," Johnson, David B., et al., Rice COMP TR88–68, Dept. of Computer Science, Rice Univ., May 1988, pp. 1–15.

"Detecting Causal Relationships in Distributed Computations: In Search of the Holy Grail," Schwarz, R., et al., SFB124–15/92, Dept. of Computer Science, Univ. of Kaiserslautern, Fed. Rep. of Germany, Dec. 1992, pp. 1–40.

"Causal Memory," Ahamad, M., et al., GIT–ICS–91/41, School of Information and Computer Science, Georgia Inst. of Technology, Sep. 1991, pp. 1–30.

*Modern Operating Systems*, Tanenbaum, Andrew S., Prentice–Hall (1992), Chapter 6: Deadlocks, pp. 240–262.

*Primary Examiner*—Kevin A. Kriess
*Assistant Examiner*—Majid A. Banankhah
*Attorney, Agent, or Firm*—Stanford & Bennett

[57] ABSTRACT

A method and apparatus for sharing objects among a group of processes may be accomplished by using a causal time stamp for each conveyance of information between the members of the group of processes. When a process receives an object request from another process, wherein the object request includes identity of the process requesting the objects, a request causal time stamp, and the objects being requested, the receiving process updates its current causal time stamp and grant causal list. The grant causal list includes a prioritized listing of outstanding object requests, where prioritization is based on a predetermined total ordering procedure. Once the grant causal list has been updated, the receiving process determines whether it has one of the needed objects being requested and the request is of a higher priority. If so, the receiving process generates a grant message for the requesting process. When the requesting process receives the object grant, it updates its possession set of objects to include the newly received objects and updates its current causal time stamp. If the possession set includes all of the needed objects, the requesting process then utilizes the objects as needed.

21 Claims, 46 Drawing Sheets

HANDLE READ-ONLY OBJECTS

AT TIME T0 FOR A PARTICULAR PATIENT RECORD

470 — DOCTOR'S OFFICE (DO)

| CCTS | GCL | GSN | NEED SET | POSSSESSION SET |
|---|---|---|---|---|
| [PH1<br>DO1<br>HA1<br>PR1] | [0]<br>480 | [4]<br>482 | [0]<br>484 | [O9,O10,O14-O16]<br>486 |

478

472 — PHARMACY (PH)

| CCTS | GCL | GSN | NEED SET | POSSSESSION SET |
|---|---|---|---|---|
| [PH1<br>DO1<br>HA1<br>PR1] | [0]<br>500 | [4]<br>502 | [0]<br>504 | [O18]<br>496 |

488

474 — HOSPITAL ADMINISTRATION (HA)

| CCTS | GCL | GSN | NEED SET | POSSSESSION SET |
|---|---|---|---|---|
| [PH1<br>DO1<br>HA1<br>PR1] | [0]<br>480 | [4]<br>482 | [0]<br>484 | [O1-O8]<br>506 |

498

476 — PATIENT ROOM (PR)

| CCTS | GCL | GSN | NEED SET | POSSSESSION SET |
|---|---|---|---|---|
| [PH1<br>DO1<br>HA1<br>PR1] | [0]<br>510 | [4]<br>512 | [0]<br>514 | [O11-O13]<br>516 |

AT SOME LATER TIME TN FOR THE PARTICULAR PATIENT, SCHEDULE SURGERY
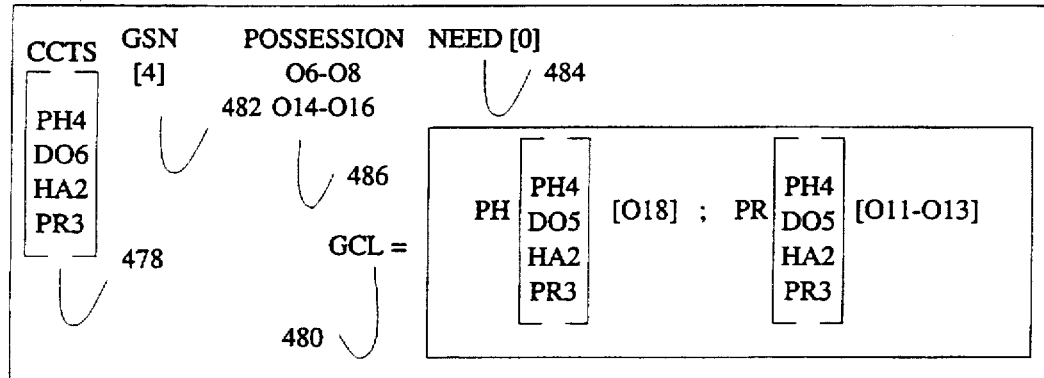
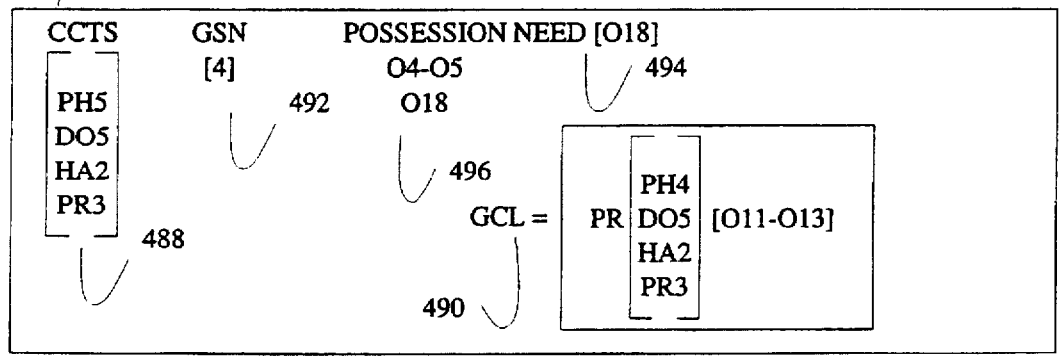
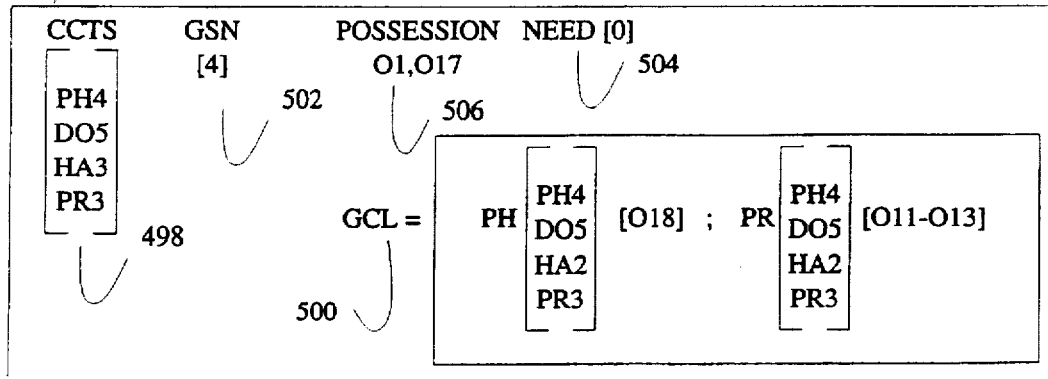
FIG. 29

AT A FURTHER TIME Tx FOR THE PARTICULAR PATIENT;
PATIENTS SURGERY ; ADD OPERATING ROOM

DO: ACQUIRING NEEDED OBJECTS — 470

| CCTS | GSN | POSSESSION | NEED 484 |
|---|---|---|---|
| [PH6<br>DO8<br>HA5<br>PR4]<br>478 | [4] 484<br>GCL = DO<br>480 | 486 [X]<br>[PH6<br>DO8<br>HA5<br>PR4] [O1,O8-O10] ; PR | [O1,O8-O10]<br>[PH6<br>DO8<br>HA5<br>PR4] [O11-O13] |

PH: NO OUTSTANDING REQUESTS — 472

| CCTS | GSN | POSSESSION | NEED 494 |
|---|---|---|---|
| [PH6<br>DO8<br>HA5<br>PR4]<br>488 | [4] 492<br>GCL = DO<br>490 | 496 [X]<br>[PH6<br>DO8<br>HA5<br>PR4] [O1,O8-O10] ; PR | [0]<br>[PH6<br>DO8<br>HA5<br>PR4] [O11-O13] |

HA: NO OUTSTANDING REQUESTS — 474

| CCTS | GSN | POSSESSION | NEED 504 |
|---|---|---|---|
| [PH6<br>DO8<br>HA5<br>PR4]<br>498 | [4] 502<br>GCL = DO<br>500 | 506 [X]<br>[PH6<br>DO8<br>HA5<br>PR4] [O1,O8-O10] ; PR | [0]<br>[PH6<br>DO8<br>HA5<br>PR4] [O11-O13] |

PR: ACQUIRING NEEDED OBJECTS — 476

| CCTS | GSN | POSSESSION | NEED 514 |
|---|---|---|---|
| [PH6<br>DO8<br>HA5<br>PR4]<br>508 | [4] 512<br>GCL = DO<br>510 | 516 [X]<br>[PH6<br>DO8<br>HA5<br>PR4] [O1,O8-O10] ; PR | [O11-O13]<br>[PH6<br>DO8<br>HA5<br>PR4] [O11-O13] |

FIG. 39

PATIENT'S SURGERY COMPLETE, REMOVE OPERATING ROOM FROM GROUP

EACH MEMBER HAS SAME CURRENT CAUSAL TIMSTAMP &
GRANT CAUSAL LIST, WHICH ARE

632 CCTS    634 GCL $$\begin{bmatrix} PH6 \\ DO9 \\ HA5 \\ PR5 \\ OR2 \end{bmatrix}$$    PH $\begin{bmatrix} PH6 \\ DO9 \\ HA5 \\ PR5 \\ OR2 \end{bmatrix}$ [O18]

636 POSSESSION SETS

DO = [O8]
PH = [0]
HA = [O16-O18]
PR = [0]
OR = [O1-O7,O9-O13]

638 NEED SETS

METHOD AND APPARATUS FOR SHARING OBJECTS AMONG A PLURALITY OF PROCESSES

TECHNICAL FIELD OF THE INVENTION

This invention relates generally to distributed computing systems and, more particularly, to a method and apparatus for sharing objects among processes within the distributed computing system.

BACKGROUND OF THE INVENTION

As is known, a distributed computing system includes a plurality of processing entities interoperably coupled to form a single system. In the system, the processing entities, which may be computers or processors within a computer, support a plurality of programs that, at one time or another, communicate with each other to share objects. Communication between the programs, where an independent program may also be referred to as a process, is dependent upon where the programs reside. For example, if both programs reside in the same processing entity, the processing entity accommodates the communication. If, however, the programs are supported by different processing entities, communication may occur over a network connection.

Sharing of objects allows processes to work together on a larger task. Such objects may be any type of digital information, ranging from a single number, letter, alphanumeric character or symbol, to a complex data file, or executable file. In addition, an object may be defined as a portion of memory having an associated distinguishing component such as an identification code.

To accommodate the sharing of objects, a distributed system must include some mechanism for allocating the shared objects among the plurality of processes. One such mechanism is a centralized server which "holds" all the objects for the distributed computing system. Upon a request from a process, the centralized server allocates the requested objects to the processing entity supporting the process. Once the process is finished with the requested object(s), it returns the object(s) to the centralized server for reallocation.

An alternative to using centralized servers is a distributed allocation method. A distributed allocation method allows the processing entities to administer the allocation of objects themselves. The objects are distributed throughout the system by the processing entities, where a processing entity is only responsible for allocation of objects it possesses.

Regardless of whether a centralized server or a distributed allocation method is used, current distributed systems have several operational limitations. Such limitations include deadlock, failure to guarantee fair progress, data inconsistencies, and, for the centralized server system, a system bottleneck.

A system bottleneck arises when the centralized server receives more object requests than it can efficiently handle. When this occurs, processes have to wait for the centralized server to respond to their request. Depending on the speed of the centralized server and the number of outstanding requests, the waiting period may be of an unacceptable duration.

A solution to a system bottleneck partitions the objects into particular sets, or distinct subsets, wherein each particular subset is assigned to a separate centralized server. Thus, when an object request is for an object within a particular subset, the centralized server assigned to that particular subset handles the requests. In essence, the centralized server function is being distributed among several centralized servers.

In a distributed system that includes either a centralized server or a distributed allocation method, deadlock may result when object contention occurs. Object contention occurs when two or more processing entities are requesting sets of objects wherein the sets have common objects. A simple example of deadlock is when two processing entities each desire the same two objects while each of the processing entities has one of the two objects allocated to it. Thus, the two processes will wait forever for the other process to release its object.

Deadlock may be avoided by giving particular processing entities higher priority than other processing entities such that the higher priority processing entities have their requests handled first. But such a solution does not guarantee progress. For example, when a higher priority processing entity and lower priority processing entity are requesting the same object, the higher priority processing entity will be allocated the object first. If, after the higher priority processing entity has released the object, it requests the same object again before the lower priority processing entity has been allocated the object, the higher priority processing entity will again be granted the object. If this pattern continues, the request of the lower priority processing entity will not be satisfied. Thus, progress for the lower priority processing entity is not guaranteed.

Data inconsistencies arise in a distributed system that allows copies of objects to be made and subsequently allocated. A data inconsistency results when two or more processing entities have copies of an object and one of the processing entities modifies that object. In this case, when another processing entity requests the object, it might get the modified object or the unmodified object. When this occurs, the requesting processing entity cannot be sure if it is using the correct object, thereby creating a system error.

Therefore, a need exists for a method and apparatus for use in a distributed computing system that insures fair progress of object allocation such that deadlock, system bottle necking, and data inconsistencies are avoided.

BRIEF DESCRIPTION OF THE DRAWINGS

FIG. 6 illustrates a logic diagram which further describes step 208 of FIG. 4;

FIGS. 22–28 illustrate an example of sharing objects among the processing entities of FIG. 21;

FIGS. 29–38 illustrate another example of sharing data among the processing entities of FIG. 21;

FIGS. 39–43 illustrate yet another example of adding a processing entity to the group of processes; and FIGS. 44–46 illustrate a process for removing a processing entity from the group of processing entities.

DETAILED DESCRIPTION OF A PREFERRED EMBODIMENT

Generally, the present invention provides a method and apparatus for sharing objects among a group of processes. This may be accomplished by using a causal time stamp for each conveyance of information between the members of the group of processes. When a process receives an object request from another process, wherein the object request includes identity of the process requesting the objects, a request causal time stamp, and the objects being requested, the receiving process updates its current causal time stamp based on the requesting causal time stamp. This insures that the receiving process has the most current causal time stamp information for the requesting process. In addition, the receiving process invalidates any old requests from the requesting process and updates its grant causal list. The grant causal list includes a prioritized listing of outstanding object requests, where prioritization is based on a predetermined total ordering procedure. The predetermined total ordering includes a causal connection order and predetermined order which will be discussed in greater detail below.

Once the grant causal list has been updated, the receiving process determines whether it has one of the needed objects being requested and the request is of a higher priority. If so, the receiving process generates a grant message for the requesting process. The grant message includes a grant causal time stamp which is reflective of the current causal time stamp of the receiving process and the objects being granted. When the requesting process receives the object grant, it updates its possession set of objects to include the newly received objects and updates its current causal time stamp. If the possession set includes all of the needed objects, the requesting process then utilizes the objects as needed.

As mentioned, the grant causal list is updated using a predetermined total ordering procedure. This ordering procedure compares current request values of each causal time stamp to determine which is of a higher priority. A higher priority occurs as a result of a direct comparison of each current request value in the request causal time stamps. When a current request value in one request causal time stamp is less than the corresponding current request value in another request causal time stamp, the causal time stamp having the lower current request value is considered to precede, or have a higher priority than, the other causal time stamp. Thus, the preceding causal time stamp is given priority over the other time stamp which allows that particular request to be satisfied before the other. By using such a method and apparatus to order and grant object requests, sharing of objects within a distributed computing system can be obtained without a centralized server, without deadlock occurring, without object inconsistencies occurring, and with the guarantee that fair progress will occur.

Figure 1:
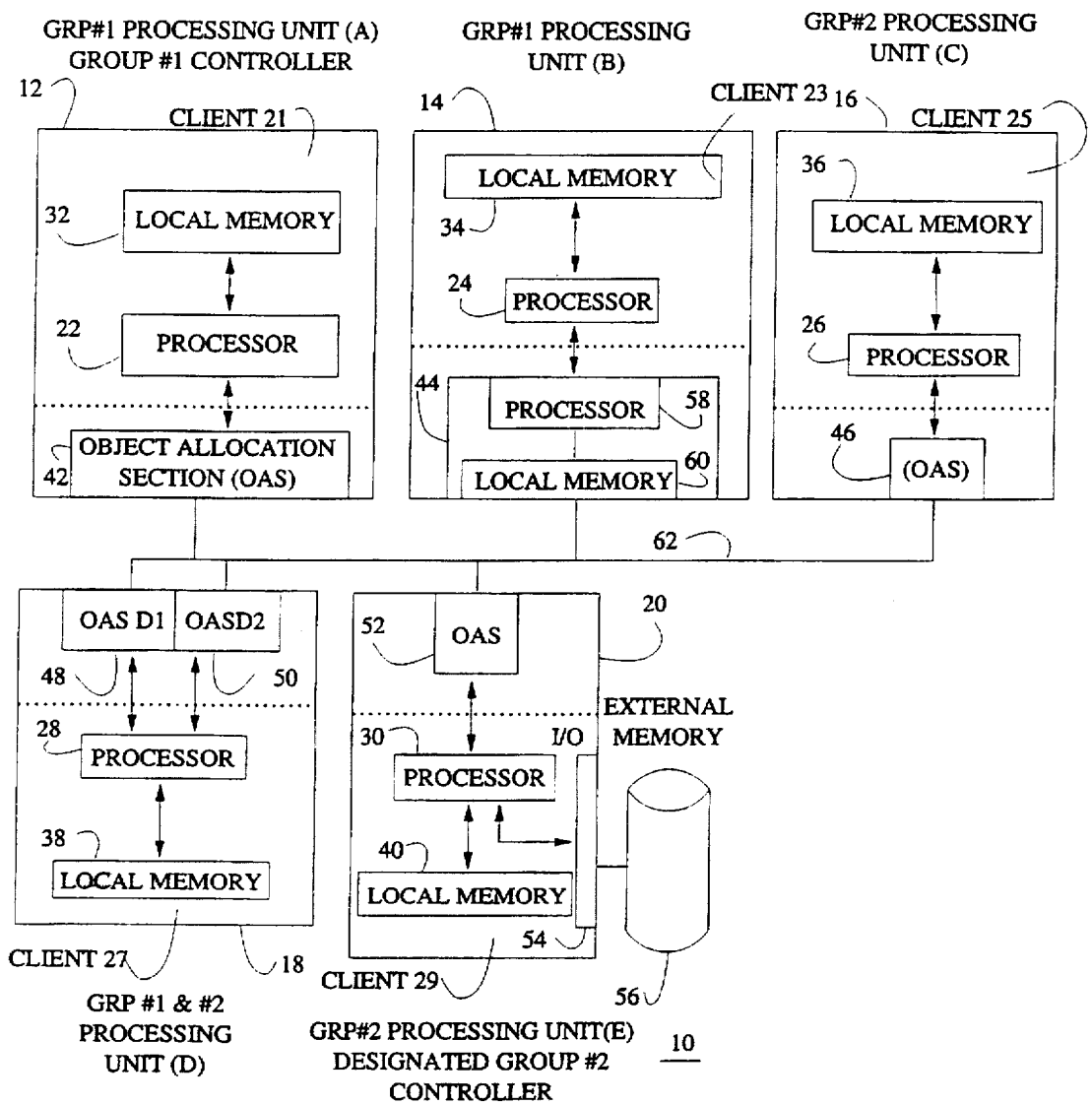
FIG. 1 illustrates a distributed computing system which incorporates the teachings of the present invention.

FIG. 1 illustrates a distributed computing system 10 that includes a plurality of processing units 12, 14, 16, 18, 20, interconnected by a distribution network 62. The processing units 12, 14, 16, 18, and 20 may be individual processors such as microcontrollers, microprocessors, digital signal processors, or any other type of integrated circuit processing elements. Such units are coupled together by a series of buses. Alternatively, the processing units may be standalone computers, workstations, or mainframe computers, intercoupled by an Ethernet connection or some other type of network connection.

As shown, the processing units are arranged into two groups: Group 1 and Group 2. Processing unit (A) 12, processing unit (B) 14, and processing unit (D) 18 are in Group 1, while processing unit (C) 16, processing unit (D) 18, and processing unit (E) 20 are in Group 2. Note that processing unit (D) 18 is in both Groups 1 and 2. In these group configurations, objects residing within any particular member of the group may be shared with the other members of the group. Further note that objects within one group are not shared with objects of the other group. Thus, processing unit (D), when acting as a member of Group 1, only shares the objects with the members of Group 1 and, when operating within Group 2, only shares objects with members of Group 2. Still further note that processing unit (D) may be operating within both Groups 1 and 2 simultaneously.

As shown, each of the processing units 12, 14, 16, 18, and 20 include a processor 22, 24, 26, 28, 30 and local memory 32, 34, 36, 38, 40. These elements are shown to be part of a client section of the processing unit. The client section 21, 23, 25, 27, 29 is, in a sense, the basic processing entity, e.g., processor or computer, which interfaces with the particular user. In addition, the client section operates on, and stores, the objects.

The processing units 12, 14, 16, 18, 20 also include object allocation sections 42, 44, 46, 48, 50, 52 which provide the mechanism for processing the distributed object allocation procedure in accordance with the present invention. The object allocation section may include a processor 58 and memory 60 functioning as a co-processor or may simply be software instructions that are executed by the processor in the client section 21, 23, 25, 27, 29. Note that processing unit (D) 18 has two object allocation sections 48 and 50. Each object allocation section 48, 50 is used for each group that processing unit (D) is a member. Thus, object allocation section 48 is used for Group 1 while object allocation section 50 is used for Group 2. The object allocation sections function as behind-the-scenes processing entities to control the exchange of shared objects. For the purposes of this application, each object allocation section is associated with a particular process of a group of processes, where a process may be a particular processing unit, or a process running on a processing unit.

The processing unit (E) 20 is shown to include an input/output port 54 that couples it to an external memory 56. The external memory may be a database of objects which are shared among members of Group 2 and may be affiliated with any of the particular processing units in the system. However, it is shown affiliated with processing unit (E) for the purposes of this discussion. Also note that processing unit (E) 20 is designated as the group controller for Group 2, while processing unit (A) is designated as group controller for Group 1. The functions of the group controller are to process the addition and deletion of processes from the group of processes. The addition and deletion of processes from the group of processes will be discussed below with reference to FIGS. 18 and 19. Note that other than the processing of addition and deletion of processes from the group, the designated group controller has no other special functions.

Figure 2:
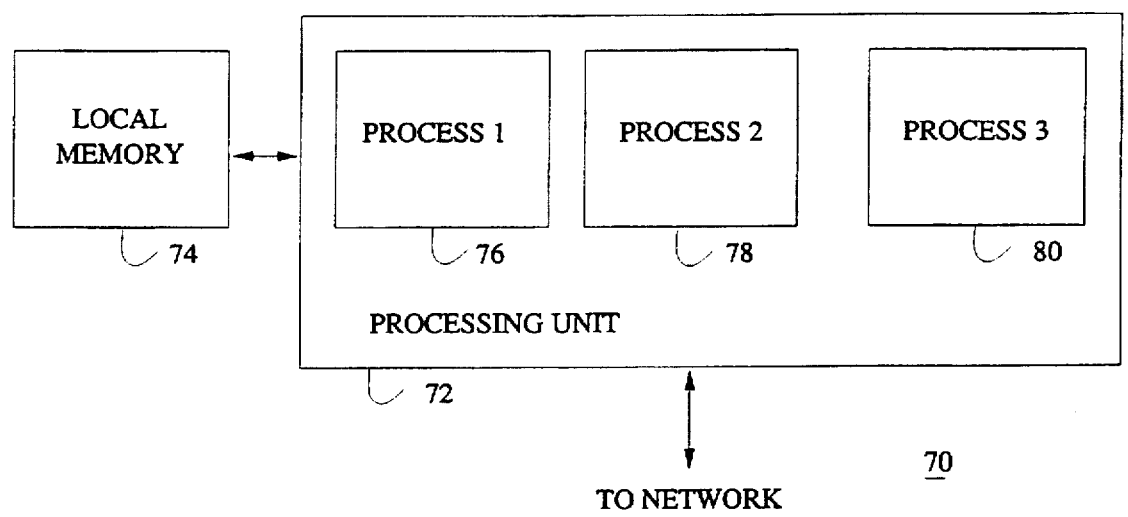
FIG. 2 illustrates an alternate distributed computing system which incorporate the teachings of the present invention.

FIG. 2 illustrates an alternate distributed computing system that incorporates the teachings of the present invention. As shown, the distributed computing system 70 includes a single processing unit 72 coupled to a local memory unit 74 and is provided with a network transmission path 82. The local memory may be any type of digital information storage device such as RAM, ROM, EE-PROM E-PROM, magnetic disc, CD-ROM, etc. The processing unit 72 may comprise a microprocessor, microcontroller, digital signal processor, or any other device that executes instructions.

As shown, the processing unit may support a plurality of processes 76, 78, 80. Each of the processes may be a separate algorithm being executed by the processing unit 72, but are within the same group sharing a set of objects. While not shown in the distributed processing system 70, the processing unit would also include an object allocation section comprised of software instructions, thereby allowing the processing unit to support multiple processes and further to support the object sharing as taught by the present invention. Further note, that if the processing unit includes multiple copies of the object allocation section of the present invention, it can support multiple groups of processes.

Figure 3:
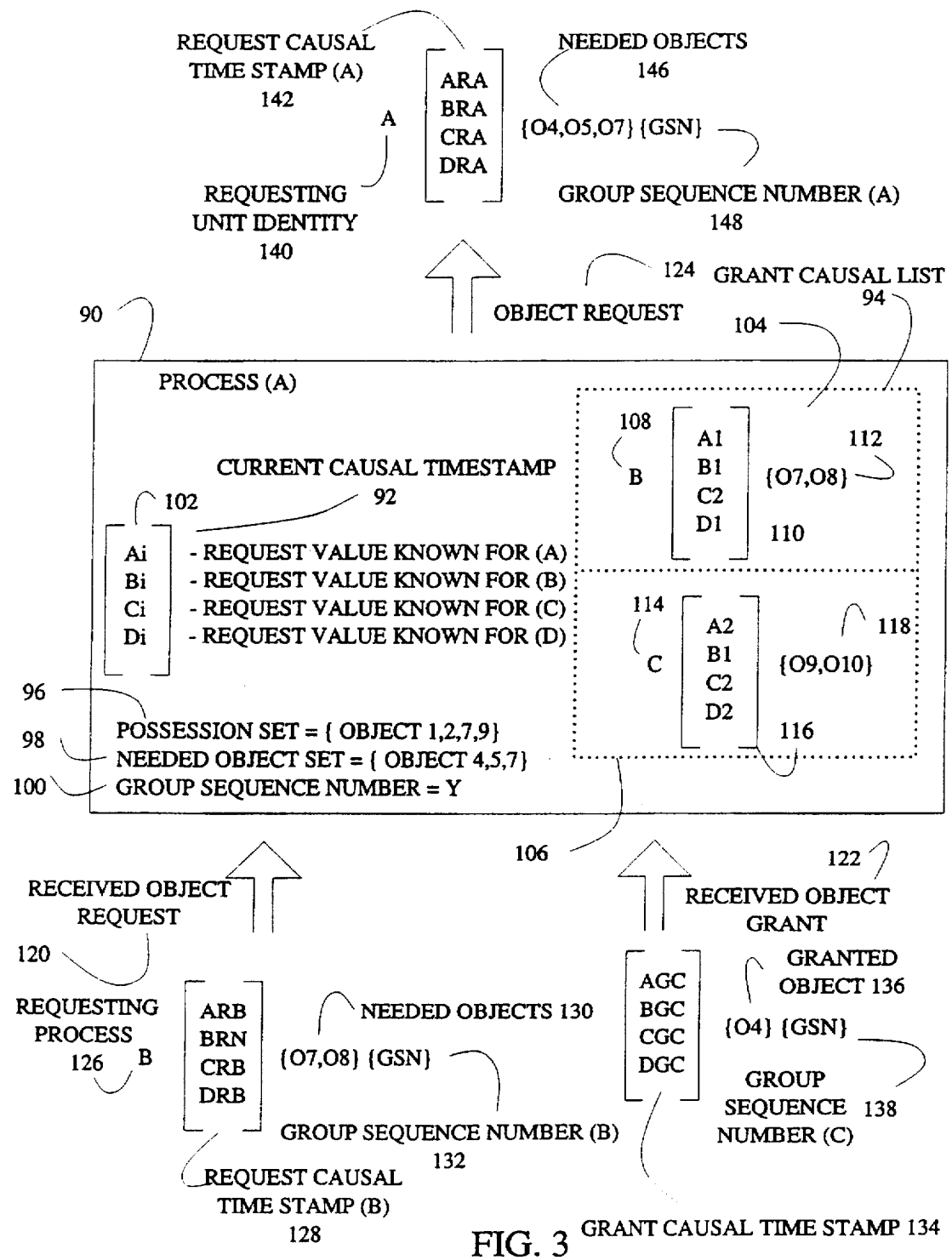
FIG. 3 illustrates an object flow diagram in accordance with the present invention.

FIG. 3 illustrates a graphical representation of the data processed by the object allocation section 42, 44, 46, 48, 50, 52 of FIG. 1. As shown, for a particular process 90, a current causal time stamp 92, possession set information 96, needed object set information 98, group sequence number information 100, and a grant causal list 94 are stored. The current causal time stamp 92 contains information indicating the current request value 102 known for each of the processes in the group. The example shown in FIG. 3 has four processes in this particular group: Process A, Process B, Process C, and Process D. The current request value 102 indicates the number of times the particular process has had its request satisfied. For example, if the current request value for Process A is four, it reflects that Process A has transmitted four object requests.

Current request values are updated when a request has been satisfied for corresponding processes or when causal time stamps are received within object grants or object requests. The satisfaction of a request only updates the current request value for the process affiliated with the current causal time stamp. For example, when a request for process A has been satisfied, the current request value $A_i$ in the current causal time stamp 92 for process A is updated. The current request value for process A will be updated in the current causal time stamp tables of processes B, C, and D when these processes receive an object request or object grant from process A containing an updated current request value.

The grant causal list 94 includes the total ordering of outstanding object requests. As shown, the first request 104 in the grant causal list 94 is for Process B 108 and includes the causal time stamp for process B 110 and the objects being requested. The causal time stamp of request B 110 shows that the current request value for A is one, for B is one, for C is two, and for D is one. The second entry 106 of the grant causal list 94 is for process C 114. The causal time stamp for Process C 116 and the objects being requested by Process C 118 are further included in the object request. The causal time stamp 116 of Process C indicates that the current request value for Process A is two, for Process B is one, for Process C is two, and for Process D is two.

By comparing the current request values of the causal time stamp 110 for Process B with the causal time stamp 116 for Process C, it can be shown that the request by Process B has a causal time stamp priority to that of Process C. This can be seen by comparing the current request values in each of the causal time stamps 110 and 116. As shown, the current request value for Process A of causal time stamp 110 is one, while the current request value of Process A in causal time stamp 116 is two. Thus, the information contained in the causal time stamp of request B precedes that of the information in causal time stamp 116. Examples of the comparison of causal time stamps will be discussed in greater detail with reference to FIGS. 9–17.

The possession set 96 indicates the objects which are currently held by this particular process (Process A). The objects shown in the possession set 96 are objects 1, 2, 7, and 9. These objects will be granted to processes in the group of processes based on the information in the grant causal list 94. Note that any objects held in the possession set that are not needed are considered to be surplus objects. As shown in the grant causal list 94, Process B is requesting objects 7 and 8. With process A possessing object 7, it would prepare a grant message and relinquish object 7 to Process B. The order in which objects is granted are based on the priority of the request in the grant causal list, which will be discussed below in greater detail.

The needed object set 98 contains information of objects that a particular process needs in relation to its current outstanding object request. As shown, this particular process has a need set of objects 4, 5, and 7. Note that the objects listed in the need object set 98 are shown purely for example purposes. If process A's request has not been satisfied, Process A would have an entry in the grant causal list 94.

The group sequence number 100 indicates the number of times in which the group has changed its membership. As a member is added to the group of processes, the group sequence number is updated. The group sequence number 100 is also updated when a member leaves the group of processes. The group sequence number is usually transmitted along with an object request message or an object grant message for the recipients to use to determine whether the incoming request is the most current request from that particular process and to further determine whether a change has occurred to the membership of the group that has not yet been recorded by the receiving process.

The information in the current causal time stamp 92 and the grant causal list 94, as well as the group sequence number 100, are updated by receiving object requests 120 and object grants 122. An object request 120 is formatted in the manner shown. For a particular object request 120, the requesting process 126 indicates its identity, includes a request causal time stamp 128, the needed objects 130, and the group sequence number 132. The information in the requested causal time stamp 128 is reflective of the current causal time stamp information stored by the particular object allocation section for the particular process. The group sequence number is also reflective of the values stored in the object allocation section for the particular process. The example shown indicates that Process B is transmitting a request for objects 7 and 8. Updating the information in the object allocation section for Process A and other processes will be described in more detail with reference to FIG. 4 below.

The object grant message 122 includes a grant causal time stamp 134, the objects being granted 136, and the group sequence number 138. The object grant 122 does not necessarily include the identity of the process transmitting the grant; however, such information may readily be included in the transmission.

In addition to receiving object grants and requests, the process can generate, via its object allocation section, object requests and object grants. An object grant will look similar to the object grant 122, while the object request 124 includes the information shown. The object request 124 includes the identity of the requesting unit 140, the request causal time stamp for the particular process 142, the needed objects 146, and the most current group sequence number 148 known by the process. In a comparison of the object request 124 with the object request 120, it will be seen that these are identical.

Figure 4:
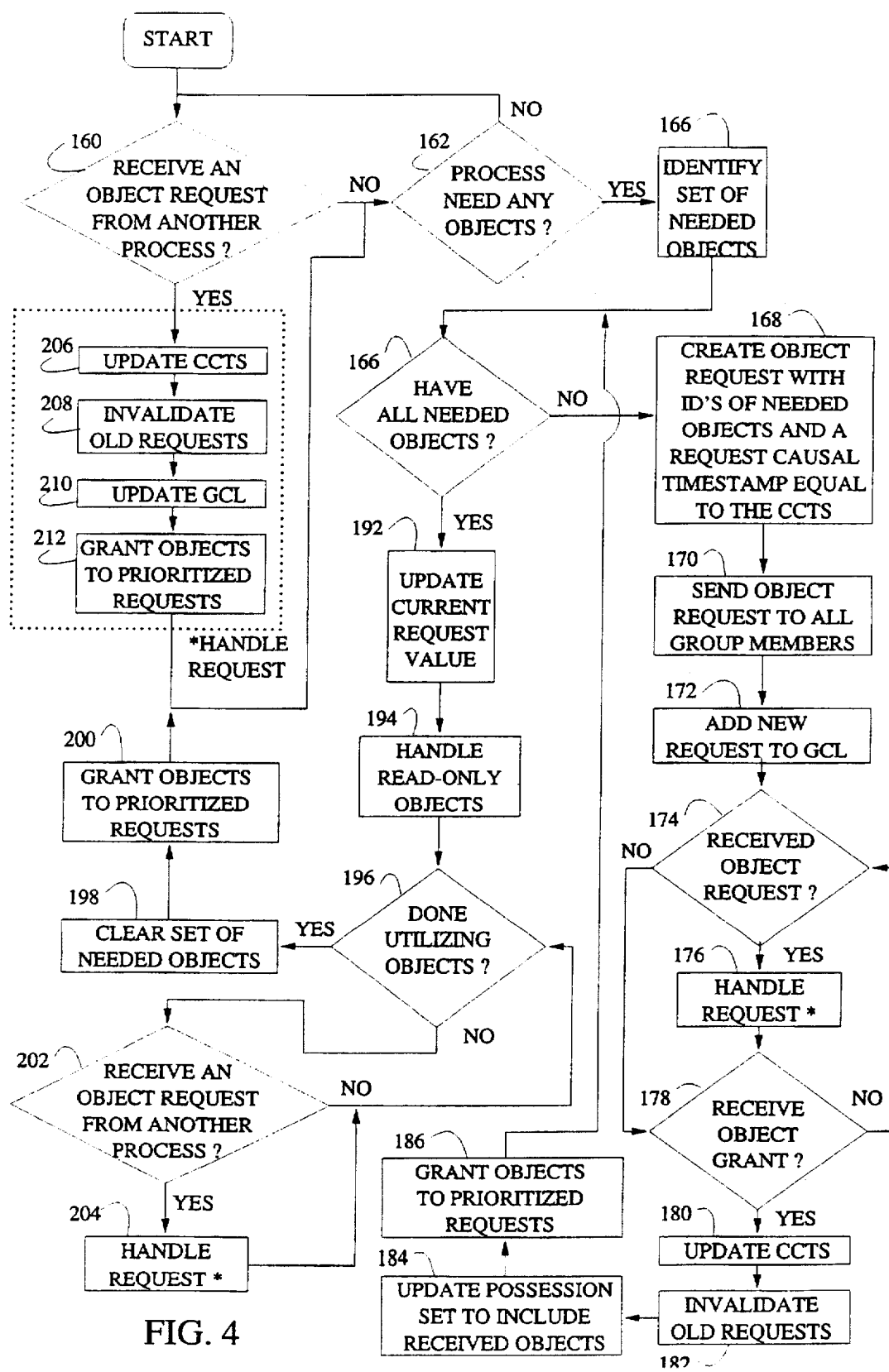
FIG. 4 illustrates a logic diagram that may be used to implement the present invention.

FIG. 4 illustrates a logic diagram that may be used to implement an embodiment of the present invention. The steps of FIG. 4 may be comprised of a plurality of program instructions stored on a processor, or computer, readable storage medium. Such processor readable storage medium may be any type of device for storing digital information such as RAM, ROM, E-PROM, EE-PRON, magnetic disk, CD-ROM, etc. The method begins at step 160 wherein a process of a group of processes determines whether it has received an object request from another process of the group of processes. If not, the method proceeds to step 162 wherein the process determines whether it needs any objects. If not, the process remains in a wait loop between steps 160 and 162 until either an object request from another process occurs or this particular process needs an object.

When this process needs an object as determined at step 162, the method proceeds to step 164 wherein the process identifies a set of needed objects. The set of needed objects includes the identity of particular objects and is determined by the client side of the processing system or processing unit. Once determined, the client side conveys identity of the needed objects to the object allocation section which stores identity of the needed objects in a need set. Having identified the set of needed objects, the method proceeds to step 166 wherein the particular process determines whether it has, in its possession set, all of the needed objects.

If the process does not have all of the needed objects, the method proceeds to step 168 wherein the process generates an object request to include the identity of the requested objects, a request causal time stamp that is set equal to its current causal time stamp, and the identity of the requesting unit. (Refer to the object request 124 of FIG. 3 for an illustrative example of an object request.) Once the object request is generated, the method proceeds to step 170 wherein the object request is sent to all group members. Having sent the object request, the method proceeds to step 172 wherein the requesting process adds its new object request to its grant causal list. (Refer to the grant causal list 94 of FIG. 3 for an illustrative example.) The updating or adding of new object requests to the grant causal list will be discussed in greater detail below with reference to FIGS. 9–17.

Once the requesting process has updated its grant causal list, the method proceeds to step 174 wherein the process determines whether it has received an object request from another process. If yes, the method proceeds to step 176 where the particular object request is handled. Handling of an object request will be discussed below with reference to steps 206–212 of this particular diagram. If the object request was handled or no object request was received, the method proceeds to step 178 wherein the process determines whether it has received an object grant. If not, the process remains in a loop waiting either for an object request from another process or an object grant.

Once an object grant has been received, the method proceeds to step 180 where the process updates its current causal time stamp based on information in the object grant. Updating the current causal time stamp will be discussed in greater detail with reference to FIG. 5. Once the current causal time stamp is updated, the method proceeds to step 182 wherein the process invalidates any old requests. Invalidating old requests will be discussed in greater detail with reference to FIG. 6.

The method then continues to step 184 wherein the process updates its possession set to include the object received via the object grant message. Once in possession, the method proceeds to step 186 wherein the process determines whether any of the objects it currently possesses should be allocated to another requesting process having a higher priority request. (See FIG. 7 for a more detailed discussion.) As mentioned with reference to FIG. 3, the grant causal list 94 includes the prioritized ordering of object requests. The ordering of the grant causal list 94 will be discussed in greater detail below with reference to FIGS. 9–17 below.

The method then continues to step 188 wherein the process determines whether it has all of the needed objects. If not, the method proceeds to step 174 and waits to either receive an object request from another process or receive an object grant. If, however, the process has all of the needed objects, the method proceeds to step 190 wherein the particular process removes its object request from its grant causal list. By removing the process' object request from the grant causal list, the process is indicating that this request has been satisfied. The method then proceeds to step 192 wherein the particular process updates its current request value in its current causal time stamp. (Refer to FIG. 3 for an illustrative example of the current causal time stamp 92 and the current request value.) Note that the speed in which steps 166–192 are executed by an object allocation section is increased when the requested objects reside in the same processing entity.

The method of FIG. 4 also shows another path to arrive at step 192. This path occurs at the decision step 166 in which the process determines whether it has all of the needed objects of its particular object request. If so, the method proceeds to step 192. After the current request value is updated at step 192, the method proceeds to step 194 wherein read only objects are handled. The handling of read only objects will be discussed in greater detail with reference to FIG. 8 below. Having processed the read only objects, the method proceeds to step 196 wherein the process determines whether the client side of the processing unit has finished utilizing the requested objects. If not, the method proceeds to step 202 wherein the process determines whether it has received an object request from another process. If not, the process remains in a loop waiting for the client portion of the processing unit to finish utilizing the requested object or to receive an object request from another process. If an object request is received from another process, the method proceeds to step 204 wherein the request is handled as described in steps 206–212 below.

Once the client portion of the processing unit has finished utilizing the requested objects, the method proceeds to step 198. At step 198, the process clears its set of needed objects, i.e., clears the needed object set. Having done this, the method proceeds to step 200 wherein the objects that were just released by the client portion of the processing unit are granted to prioritized requests. (The granting of objects to prioritized requests will be discussed in greater detail below with reference to FIG. 7.) Once the objects have been granted to a prioritize request, the process returns to step 162.

The handling of an object request begins at step 206. At step 206, the particular process receiving the object requests updates its current causal time stamp. (Updating the current causal time stamp will be discussed below with reference to FIG. 5.) Having updated its current causal time stamp, the method proceeds to step 208 wherein the process invalidates any old request for the particular process that had generated the newly received object request. (Invalidating old requests will be discussed in greater detail below with reference to FIG. 6.) The method then proceeds to step 210 wherein the process updates its grant causal list which will be discussed in greater detail below with reference to FIGS. 9–17. The method then proceeds to step 212 wherein the process grants objects to prioritized requests, which will be discussed in greater detail below with reference to FIG. 7.

Figure 5:
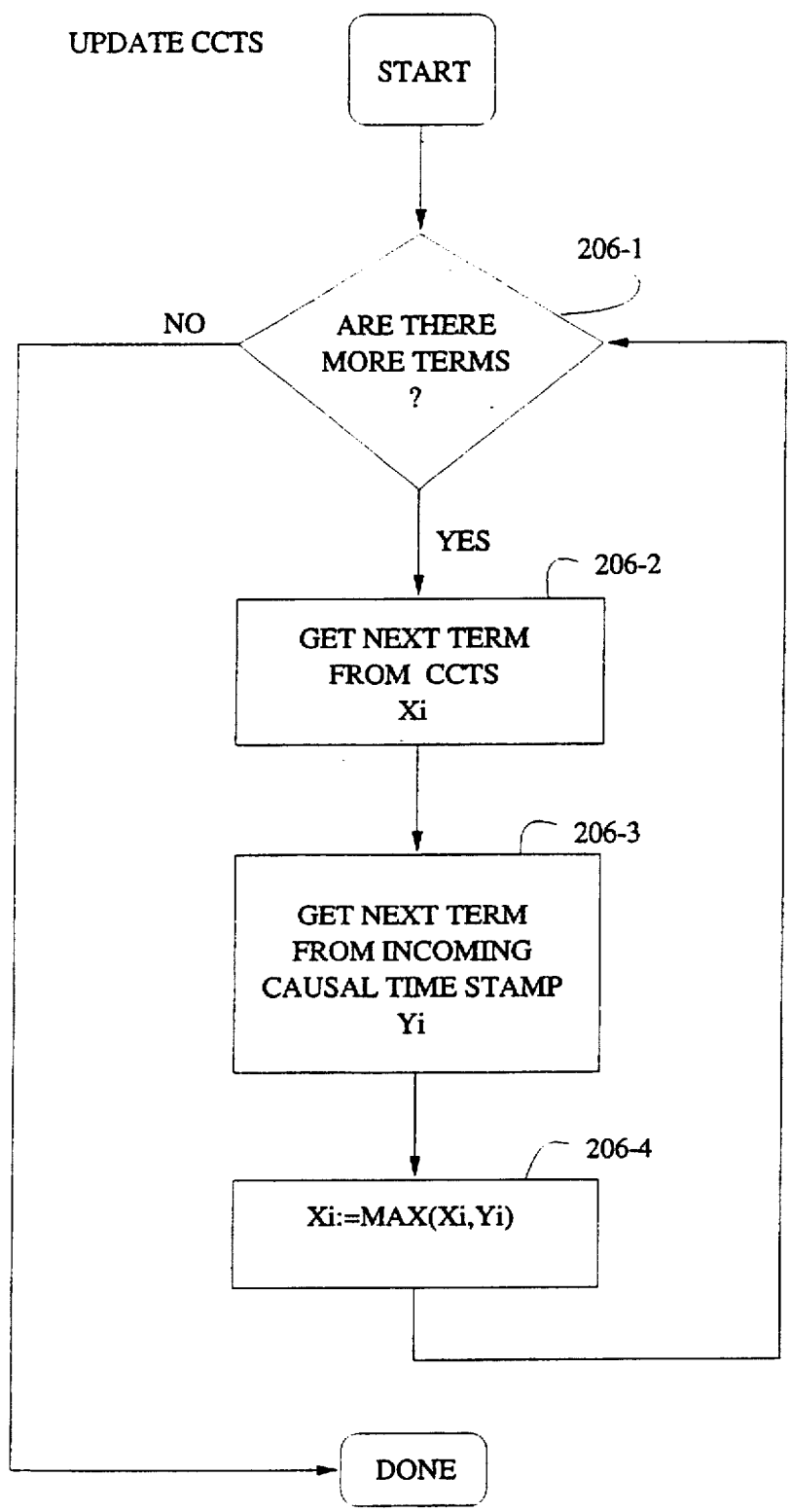
FIG. 5 illustrates a logic diagram which further describes step 206 of FIG. 4.

FIG. 5 illustrates the method steps that a process of the group of processes utilizes to update its current causal time stamp. The updating method begins at step 206-1 wherein the process determines whether there are more terms, or current request values, to be compared. If yes, the method proceeds to step 206-2 wherein the next terms, or current request values, from the current causal time stamp ($X_i$) is retrieved. The method then proceeds to step 206-3 wherein the process retrieves the next term, or next current request value ($Y_i$), from the incoming causal time stamp. The method then proceeds to step 206-4 wherein the current request value in the current causal time stamp is set to the maximum value of $X_i$ or $Y_i$. For example, assume that the current request value in the current causal time stamp is 4 and the corresponding current request value of the incoming causal time stamp is 5. Given these parameters, the current causal time stamp would be updated to have the number 5 as the current request value. After setting this particular current request value to the maximum of $X_i$ or $Y_i$, the method returns to step 206-1. Once all of the terms, or current request values, have been compared, the method is complete.

FIG. 6 illustrates a method for invalidating old requests. The method begins at step 208-1 where a determination is made as to whether there are more requests in the grant causal list. If not, the method is complete. If, however, there are more requests in the grant causal list, the method proceeds to step 208-2. At step 208-2, the process retrieves the next request (R). The method then proceeds to step 208-3 wherein the process retrieves the requestor's identity $R_{id}$ and the request causal time stamp ($R_{cts}$). The method then proceeds to step 208-4 wherein the process retrieves, for the process ($R_{id}$), its term, or current request value ($X_i$), from the request causal time stamp ($R_{cts}$)

The method then proceeds to step 208-5 wherein the process retrieves, for the process that generated request (R), the current request value ($Y_i$), or term, from its current causal time stamp. The method then proceeds to step 208-6 wherein the current request value of the request causal time stamp $X_i$ is compared with the current request value $Y_i$ of the process's current causal time stamp. If $Y_i$ is greater than $X_i$, this particular object request (R) is removed from the grant causal list at step 208-7. As mentioned above, when a process has had an object request satisfied, it updates its current request value. Thus, when the current request value for a particular process in the current causal time stamp is greater than the current request value in the request causal time stamp of an object request for the particular process, the object request has been satisfied and can be removed from the grant causal list.

If, however, the current request value in the object request ($X_i$) is not less than the corresponding current request value in the current causal time stamp ($Y_i$), the request has not yet been satisfied and the method proceeds to step 208-1. At step 208-1, the process goes through each object request in its grant causal list and compares the corresponding current request values of the requesting process to the current request value known by this particular process in its current causal time stamp. Once the process has compared all the current request values for processes having a request in the grant causal list as described above, the invalidation of old requests is complete.

Figure 7:
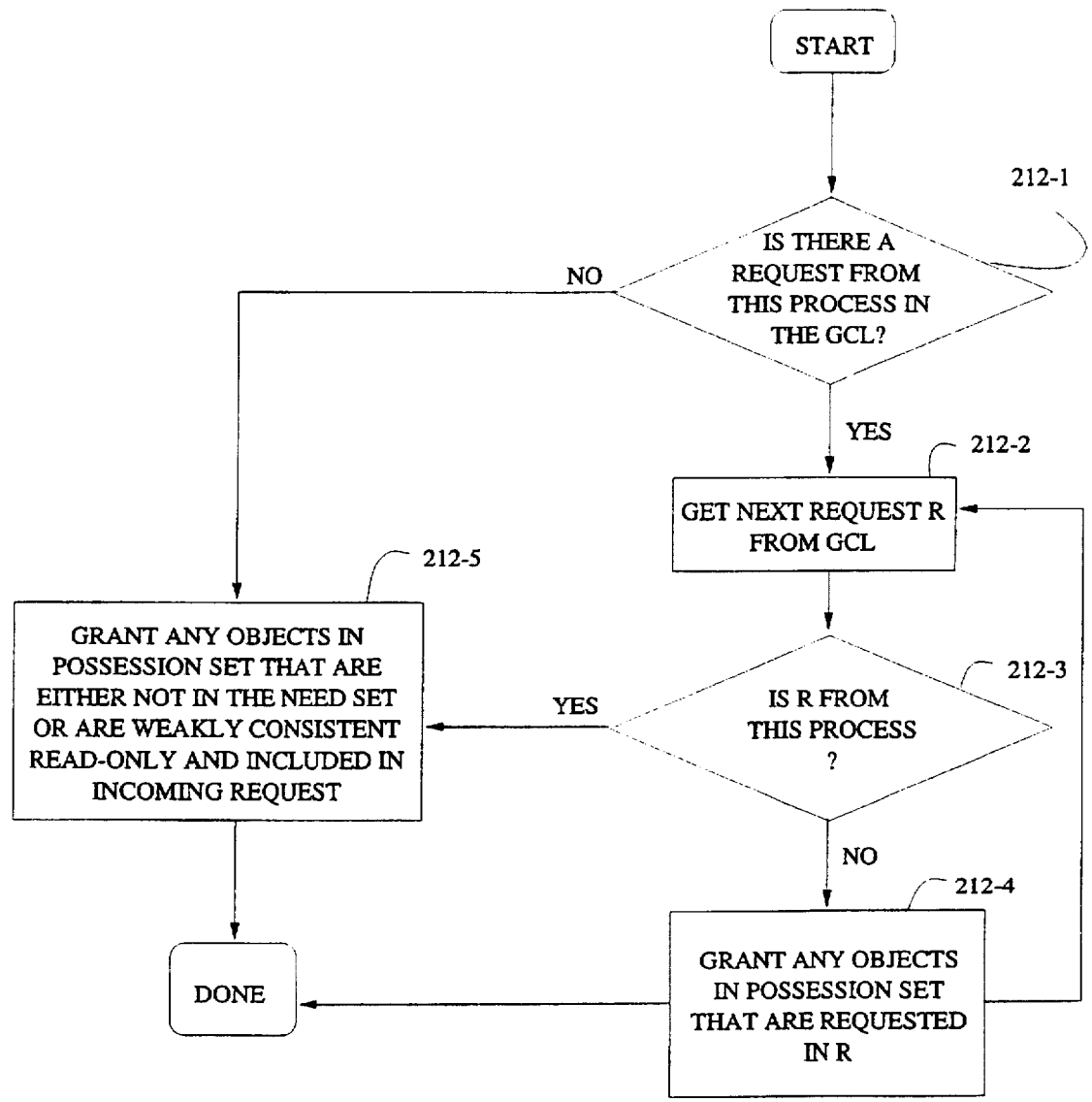
FIG. 7 illustrates a logic diagram which illustrates step 212 of FIG. 4.
Figure 7:
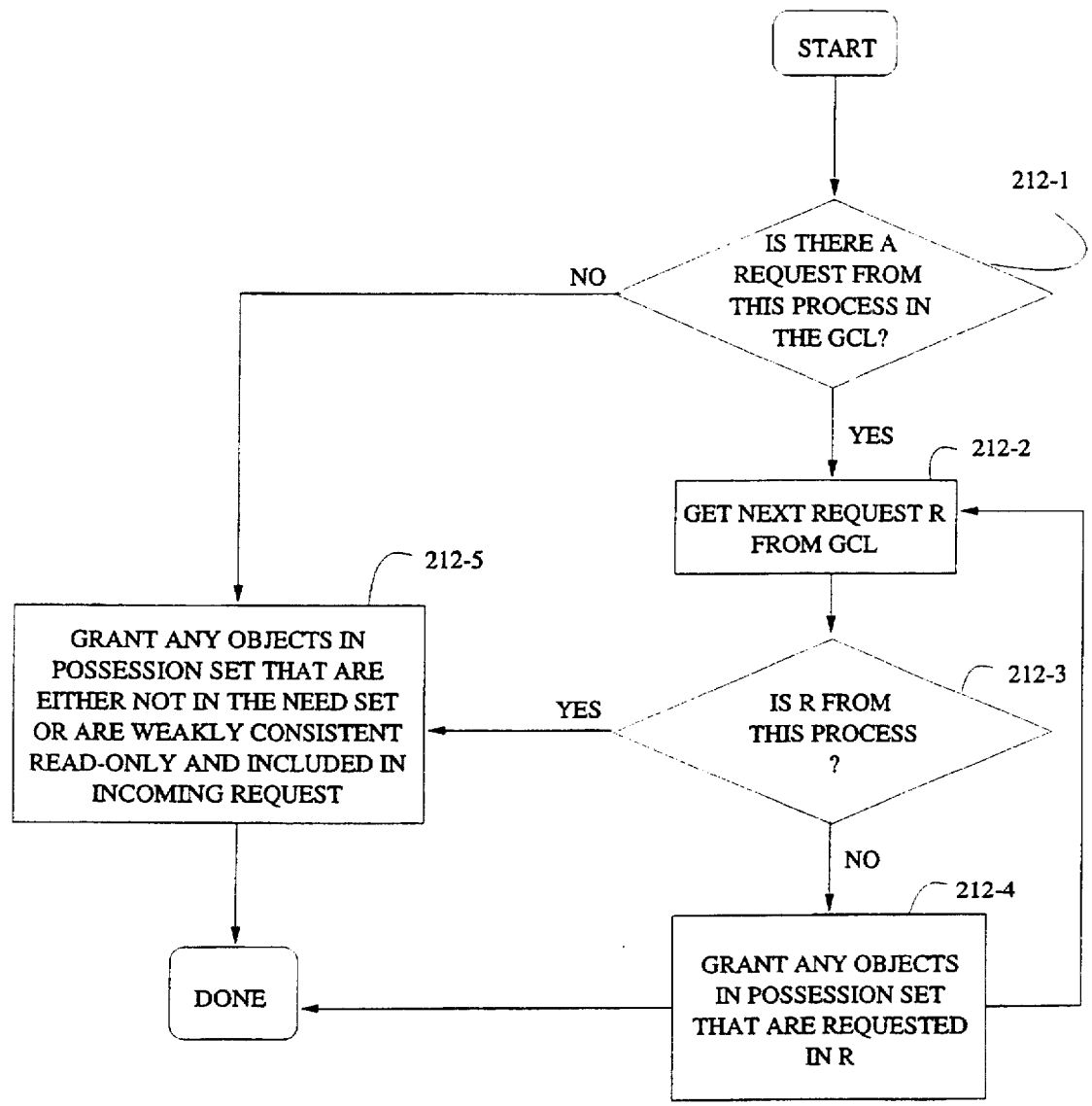

FIG. 7 illustrates a method for granting objects to prioritized requests as referenced in steps 212, 200, and 186 of FIG. 4. The method begins at step 212-1 where a determination is made as to whether there is a request from this process in the grant causal list. If the particular process does not have a request in its grant causal list, the method proceeds to step 212-5 wherein requested objects within the process' possession set and not in the process' need set (i.e., surplus objects) are granted to the requesting process.

If the process has one of its requests in the grant causal list, the method proceeds to step 212-2 wherein the next entry in the grant causal list (R) is retrieved. If this is the first time through the grant causal list, the process will retrieve the highest priority entry in the grant causal list, and for subsequent retrievals, it will sequence down the priority chain in the grant causal list. Having retrieved the next request (R), the method proceeds to step 212-3. At step 212-3, a determination is made as to whether the next request (R) is from this particular process. If yes, the method proceeds to step 212-5 wherein any objects in the possession set that are not part of the needed set may be granted to the incoming object request.

If, however, the request is not for this particular process, the method proceeds to step 212-4 wherein the process grants any objects in the possession set that are requested in the next request (R). Having done this, the process returns to step 212-2 wherein the next request (R) from the grant causal list is retrieved. The process remains in this loop of steps 212-2 to 212-4 until the entire grant causal list has been exhausted or the process has reached its own request.

Figure 8:
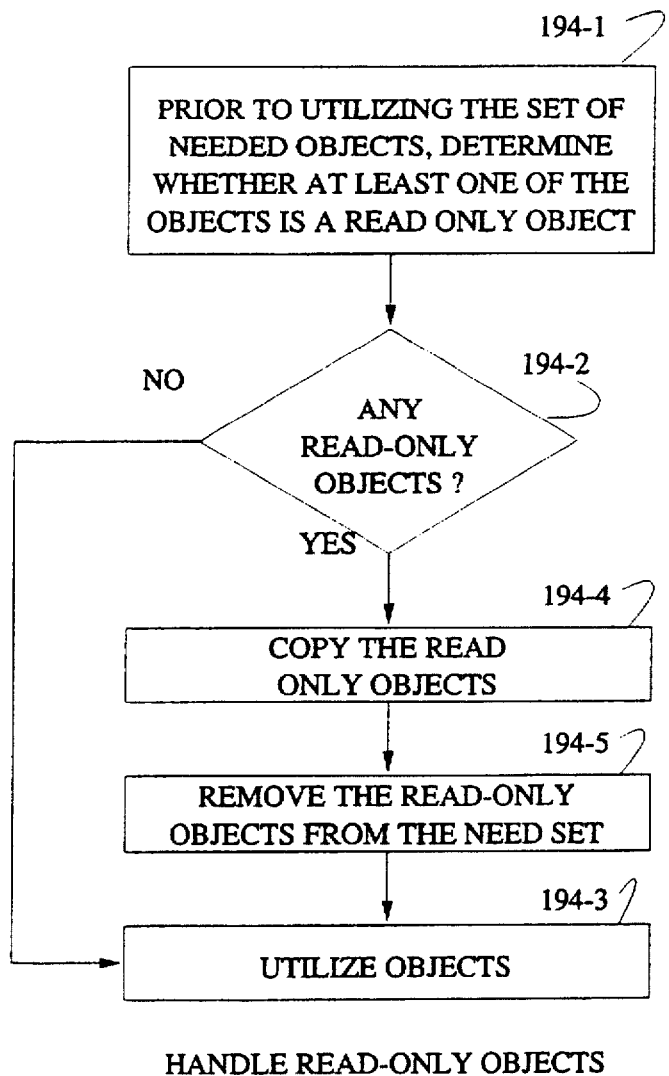
FIG. 8 illustrates a logic diagram which further describes step 194 of FIG. 4.

FIG. 8 illustrates a method for handling read-only objects as illustrated at step 194 of FIG. 4. The handling of read-only objects begins at step 194-1 wherein a determination is made, prior to utilizing the set of needed objects, whether at least one of the objects in the need set is a read-only object. If the need set includes at least one read-only object 194-2, the method proceeds to step 194-4. At step 194-4, the read-only objects are copied and subsequently stored by the process. After copying the read-only objects, the method proceeds to step 194-5 wherein the read-only objects are removed from the need set. Having removed the read-only objects from the need set, the read-only objects may be subsequently granted to other object requests. When there are no read-only objects, or after the read-only objects have been removed from the need set, the method proceeds to step 194-3 wherein the objects are utilized by the client portion of the processing unit.

Figure 9:
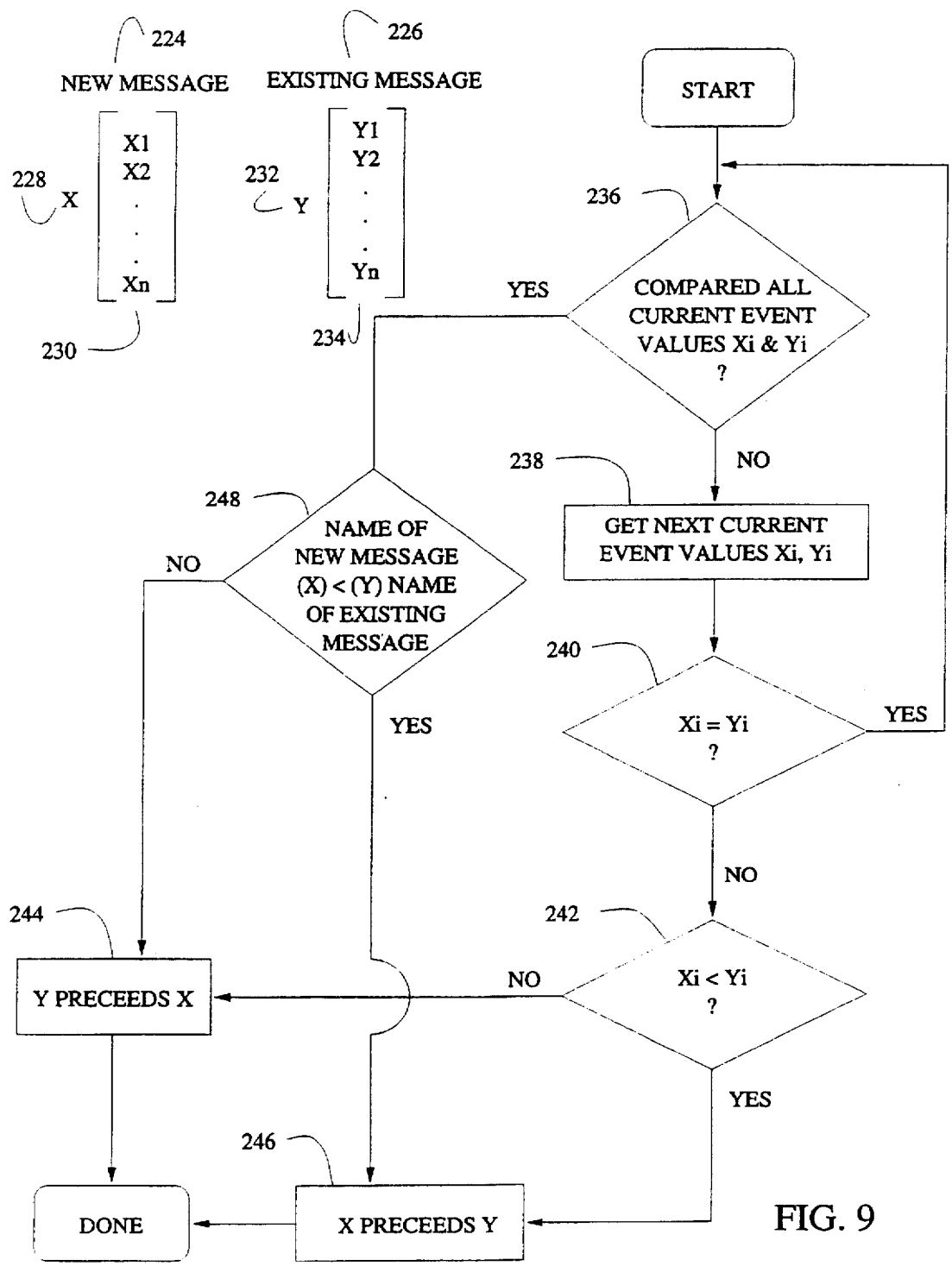
FIG. 9 illustrates a logic diagram for ordering message lists in accordance with the present invention.

FIG. 9 illustrates a logic diagram that may be used to generate a prioritization of the grant causal list 94 (of FIG. 3). The steps of this logic diagram may be implemented as program instructions that can be stored on any digital information storage medium. Also shown is an exemplary illustration of the logic diagram which includes a new message 224 having an identity of the requesting process X 228 and the requesting causal time stamp 230 of X. Similarly, the existing message 226 includes the identity of the requesting process Y 232 and its corresponding request causal time stamp 234.

The total ordering procedure begins at step 236 where a determination is made as to whether all of the current event values ($X_i$) and ($Y_i$) have been compared. If not, the method proceeds to step 238 wherein the next current event values ($X_i$) and ($Y_i$) are retrieved. The method then proceeds to step 240 where a determination is made as to whether $X_i$ equals $Y_i$. If yes, the method returns to step 236 for a determination as to whether all of the current event values in the request causal time stamp of the new message 230 and the request causal time stamp 234 of the existing message have been compared.

If, at step 240, $X_i$ does not equal $Y_i$, the method proceeds to step 242 where a determination is made as to whether $X_i$ is less than $Y_i$. If $X_i$ is less than $Y_i$, the process proceeds to step 246 where it is established that X precedes Y in the message lists, or grant causal lists, of each of the members of the group of processes. In other words, the new message precedes, or has a higher priority than, the existing message in the grant causal lists. If, however, $X_i$ is not less than $Y_i$, in other words, $Y_i$ is less than $X_i$, the method proceeds to step 244 where it is declared that the object request of Y precedes the object request of X (i.e., the existing message precedes, or has a higher priority than, the new message).

If, at step 236, all of the current event values in the request causal time stamp 230 and request causal time stamp 234 have been compared and found to be equal, the method proceeds to step 248. At step 248, a determination is made as to whether the name of the new message ($X_y$) is less than the name of the existing message (Y). This determination is based on a predetermined total ordering such a numerical identity of the processes, alphabetical ordering of the names of the processes, an alphanumeric character prioritization of the names of the processes, or any other prioritizing scheme desired so long as it defines total ordering.

If, for example, the name of the new message 228 (X) is less than the name of the existing message 232 (Y), the method proceeds to step 246 where it is declared that the object request of X precedes the object request of Y. In other words, the object request of X has a higher priority than the object request of Y. If, however, the name of the new message is not less than the name of the existing message, the method proceeds to step 244 where it is declared that the object request of Y precedes, or has priority over, the object request of X.

Figure 10:
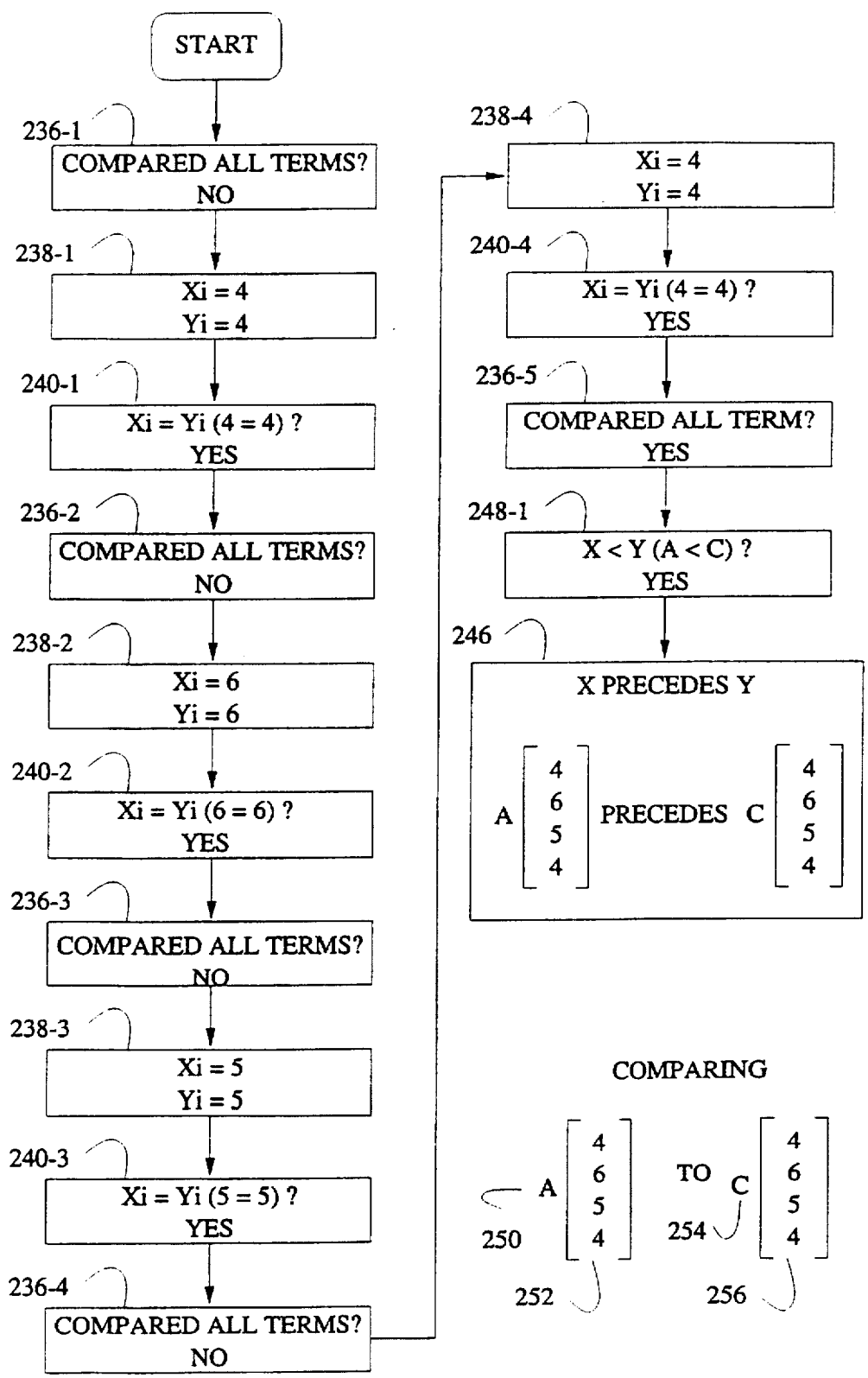
FIG. 10 illustrates an example of FIG. 9.
Figure 11:
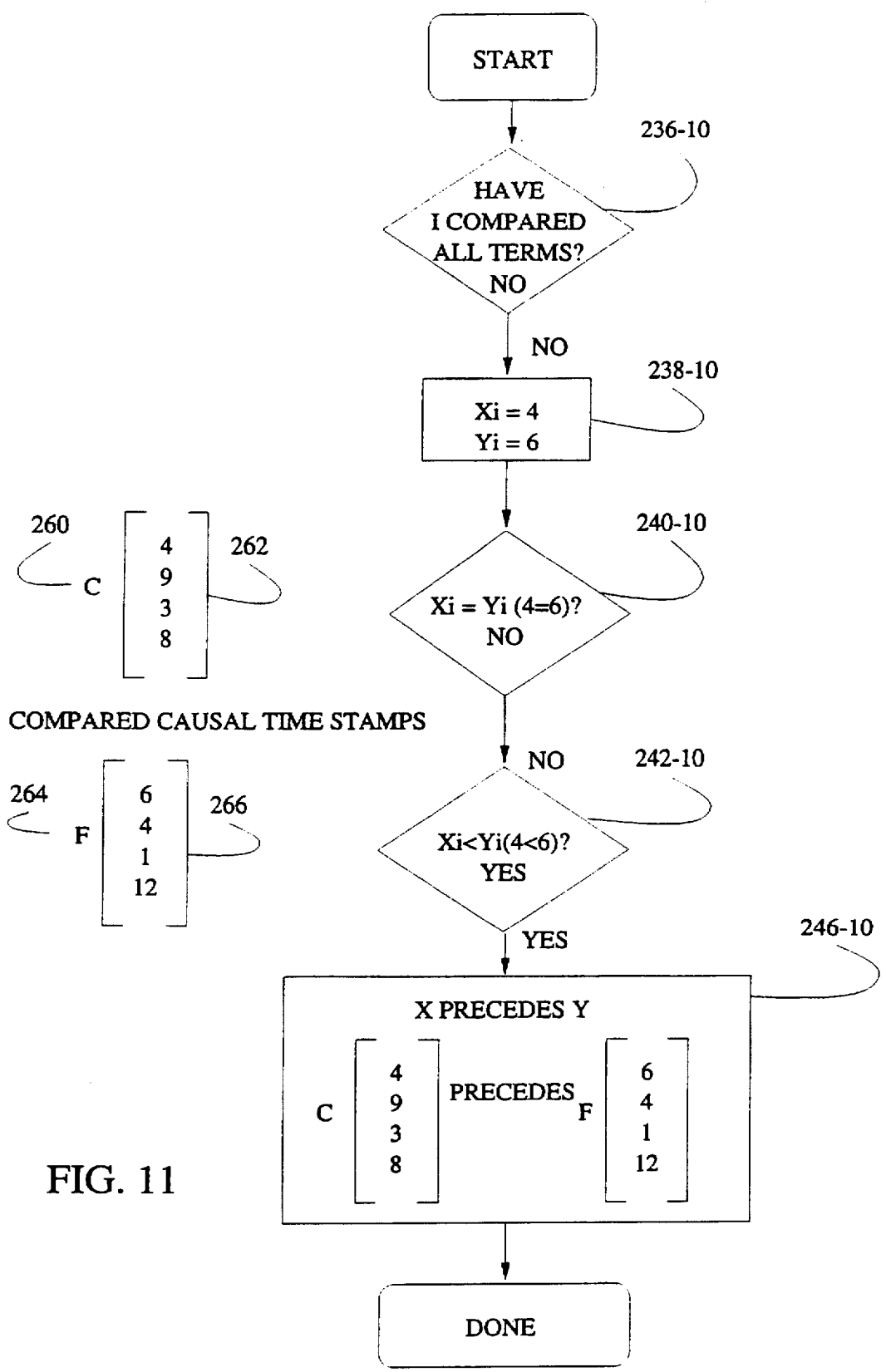
FIG. 11 illustrates another example of the process of FIG. 9.
Figure 12:
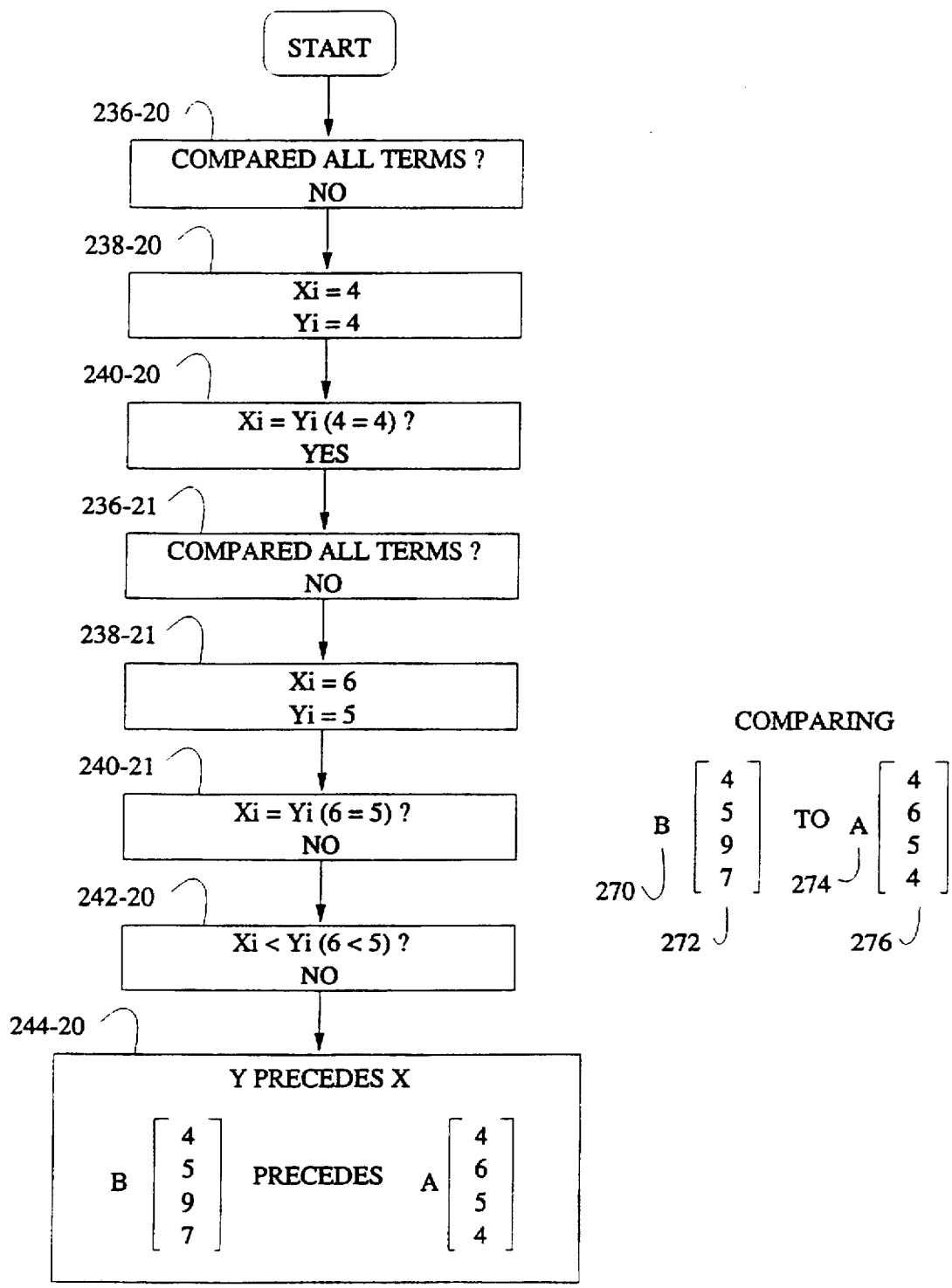
FIG. 12 illustrates yet another example of the process of FIG. 9.

FIGS. 10-12 illustrate examples of the method of FIG. 9. FIG. 10 is based on comparing the object request of process A with the object request of process C. As shown, the object request for process A only include the identity of process A 250 and its corresponding request causal time stamp 252. Similarly, the object request for process C only includes the identity of process C 254 and its corresponding request causal time stamp 256. The example begins at step 236-1 where a determination is made that all of the terms, or current request values, have not been compared. The example then proceeds to step 238-1 wherein it is determined that the current event values are $X_i=4$ and $Y_j=4$. Note that these current event values are the first entries in their respective request causal time stamps 252, 256. The example continues to step 240-1 where a determination is made as to whether $X_i=Y_j$. In this case, both equal 4, so the answer to this inquiry is yes. The example then continues to step 236-2 wherein the determination is made as to whether all terms, or current request values, have been compared.

The example proceeds to step 238-2 wherein the next respective current request values from the request causal time stamps 252, 256 are retrieved. In this case, both values are 6. The example continues to step 240-2 wherein a comparison is made between the retrieve current request values. As shown, both values are 6; thus, the answer to this inquiry is yes.

The example continues for the third current request values in the request causal time stamps 252, 256 at step 236-3. The example then proceeds to step 238-3 where the current request values are retrieved from the respective request causal time stamps. As shown, both values are 5. The example then continues to step 240-3 wherein a comparison between the retrieved current request values are equal; thus, the answer to this inquiry is yes.

The example continues to step 236-4 where a determination is made that not all of the terms, or current request values, of the respective request causal time stamps have been compared. The example proceeds to step 238-4 wherein the final terms are retrieved. As shown, the final term $X_i$ is 4 and the final term $Y_i$ is 4. The example continues to step 240-4 where it is determined that the retrieved terms $X_i$ and $Y_j$ are equal. The example continues to step 236-5 where a determination is made that all of the terms have been compared and all of the terms are indeed equal. Having made this determination, the example continues to Step 248-1 where a determination is made that X is less than Y. In this example, an alphabetic ordering was used such that X, which corresponds to process A, precedes Y, which corresponds to process C. As such, at Step 246 the object request for process A precedes, or has priority over, the object request for process C. Note that the example steps of FIG. 10 correspond with the steps of FIG. 9. For example, step 236 is referenced as 236-1, -2, -3, and -4, which indicates the four times that step 236 of FIG. 9 is executed in this example.

FIG. 11 illustrates another example of the method of FIG. 9. In this example, an object request for process C is compared to an object request for process F. As shown, the object request for process C includes the identity of process C 260 and its request causal time stamp 262. Likewise, the object request for process F is shown to include the identity of process F 264 and its request causal time stamp 266. The example begins at step 236-10 where a determination is made that not all of the terms, or current request values, of the request causal time stamps have been compared. The example continues at step 238-10 wherein the first terms are retrieved. As shown, the first term for process C ($X_i$) is 4, while the first term for process F ($Y_j$) is 6. The example continues at step 240-10 where it is determined that the terms are not equal. Having made this determination, the example proceeds to step 242-10 where it is determined that the retrieved term for process C is less than the retrieved term for process F. Therefore, at step 246-10 it is declared that the object request of X (process C) precedes, or has priority over, the object request of Y (process F).

FIG. 12 illustrates yet another example of the method of FIG. 9. In this example, an object request for process A is compared to an object request for process B. As shown, the object request for process A includes the identity of process A 270 and its request causal time stamp 272. Likewise, the object request for process B includes the identity of process B 272 and its request causal time stamp 276. The example begins at step 236-20, where it is determined that not all of the terms, or current request values, of the request causal time stamps have been compared.

The example continues at step 238-20 where the first terms of the respective request causal time stamps are retrieved. As shown, these values are both 4. The example then continues to step 240-220 where it is determined that the retrieved terms are indeed equal.

The example continues at 236-21 where it is determined that not all of the terms have been compared. Proceeding to step 238-21, where the retrieved terms are shown to be $X_i$ is 6 and $Y_i$ is 5. Note that for this example, X equates to process A and Y equates to process B. The example continues at step 240-21 wherein it is determined that $X_i$ does not equal $Y_i$. Having made this determination, the example proceeds to step 242-20, where it is determined that $X_i$ is not less than $Y_i$. Having made this determination, the example proceeds to step 244-20 where it is declared that the object request of Y (process B) precedes, or has priority over, the object request of X (process A).

Figure 13:
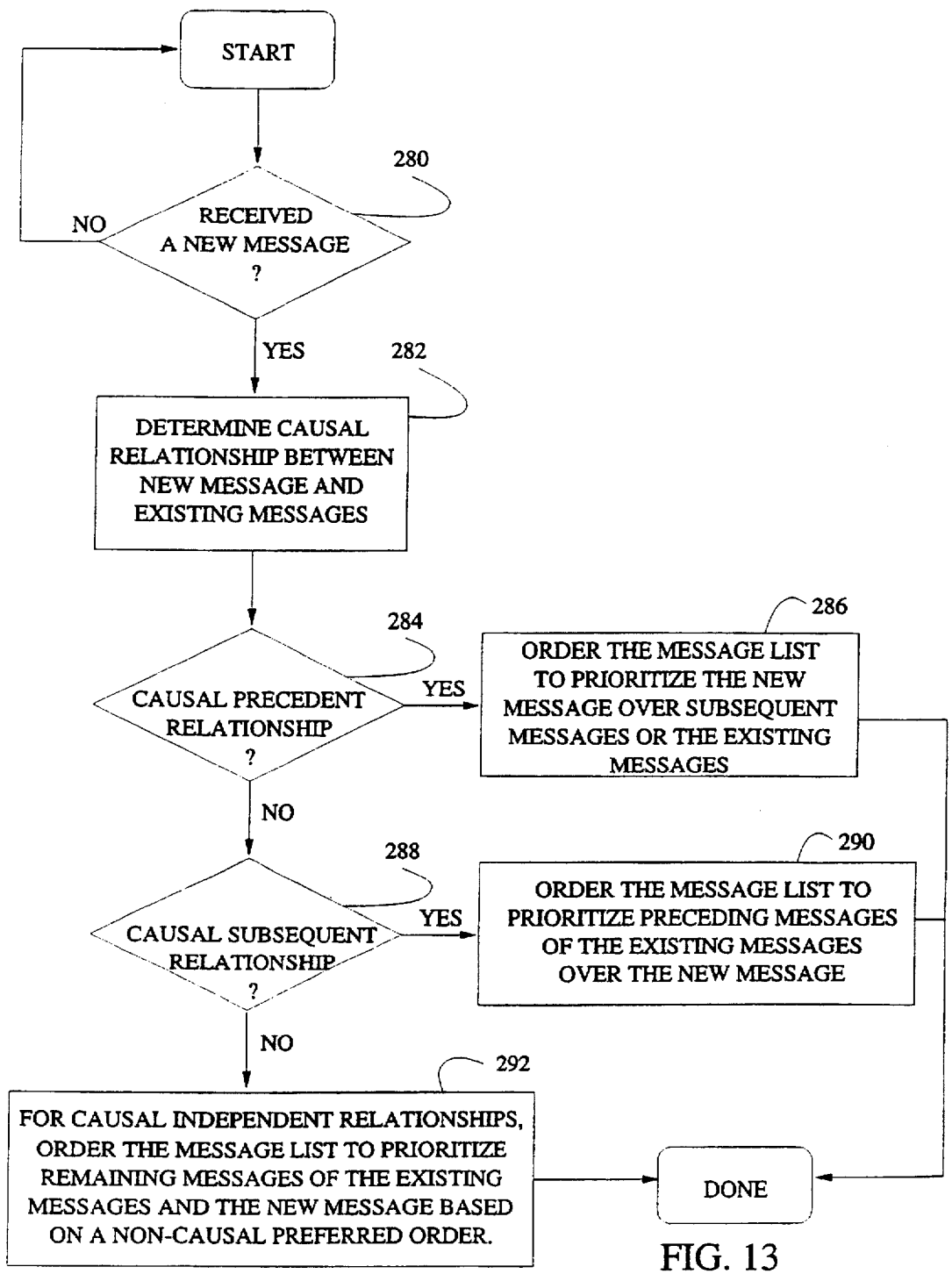
FIG. 13 illustrates a logic diagram of an overview method of establishing the message lists.

FIG. 13 illustrates a logic diagram that may be used to implement an alternate prioritizing technique of the grant causal list. The steps of FIG. 13 may be implemented using program instructions and stored on a processor, or computer, readable storage medium. The method begins at step 280, where a determination is made as to whether a new message is received. Once a new message is received, the method proceeds to step 282 where a determination is made as to the causal relationship between the new message and existing messages. The method then proceeds to step 284, where a determination is made as to whether the causal relationship is one of a causal precedent relationship. If yes, the process proceeds to step 286, wherein the message lists of the group of processes is ordered to prioritize the new message over subsequent messages of the existing messages.

At step 288, a determination is made as to whether the causal relationship is a causal subsequent relationship. If yes, the method proceeds to step 290, wherein the message lists of the group of messages is ordered to prioritize preceding messages of the existing messages over the new message. If the causal relationship is an independent relationship, the message lists are ordered to prioritize the remaining messages of the existing messages and the new messages based on a non-causal, or predetermined total, ordering. As mentioned, a predetermined total ordering may be based on an alphabetic ordering, a numerical ordering, alphanumeric character ordering, or any predetermined total ordering sequence.

Figure 14:
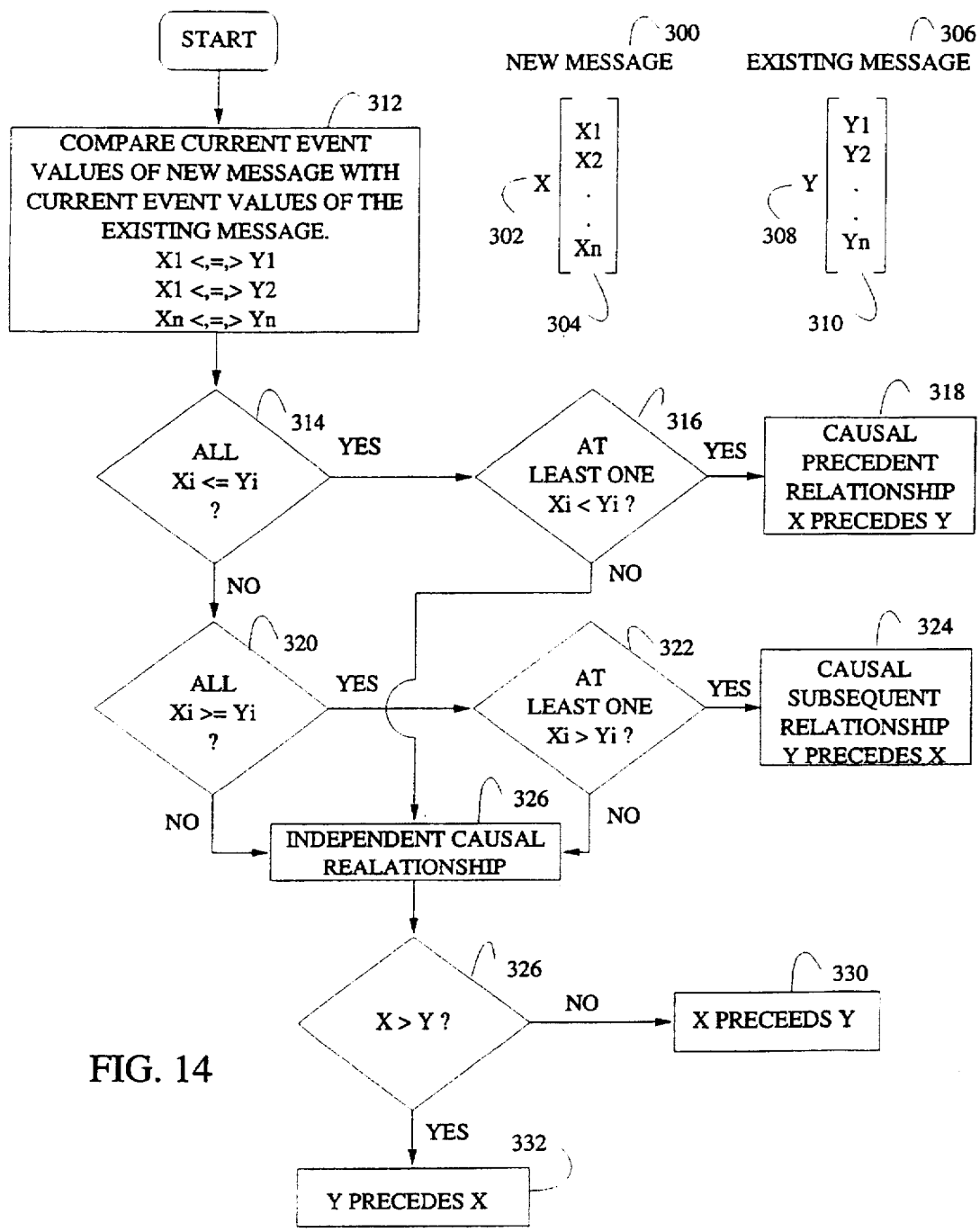
FIG. 14 illustrates a logic diagram of alternative method of ordering the message lists.

FIG. 14 illustrates a computational example of the method of FIG. 13. In this example, new message 300 is compared with existing message 306. The object request for new message 300 includes the identity of the new message 302 and its request causal time stamp 304. Likewise, the object request for the existing message 306 includes the identity of the existing message 308 and its request causal time stamp 310. The example begins at step 312 where the current event values of the request causal time stamp 304 of the new message are compared with the current event values of the request causal time stamp 310 of the existing message. The comparison determines whether the corresponding current event values are equal to, less than, or greater than each other.

The example proceeds to step 314, where a determination is made as to whether all of the current event values for the new message are less than the current event values for the existing message. If yes, the example proceeds to step 316, where a determination is made as to whether at least one of the current event values of the new message is less than its corresponding current event value of the existing message. If the answer to the inquiry at step 316 is yes, the example proceeds to step 318, where it is determined that a causal precedent relationship exists between the new message and existing message. In other words, the object request of the new message (X) precedes, or has priority over, the object request of Y (the existing message).

If the answer to Step 314 is "no", the example continues to step 320, where a determination is made as to whether all of the current event values of the new message are greater than or equal to all of the current event values of the existing message. If yes, the example proceeds to step 322, where a determination is made as to whether at least one of the current event values of the new message is greater than the corresponding current event value of the existing message. If the answer to this inquiry is yes, the example proceeds to step 324, where it is determined that a causal subsequent relationship exists. In other words, the causal subsequent relationship indicates that the existing message (Y) precedes, or has priority over, the new message (X).

If the answer to the determinations at steps 316, 320 or 322 is "no", the example proceeds to step 326 where it is determined that an independent causal relationship exists between the new message and the existing message. Having established this relationship, the process proceeds to step 328 to determine whether the identity of the new message is greater than the identity of the existing message. This determination is based on a non-causal ordering relationship such as numerical ordering, alphabetic ordering, alphanumeric ordering or any other type of prearranged ordering. If the identity of the new message (X) is greater than the identity of the existing message (Y), the example proceeds to step 332, where it is determined that the existing message precedes, or has priority over, the new message. If, however, X is not greater than Y, then the example proceeds to step 330, where it is determined that the new message precedes, or has priority over, the existing message.

Figure 15:
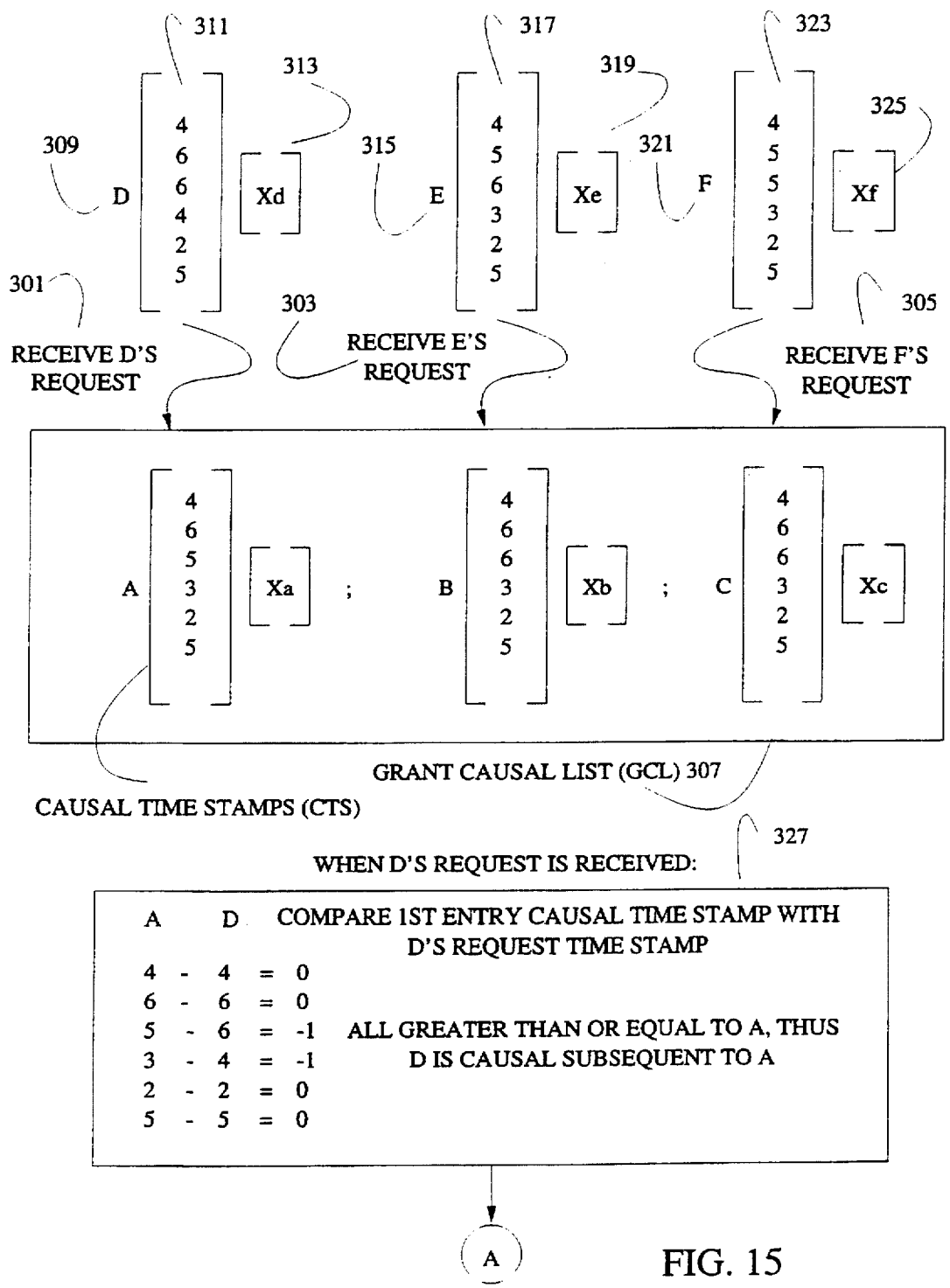
FIGS. 15–17 illustrate an example of the process of FIG. 14.
Figure 16:
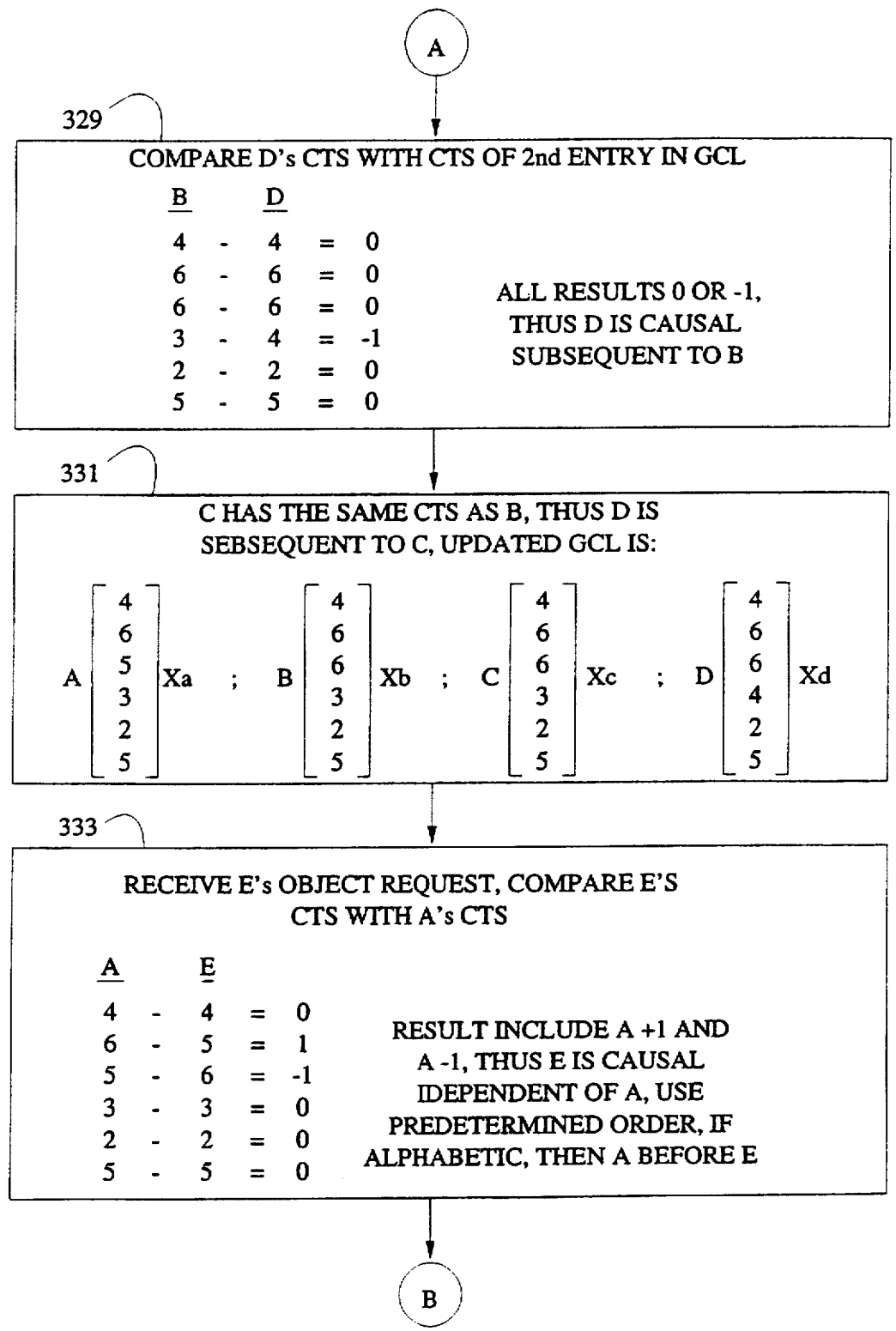
Figure 17:
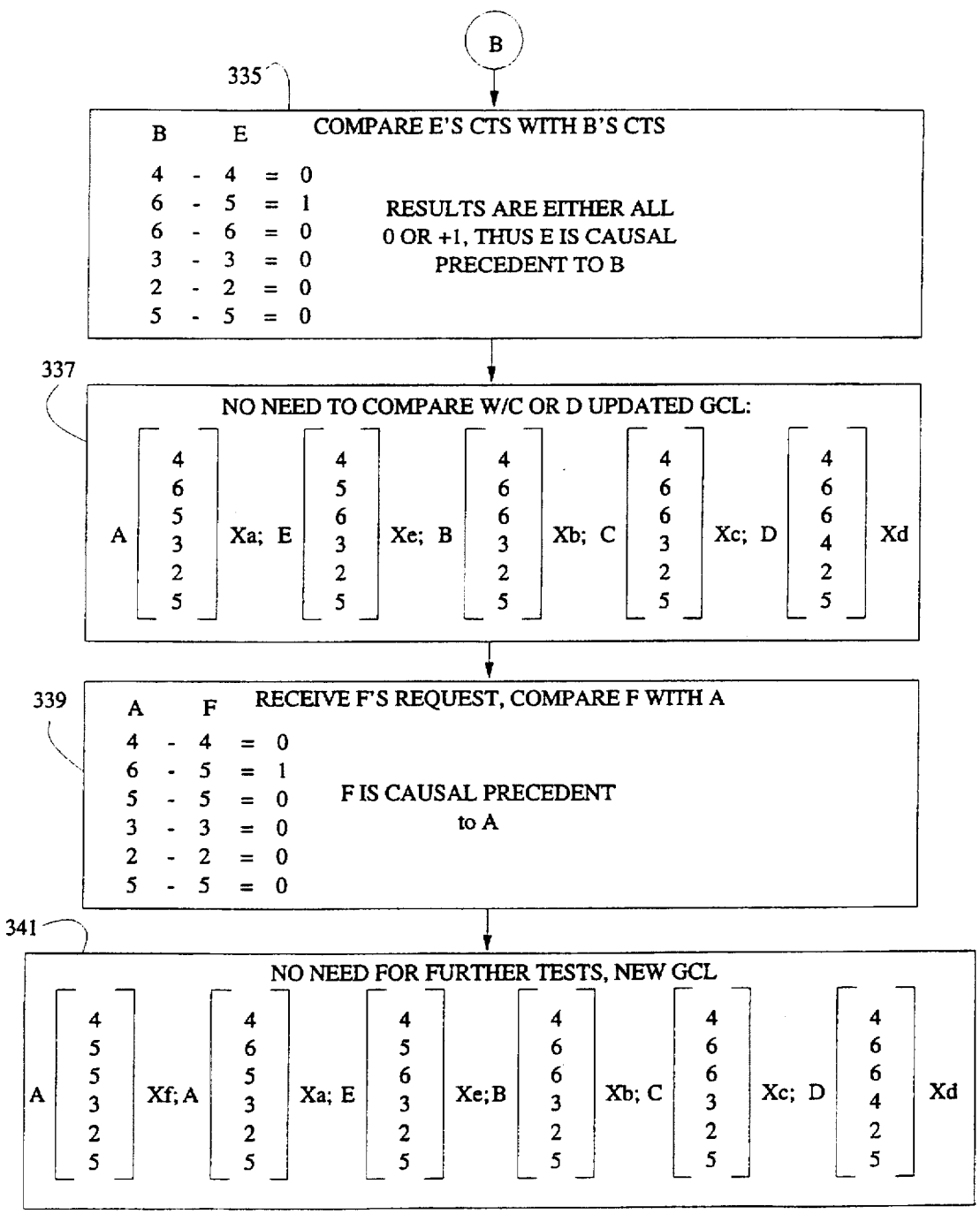

FIGS. 15-17 illustrate an example of the method of FIG. 13. As shown, three object requests are to be prioritized in the grant causal list. The object requests are for process D, process E, and process F. As shown, the object request for process D includes the identity of process D 309, its request causal time stamp 311, and the objects requested 313. The object request for process E includes the identity of process E 315, its request causal time stamp 317, and the requested objects 319. Likewise, the object request for process F includes the identity of process F 321, its request causal time stamp 323, and the objects being requested 325.

A grant causal list 307 is shown to include three existing object requests for process A, process B and process C. The prioritization is also shown to be that the object request for process A has priority over process B and the object request for process B has priority over the object request for process C. The object request for D, E, and F are being received as incoming object requests 301, 303, and 305.

The example continues when the object request for process D is received. Once this is received, a comparison is made between the first entry causal time stamp with request time stamp 327. In other words, the highest priority object request in the grant causal list is compared with the incoming object request. In this case, the object request for process A is compared with the object request with process D. Comparing each of the corresponding current request values in the request causal time stamps shows that all of the terms in the request causal time stamp for process D is greater than or equal to the corresponding terms in the request causal time stamp of process A. Therefore, the object request for process D is causally subsequent to the object request for process A; in other words, the object request for process A has priority over the object request for process D.

The example continues to FIG. 16, where a comparison between the request causal time stamp of process D is compared with the request causal time stamp of the second entry in the grant causal list 307. This comparison is shown at step 329 where the corresponding terms, or current request values, of the respective request causal time stamps are compared. As shown, all of the terms in the request causal time stamp of process D are greater than or equal to the corresponding terms of process B. Therefore, the object request for process D is causal subsequent to process B. Because the request causal time stamp for process C has the same request causal time stamp as process B, it is determined that D is also causal subsequent to process C. Therefore, the grant causal list is updated as shown at step 331. As shown, process A has the highest priority followed by B, C, and D. Note that process B has priority over process C even though they have the same request causal time stamps because of an alphabetic ordering.

The example continues at step 333 where the object request for process E is received and subsequently compared with the request causal time stamp of process A. As shown, the corresponding terms, or current request values, of the request causal time stamps for process A and process E have an independent causal relationship. As such, the predetermined ordering is used and based on an alphabetic ordering, the object request for A precedes the request for process E.

The example continues to FIG. 17 at 335 where the request causal time stamp for process E is compared with the request causal time stamp of process B. As shown, the terms, or current request values, of process B are greater than or equal to all of the corresponding terms in the request causal time stamp of process E. Therefore, the object request for process E is causal precedent to the object request for process B. Thus, the object request for process E has priority over the object request for process B. The example continues at step 337 where it is indicated there is no need to compare the object request of process E with the object requests for C or D, because it is determined that the object request for process E falls between the object request for process A and process B. Thus, the grant causal list is updated to include the ordering as shown in which the object request for process A has the highest priority followed by the object requests for processes E, B, C, and D.

Finally, at 339, the object request for process F is received and compared with the object request of process A. The comparison between the request causal time stamps shows that all of the terms, or current request values, of the request causal time stamp of A are greater than or equal to the corresponding terms of the request causal time stamp for process F. As such, a determination is made that the object request for process F has a causal precedent relationship to the object request of process A. Therefore, the object request for process F has priority over the object request for process A.

The updated grant causal list is shown at 341. Because the object request of process A had the highest priority prior to receiving the object request of process F, there is no need for subsequent comparisons between the request causal time stamp of process F with any of the other object requests in the grant causal lists. Thus, the resulting grant causal list has the object request for process F having the highest priority followed in a priority sequence by the object requests of processes A, E, B, C, and D.

Figure 18:
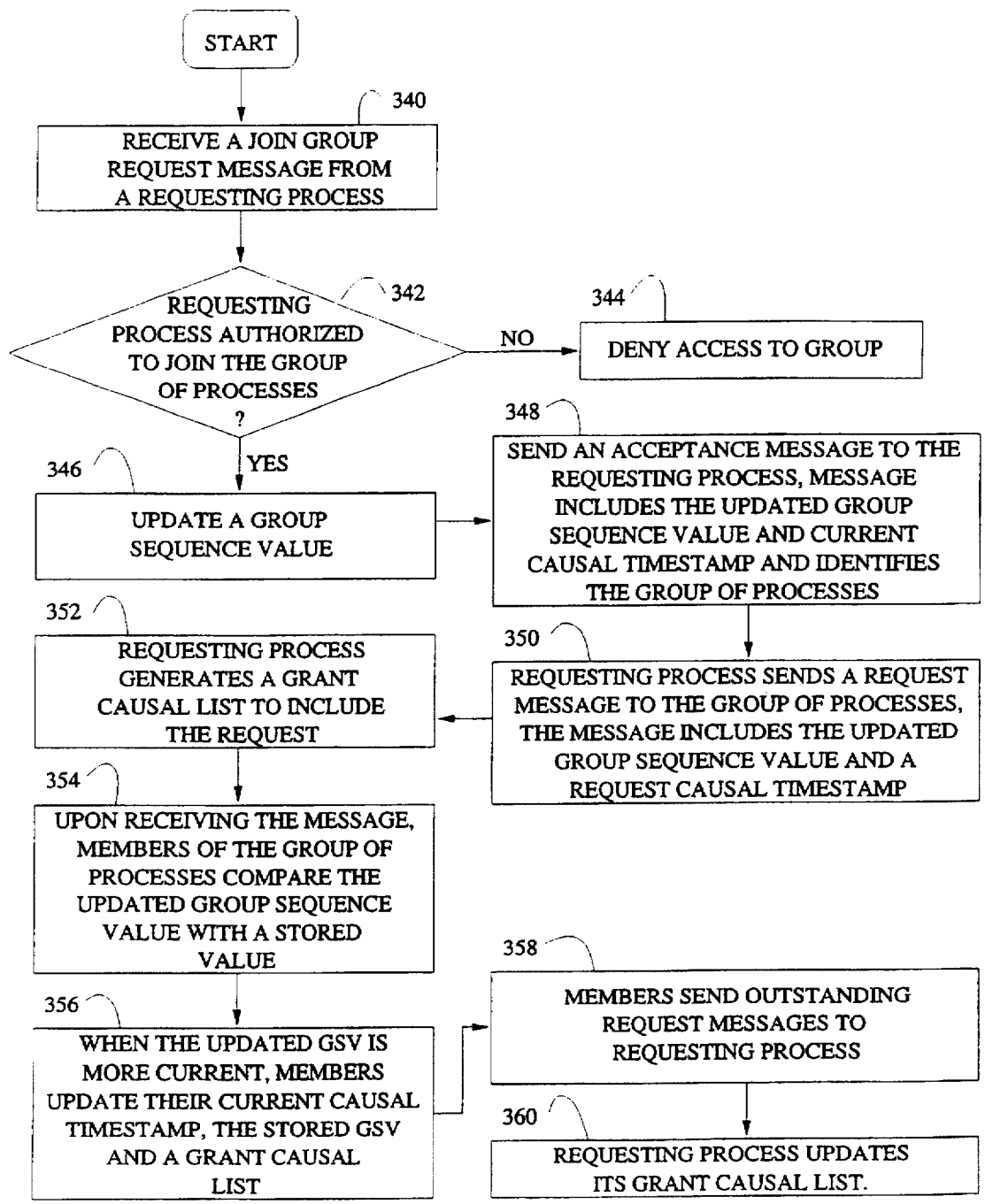
FIG. 18 illustrates a logic diagram for adding a process to the group of processes in accordance with the present invention.

FIG. 18 illustrates a method which may be utilized to add a process to the group of processes. The steps of FIG. 18 may be implemented as programming instructions which may be stored on a processor, or computer, readable storage medium. The method begins at step 340 where a group controller receives a join group request from a requesting process. The method then proceeds to step 342, where a determination is made as to whether the requesting process is authorized to join the group of processes. If not, the method proceeds to step 344, wherein access to the group is denied.

If, however, the requesting process is authorized to join the group of processes, the method proceeds to step 346, wherein a group sequence value is updated by the group controller. The group sequence value indicates changes in group membership and is used by the members of the group to identify when changes have been made to the group. Once the group sequence value is updated, the process proceeds to step 348, where an acceptance message is sent from the group controller to the requesting process. The acceptance message includes the updated group sequence value, the current causal time stamp as known by the group controller, and identifies each of the members in the group of processes.

At any time while a member of the group, the requesting process may send a request message to the group of processes. The request message will include its updated group sequence value, and a request causal time stamp known by the requesting process. For example, if the purpose of the message is to request objects, the set of the needed objects would be listed. The method then proceeds to step 352 wherein the requesting process generates a grant causal list to include the request that it had just created.

The method then proceed to step 354 where, upon receiving the message, existing members of the group of processes compare the updated group sequence value with a stored group sequence value. When the updated group sequence value is more current than the stored group sequence value, each of the existing members updates their current causal time stamp, based on the request causal time stamp of the requesting process, the stored group sequence value and a grant causal list. This is done at step 356.

The process then proceeds to step 358 where existing members of the group send outstanding request messages to the requesting process. Thus, if an existing member of the group has an object request that has not been fulfilled, the existing member sends the object request to the newly entering, or requesting process. The method then proceeds to step 360 wherein the requesting process updates its grant causal list to include each of the outstanding request messages it receives from other processes. Once this has transpired, the requesting process has the same grant causal list as all the other existing members. It should be noted that in order to guarantee advance progress, to avoid deadlock and to avoid inconsistencies, each of the processes must have the same prioritization in their respective grant causal list. The previously described methods insure that each of the members of the group of processes will have the same grant causal list. As one skilled in the art will readily appreciate, the members of the group of processes will not simultaneously generate the grant causal list or, at any given time, have exactly the same information in their grant causal list; but when it comes time to transmit or allocate an existing object, it will do so based on a grant causal list which corresponds to the other members in the group.

Figure 19:
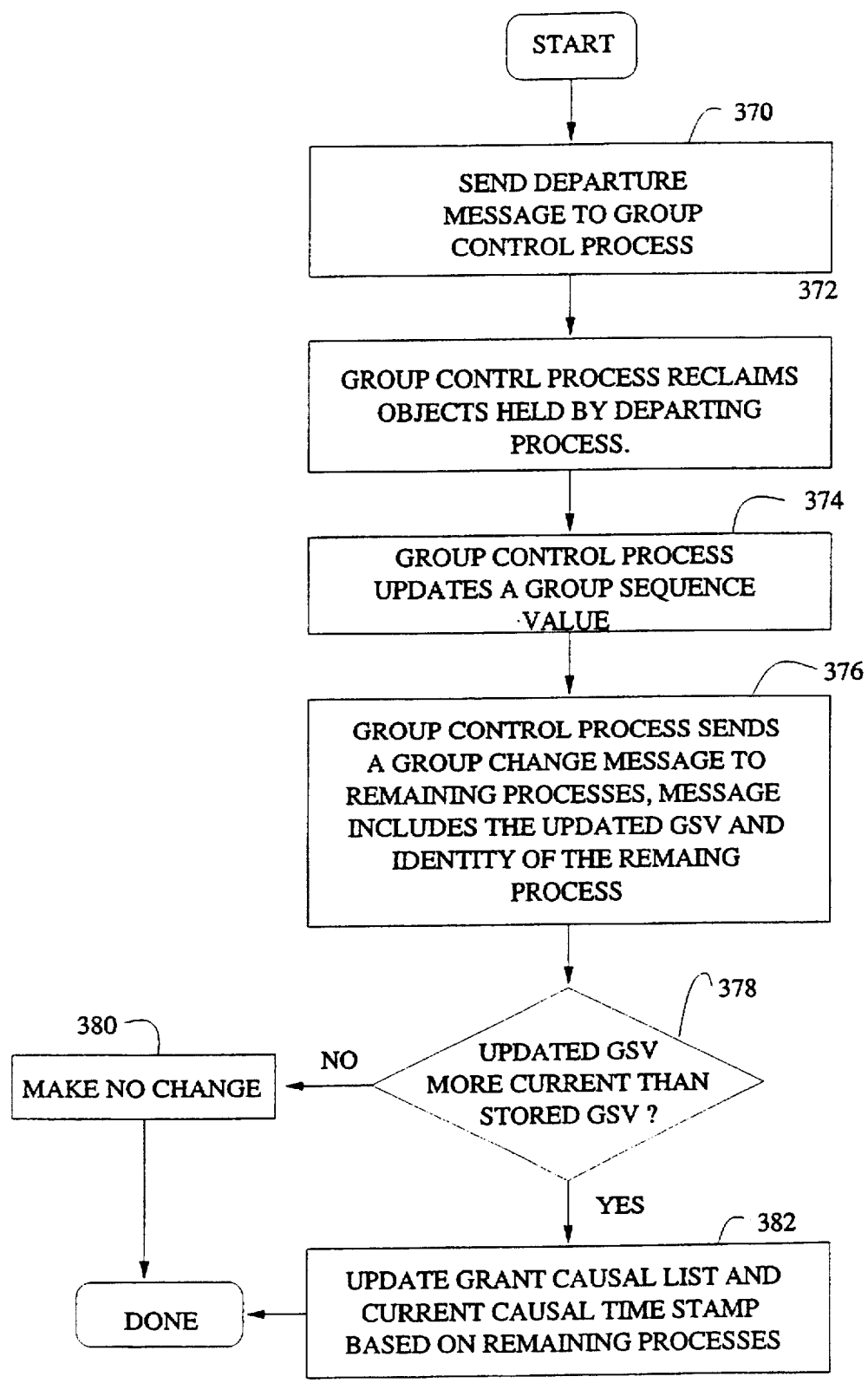
FIG. 19 illustrates a logic diagram for removing a process from the group of processes in accordance with the present invention.

FIG. 19 illustrates a method for a process to leave a group of processes. This method may be implemented by program instructions that can be stored on a processor, or computer, readable storage medium. The method begins at step 370 where a process sends a departure message to the group process controller. The method then proceeds to step 372 wherein the group control process reclaims objects held by the departing process. For example, if the departing process holds objects 1, 2, and 3, these must be relinquished to the group control process such that objects are not taken out of the group and may be subsequently reallocated by the group control process.

The method continues at step 374 wherein the group control process updates a group sequence value. As mentioned with reference to FIG. 18, the group sequence value is updated any time the membership to the group of processes is changed. Thus, when a member enters the group or departs the group, the group sequence value is updated. At step 376, the group control process sends a group change message to the remaining processes. This message includes the updated group sequence value and identity of the remaining processes. Note that the group change message includes the identity of the remaining processes and not the identity of the process departing. This is done to insure that an accurate record is kept by each of the participating members of the group.

At step 378, a determination is made by each of the remaining members of the group as to whether the updated group sequence value is more current than the stored group sequence value. Note that the updated group sequence value may be done by incrementing such that the number 5 is more current than the number 4. If the determination at step 378 is "no", the process proceeds to Step 380 where no change is made to the membership of the group as known by the requesting unit. If, however, the updated group sequence value is more current than the stored group sequence value, the method proceeds to step 382 wherein the existing processes update the grant causal list and a current causal time stamp based on the remaining processes. Determining that the updated group sequence value is more current than the stored one is done to insure that regardless of which order the messages are received, the existing members will know which is the most current data. For example, a group may enter and leave the group of processes rather quickly. Thus, a process may receive the departure message before it receives the update message. Thus, an error could result if a departing process is identified as leaving before it's identified as entering. Such a situation could occur if the departing message was received before the entering message. Without the group sequence number, a member of the group of processes would ignore the departing message because it couldn't identify the departing process, but it would record the process when the entering message is received resulting in an error in membership. The group sequence value insures that this will not happen because it is updated each time the membership changes making it irrelevant which message is received first.

Figure 20:
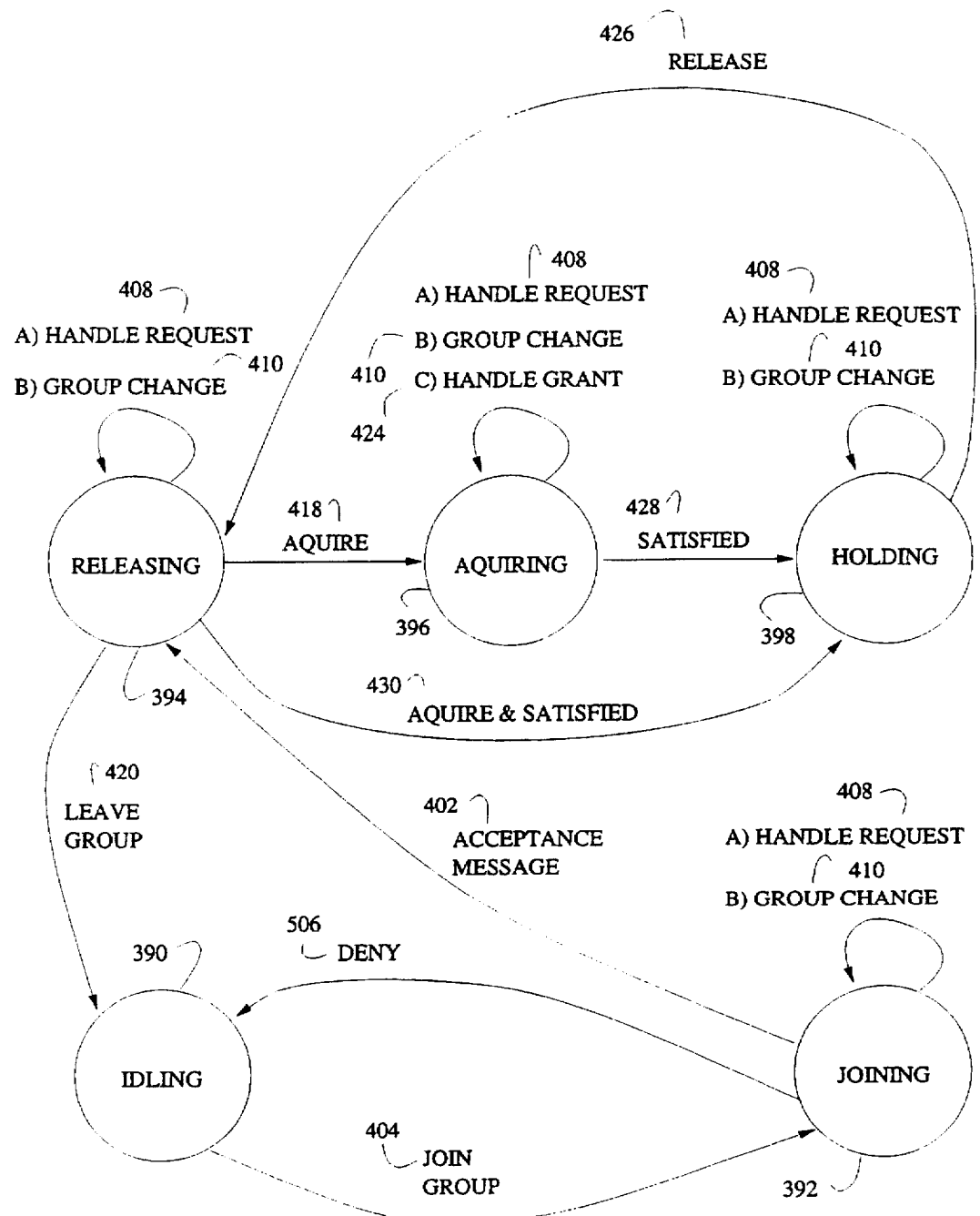
FIG. 20 illustrates a state diagram of a process in accordance with the present invention.

FIG. 20 illustrates a deterministic state diagram for a process of the group of processes in accordance with the present invention. The particular states are idling 390, joining 392, releasing 394, acquiring 396, and holding 398. As shown, certain actions may be executed by a process when in a particular state upon receiving the appropriate event. An event may be initiated by the client side of a processing unit (see FIG. 1) or from another process (see the object allocation section of FIG. 1).

In the idling state 390, a process is not yet a member of the group but may execute a join group request 404 when triggered by an event requesting the process to join the group. Such an event may be initiated by the client side of the processing unit (see FIG. 1). The join group request 404 may be performed as shown in steps 340 and 342 of FIG. 18. Once the join group request 404 has been initiated, the process changes states to the joining state 392.

While the process is in the joining state 392, the process may encounter events causing the process to have its join request denied 406, to handle a request 408, to handle a group change 410, or to receive an acceptance message 402. If the process' join group request is denied 406 by the group controller (see FIG. 1), steps 342 and 344 of FIG. 18 will be executed and the process will return to the idling state 390. If, however, the group controller grants the process' join group request, an acceptance message 402 will be generated as per step 348 of FIG. 18 and the process will move to the releasing state 394. While the process is waiting for its join group request to be granted or denied, it may encounter an event causing it to handle an object request 408 by executing steps 206–212 of FIG. 4. Such an event is initiated by another process, in which the other process is requesting a set of objects. After handling the request, the process remains in the same state. Additionally, the process, while waiting for a response to its join group request, may encounter an event causing it to handle a group change as shown in steps 376–382 of FIG. 19. Such an event is initiated by the group controller when another process leaves the group. After handling the group change, the process remains in the same state.

In the releasing state 394, the process may encounter events causing it to handle object requests 408, handle a group change 410, leave the group 420, or acquire objects 418 or 430. If the process encounters an event requesting the process to leave the group 420, the process executes steps 370 and 372 of FIG. 19 and returns to the idling state 390. Such an event is initiated by the client side of the processing unit (see FIG. 1). If the process encounters an event requesting it to acquire objects, the process does so either over acquire path 418 or acquire and satisfied path 430. The process will use acquire path 418 when it does not currently possess all of the requested objects. To acquire objects over this path 418, the process performs steps 162–172 of FIG. 4 and changes to the acquiring state 396. The process will use the acquire and satisfied path 430 when it possesses all of the requested objects. To traverse this path 430, the process executes steps 162–166 and 192–194 of FIG. 4 and changes to the holding state 398.

When the process is in the acquiring state, it may encounter events causing its object request to be satisfied 428, handle object requests 408, handle group changes 410, or handle an object grant 424. If the process' object request is satisfied per path 428, it executes steps 188–194 of FIG. 4 and it changes to the holding state 398. Handling object requests 408 and group changes 410 are done as described above. To handle an object grant 424, the process performs steps 180–186 of FIG. 4 and remains in the acquiring state 396.

Once the process has acquired all of the needed objects, either through acquire path 430 or acquire paths 418 and 428, the process enters the holding state 398. While in this state, the process may encounter events causing it to handle requests 408, handle group changes 410, or release objects 426. If an event causes the process to release objects 426, the process performs the steps 196–200 of FIG. 4 and the process changes to the releasing state 394. As mentioned, in the releasing state 394, the process may encounter events causing it to leave the group 420, handle requests 408, handle group changes 410, or acquire objects.

FIGS. 21–46 illustrate an example of the present invention. The example is based on a hospital system wherein the hospital system includes a hospital administrator, a pharmacy, a doctor's office, patients' rooms, and operating rooms. Each of these entities have a computer system which facilitates the sharing of objects as described above with reference to FIGS. 1–20. The example of FIGS. 21–46 illustrates the sharing of objects among the hospital network for a particular patient. The example begins with a visit to the doctor's office, followed by a trip to the pharmacy, and ending with surgery.

Figure 21:
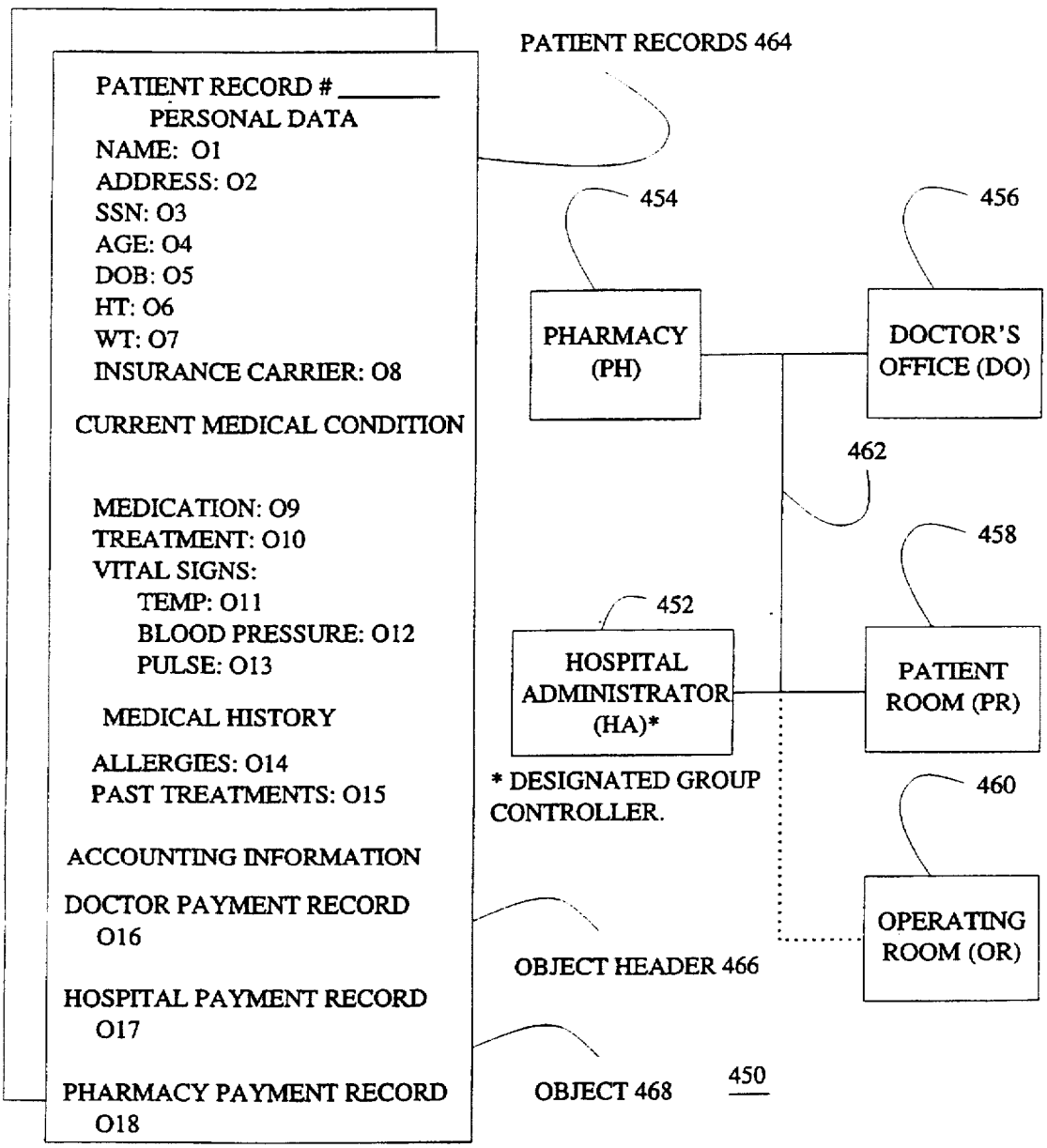
FIG. 21 illustrates an example of the present invention in the context of a hospital facility.

FIG. 21 illustrates a hospital distributed computed system 450 which includes a hospital administrator system 452, a pharmacy system 454, a doctor's office system 456, patient room system 458, and operating room system 460 interconnected by a distributed network 462. Note that the operating room is shown as a dotted line connection to the other systems. This is done to illustrate that the operating room 460 is subsequently added to the group and then deleted from the group. Thus, at the beginning of this example, a group of processes includes the hospital administrator 452, the pharmacy 454, the doctor's office 456, and the patient's room 458.

The objects to be shared are contained in a plurality of patient's records 464. Each of the patient's records includes object headers 466 and objects 468. For example, an object header is personal data wherein the objects are the patient's name, address, serial number, age, birth date, height, weight, and insurance carrier. Another object header is current medical condition, wherein the associated objects are medication, treatment, and vital signs, which include temperature, blood pressure and pulse. Another object header is medical history, which includes the objects of allergies and past treatments. Finally, an accounting information object header includes the objects of doctor payment records, hospital payment records, and pharmacy payment records.

FIG. 22 illustrates the individual process information known by the doctor's office 470, the pharmacy 472, the hospital administrator 474, and the patient's room 476 at a given time for a particular patient's record. As shown, the doctor's office process 470 includes a current causal time stamp 478, a grant causal list 480, group sequence number 482, a needed set 484, and a possession set 486. The pharmacy, hospital administrator, and patient's room all include a causal time stamp 488, 498, 508, grant causal list 490, 500, 510, group sequence 492, 502, 512, needed set 494, 504, 514, and a possession set 496, 506, 516.

As can be seen, each process has the same current causal time stamp 478, 488, 498, 508, the same information in the grant causal list 480, 490, 500, 510, the same group sequence number 482, 492, 502, 512, and the same need set 484, 494, 504, 514. With each of the need sets being 0, it is indicative that none of the associated processes have any outstanding object requests. The possession sets are shown to have different information.

Figure 23:
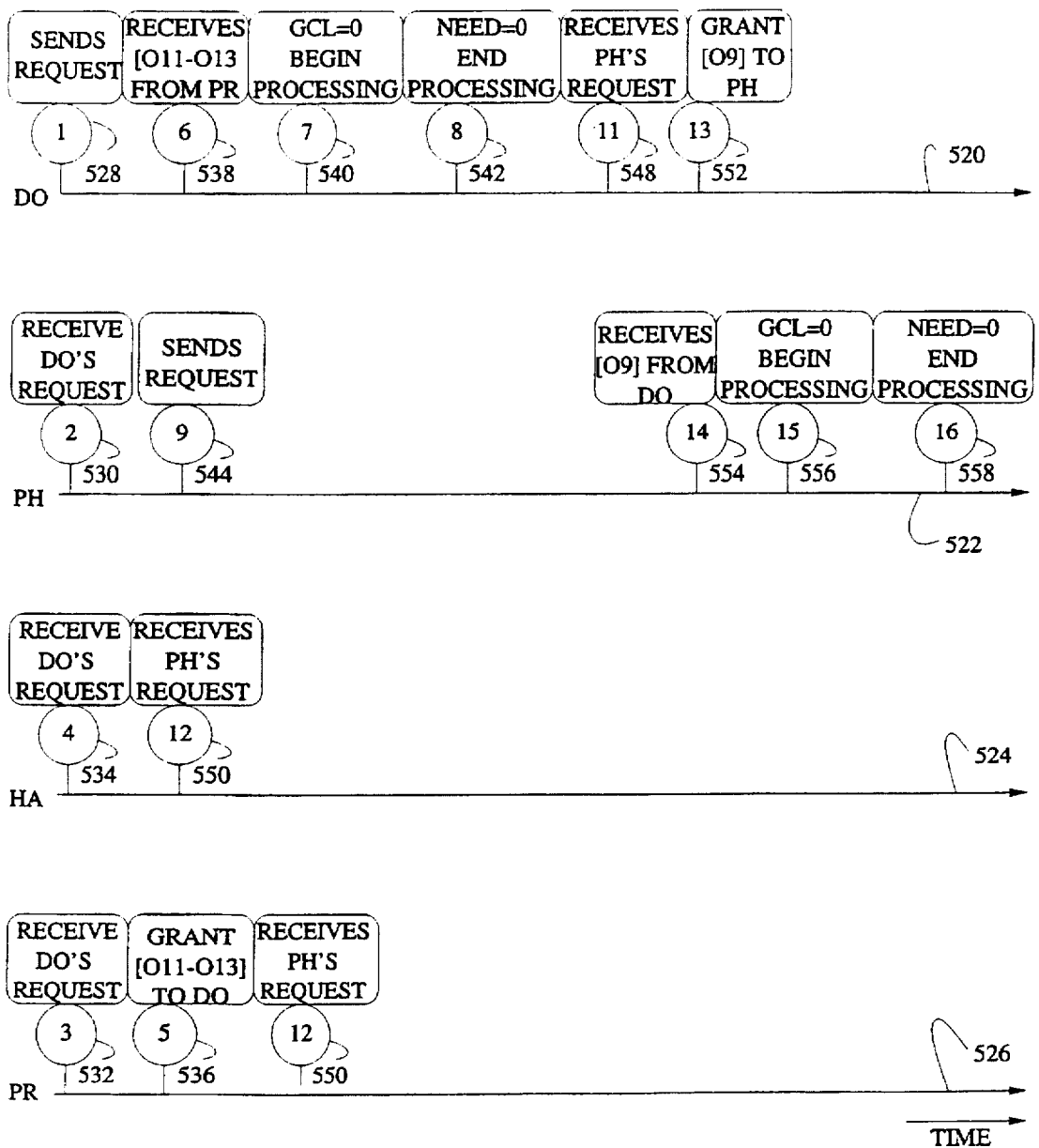

FIG. 23 illustrates the response to the doctor's office request for objects related to the particular patient. In this example, the doctor is examining the particular patient. As shown, at time one 528, the doctor's office transmits its object request. At time two 530, the pharmacy receives the doctor's office object request, as is true at times three 532 and four 534 for the patient's room and hospital administration, respectively. The corresponding steps of the time line are further described in FIGS. 24–30. The corresponding times on the time line of FIG. 23 are discussed in greater detail with reference to FIGS. 24–30.

Figure 24:
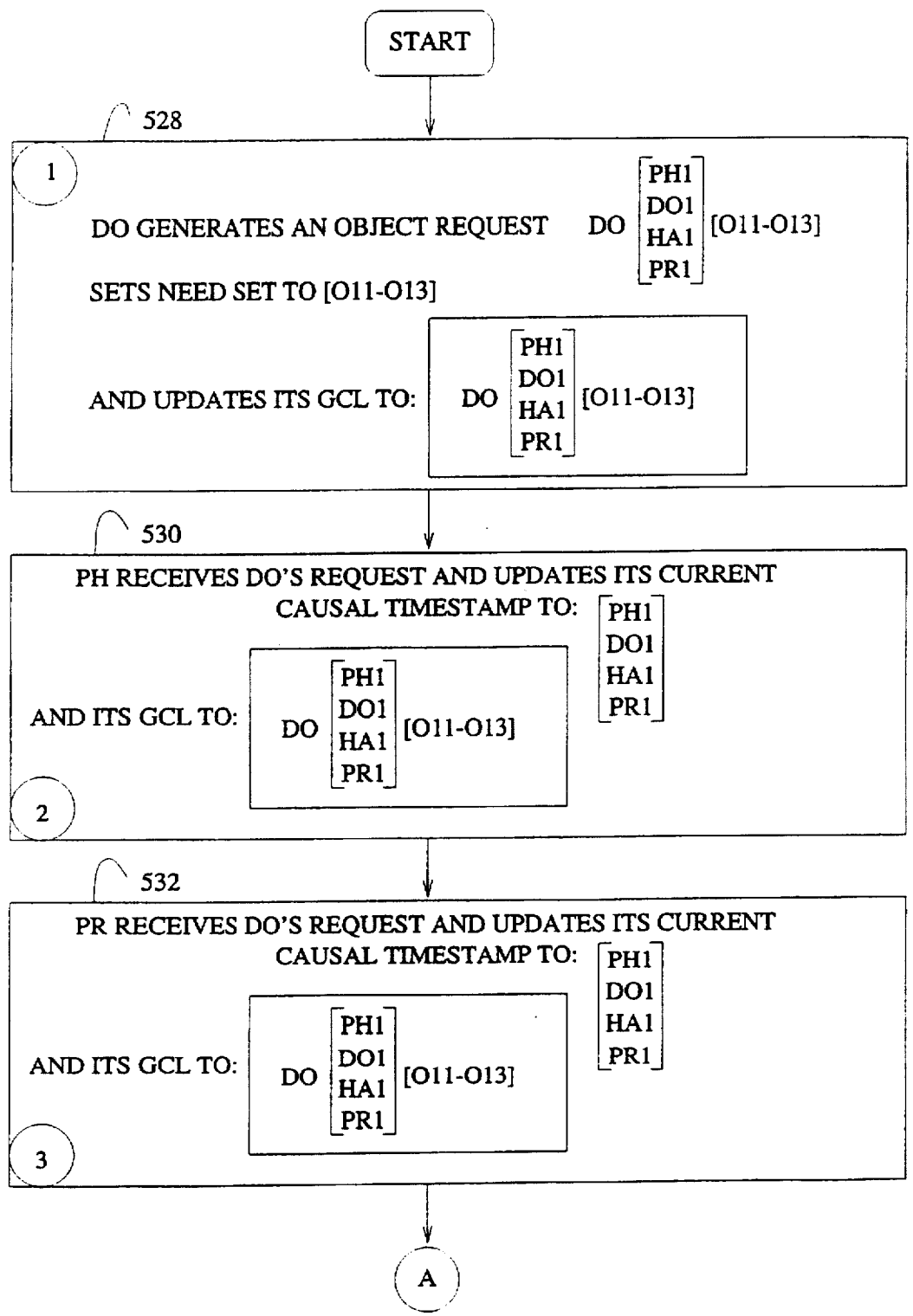
Figure 25:
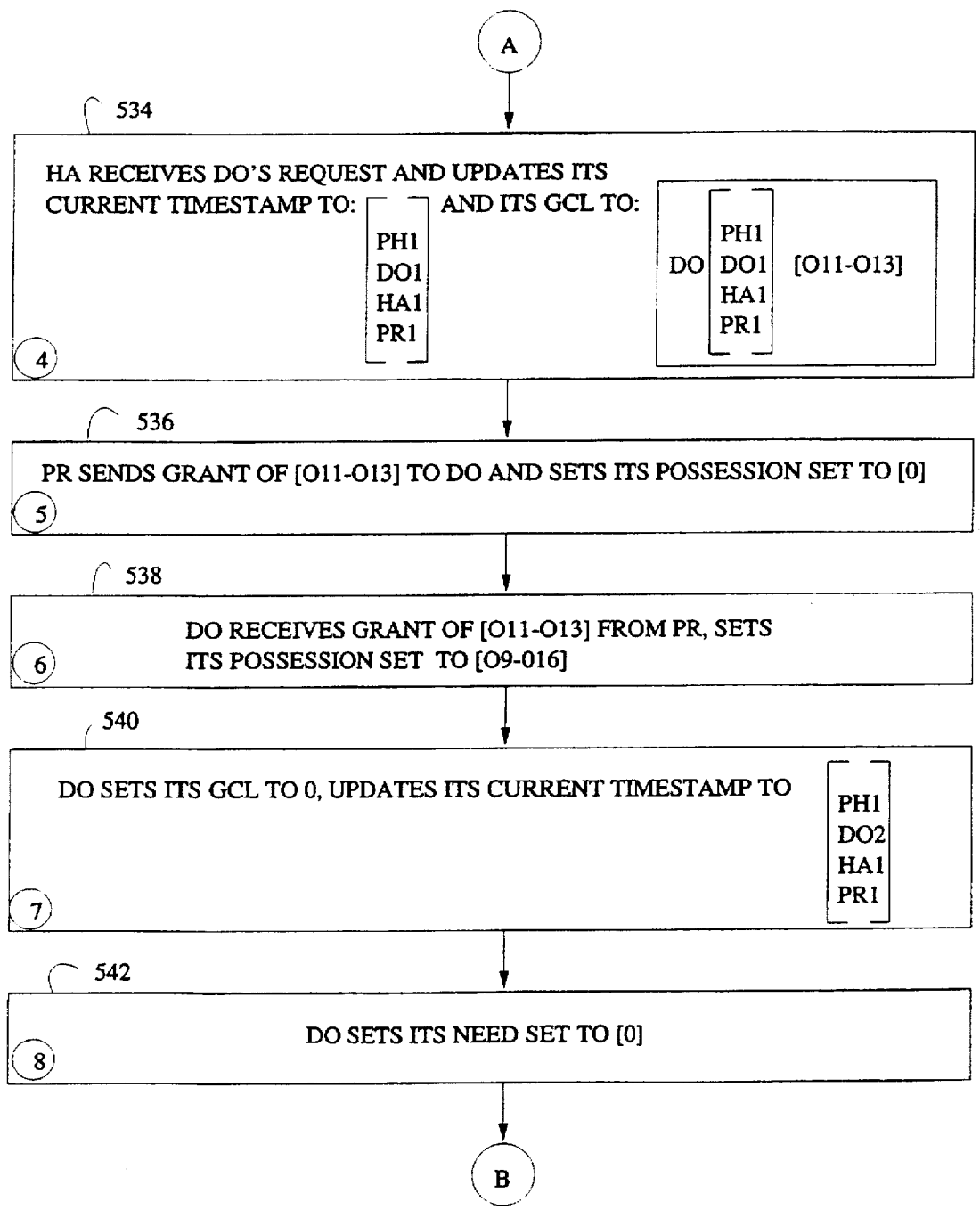

Referring to FIG. 24, at time T1, step 528, the doctor's office D0 generates its object request. As shown, the object request includes the identity of the doctor's office, a request causal time stamp which equals the current causal time stamp known by D0 at the time the request was formulated, and the needed objects. In addition, D0 sets its need set to objects {11–13} and updates its grant causal time list to include its object request. At time T2, step 530, the pharmacy PH receives the doctor's office request and updates its current causal time stamp to PH1, D01, HA1, PR1, and its grant causal list to include the doctor's office request. Note that the updated current causal time stamp has not changed. This occurs because the current request values of the request causal time stamp of the doctor's office object request is the same or less than the corresponding current value current request values stored in the current causal time stamp of the pharmacy.

At time T3, step 532, the patient's room receives the doctor's office request and updates its current causal time stamp to PH1, D01, HA1, PR1. It also updates its grant causal list to include the doctor's office object request. The example continues at FIG. 25 where, at T4, step 534, the hospital administrator (HA) receives the doctor's office request and updates its current time stamp to PH1, D01, HA1, PR1, and updates its grant causal list to include the doctor's office object request.

At time T5, step 536, the patient's room sends an object grant of objects {11–13} to the doctor's office and sets its possession set to 0. At time T6, step 538, the doctor's office receives the object grant from the patient's room and sets its possession set to objects {9–16}. At time T7, step 540, the doctor's office sets its grant causal list to 0 indicating that its outstanding object request has been satisfied. In addition, the doctor's office increments its own current request value from 1 to 2 and subsequently updates its current time stamp to PH1, D02, HA1, PR1. For any subsequent responses by the doctor's office, it will use this current time stamp.

The doctor's office computer system now may utilize these objects. For example, assume that the doctor determines that the patient's medication needs to be changed. As such, object 9, patient's medication, would be changed to identify the new medication. In addition, the doctor's office would update the patient's billing statement to include fees for this visit. Still further, the doctor's office may update the vital sign objects. Having made this changes, the doctor's office computer moves out of the holding state and enters the releasing state (refer to FIG. 20 for an explanation of the states). At time T8, step 542, the doctor's office sets its need set to 0.

Figure 26:
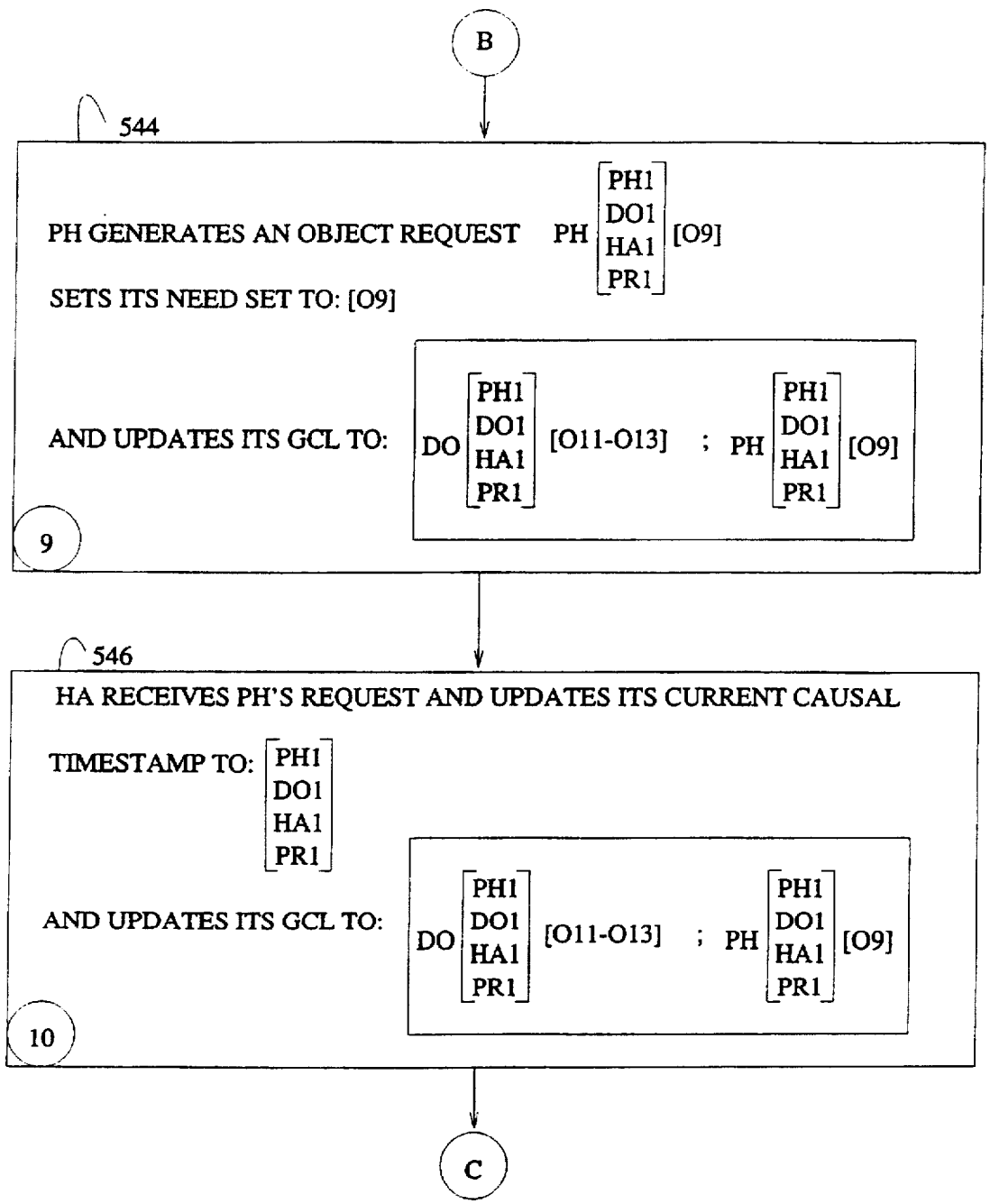

The example continues on FIG. 26 at time T9, step 544, wherein the pharmacy generates an object request in response to the patient's medication being changed. The object request of the pharmacy includes the identity of the pharmacy PH, its request causal time stamp PH1, D01, HA1, PR1, and the objects it needs. Note that the request causal time stamp for the pharmacy is indicative, or identical, to its current causal time stamp known to the pharmacy at the time the object request is generated. In addition to generating the object request, the pharmacy sets its need set to include object 9 and it updates its grant causal list to include its request along with the doctor's office request.

The prioritization of the grant causal list is first based on a predetermined ordering of the causal time stamps. At this step 544, the causal time stamps are equal. When this occurs, the prioritization is based on the predetermined total ordering (e.g. alphabetical ordering) of the names of the outstanding object requests. In this case the doctor's office request precedes the pharmacy request because D precedes P in the alphabet.

At time T10, step 546, the hospital administration receives the pharmacy's request and updates its current causal time stamp to PH1, D01, HA1, PR1. In addition, the hospital administration updates its grant causal list to include the pharmacy's request along with the doctor's office request. Note that the ordering in the hospital administration's grant causal list is the same ordering as the grant causal list of the pharmacy. This is due to the fact that each of the processes in the group utilize the same total ordering procedure to prioritize their respective grant causal list. This insures that each of the members in the group of processes have the same grant causal list.

Figure 27:
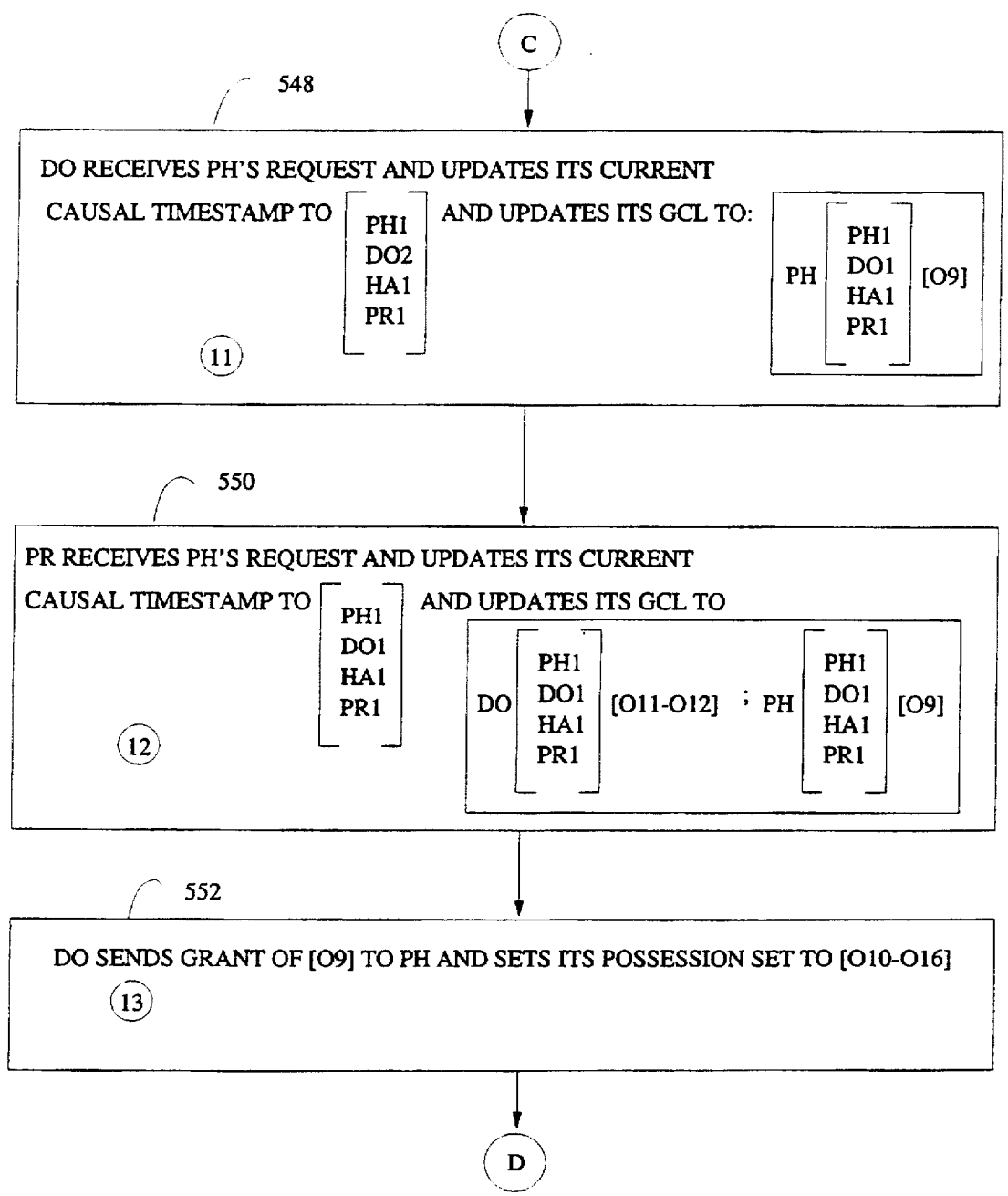

The example continues on FIG. 27 at time T11, step 548, wherein the doctor's office receives the pharmacy's request and updates its current causal time stamp. In addition, the doctor's office updates its grant causal list to include the request of the pharmacy. Note that the only object request in the doctor's office grant causal list is the pharmacy's request. This results because the doctor's office has already invalidated its object request because it has been satisfied. However, the other members of the group have not yet been informed that the doctor's office outstanding request has been satisfied. This will occur when the doctor's office transmits an object grant or object request which includes its updated current request value.

At time T12, step 550, the patient's room receives the pharmacy's request and updates its current causal time stamp to PH1, D0, HA1, PR1. In addition, the patient's room updates its grant causal list to include the doctor's office object request and the pharmacy's object request. As with the grant causal list of the hospital administration's process, and the pharmacy's process, the grant causal list of the patient's room prioritizes the doctor's object request over the pharmacy's object request. At time T13, Step 552, the doctor's office sends a grant of object 9 to the pharmacy. The object grant includes the particular object and the current causal time stamp of D0 which is PH1, D02, HA1, and PR1. In addition, the doctor's office sets its possession set to objects {10–16}.

Figure 28:
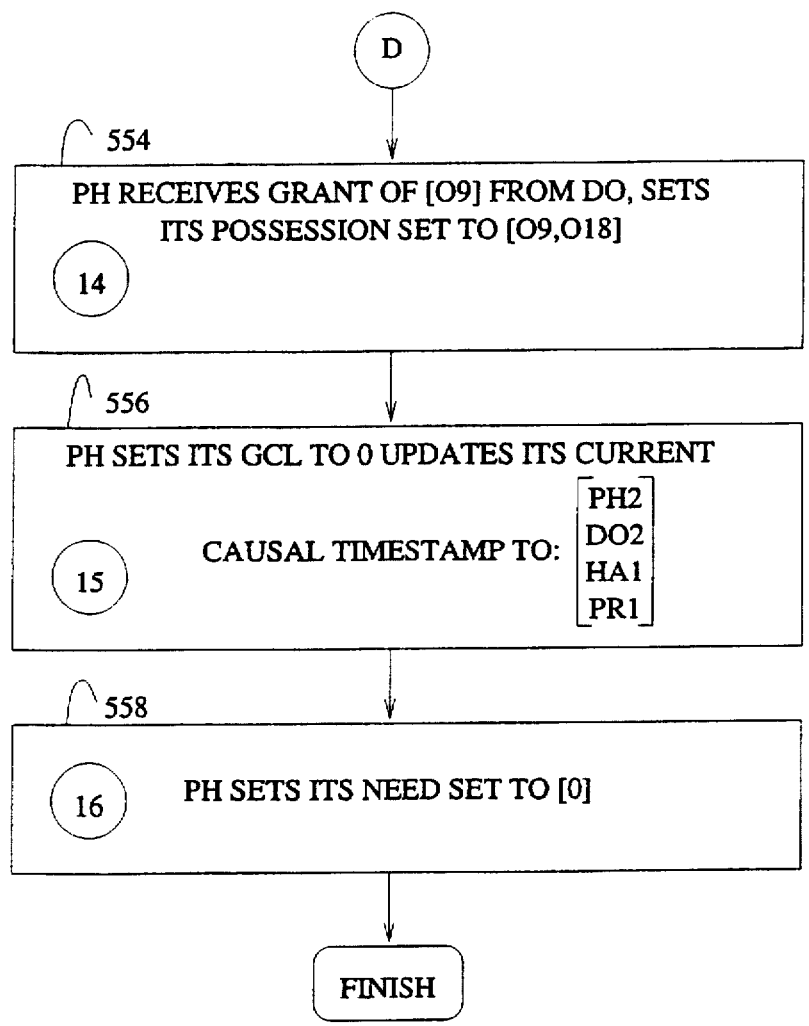

The example continues to FIG. 28 where, at time T14, step 554, the pharmacy receives the object grant of object 9 from the doctor's office. At this time, the pharmacy sets its possession set to object 9 and object 18. At time T15, Step 556, the pharmacy sets its grant causal list to 0 and updates its current causal time stamp to PH2, D02, HA1, PR1. Note that the pharmacy deletes the doctor's office request, because the current request value for the doctor's office in the object grant received from the doctor's office is greater than the current request value in the object's request. This indicates that the object request stored in the pharmacy's grant causal list is outdated. In addition, the pharmacy updated its current request value to 2, because its outstanding object request has been satisfied. Finally, at time T16, PH sets its need set to 0. This concludes the example of the doctor examining the patient and then indicating that the patient needs medication which is obtained from the pharmacy. Thus, when the doctor was examining the patient, it required certain objects or data of the patient which it requested and subsequently obtained. Likewise, when the patient was sent to the pharmacy to obtain medication, the pharmacy needed particular objects, or data information on the patient, and subsequently requested and obtained that information.

Figure 30:
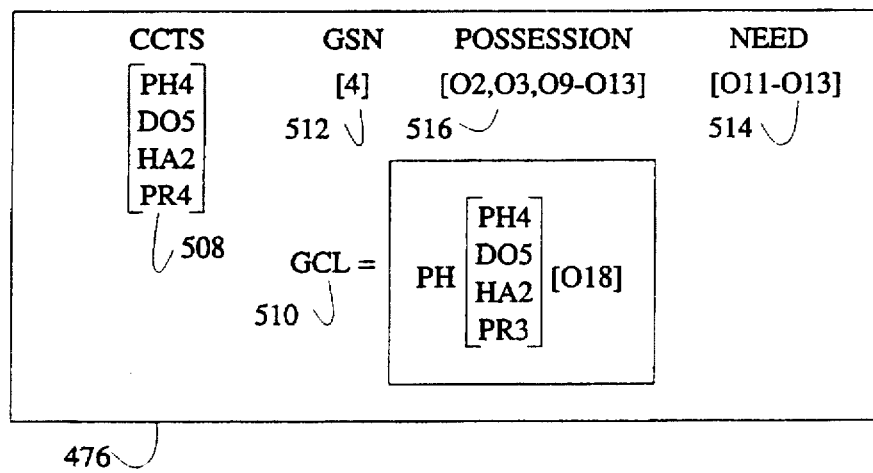

Unfortunately for this patient, the medication did not work, and surgery is required. The scheduling of surgery is illustrated in FIGS. 29–38. Referring to FIG. 29, at time Tn, the doctor's office process 470, the pharmacy process 472, the hospital administrator 474 and the patient's room process 476 include the current causal time stamps 480, 478, 488, 498, 508, group sequence number 482, 492, 502, 512, their respective need sets 484, 494, 504, 514, their respective possession sets 486, 496, 506, 516 and a grant causal list 480, 490, 500, 510 as shown in FIGS. 29 and 30. Note that the grant current causal time stamps and the grant causal list for each of the processes are not identical. This is a typical situation in a distributed processing environment which results due to latencies in transmission paths, certain processes not being involved in object grants or requests, and other such factors.

Figure 31:
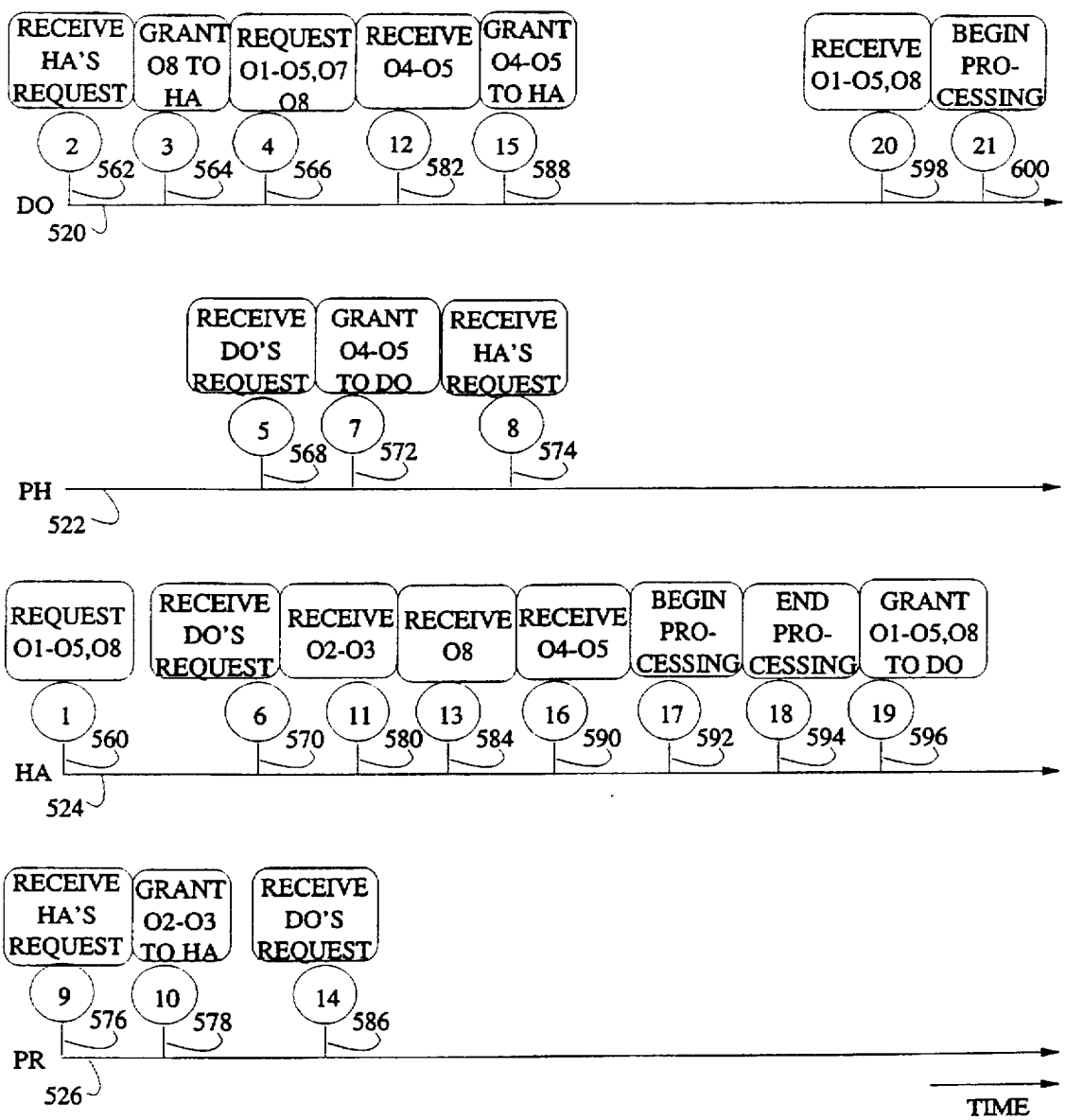
Figure 32:
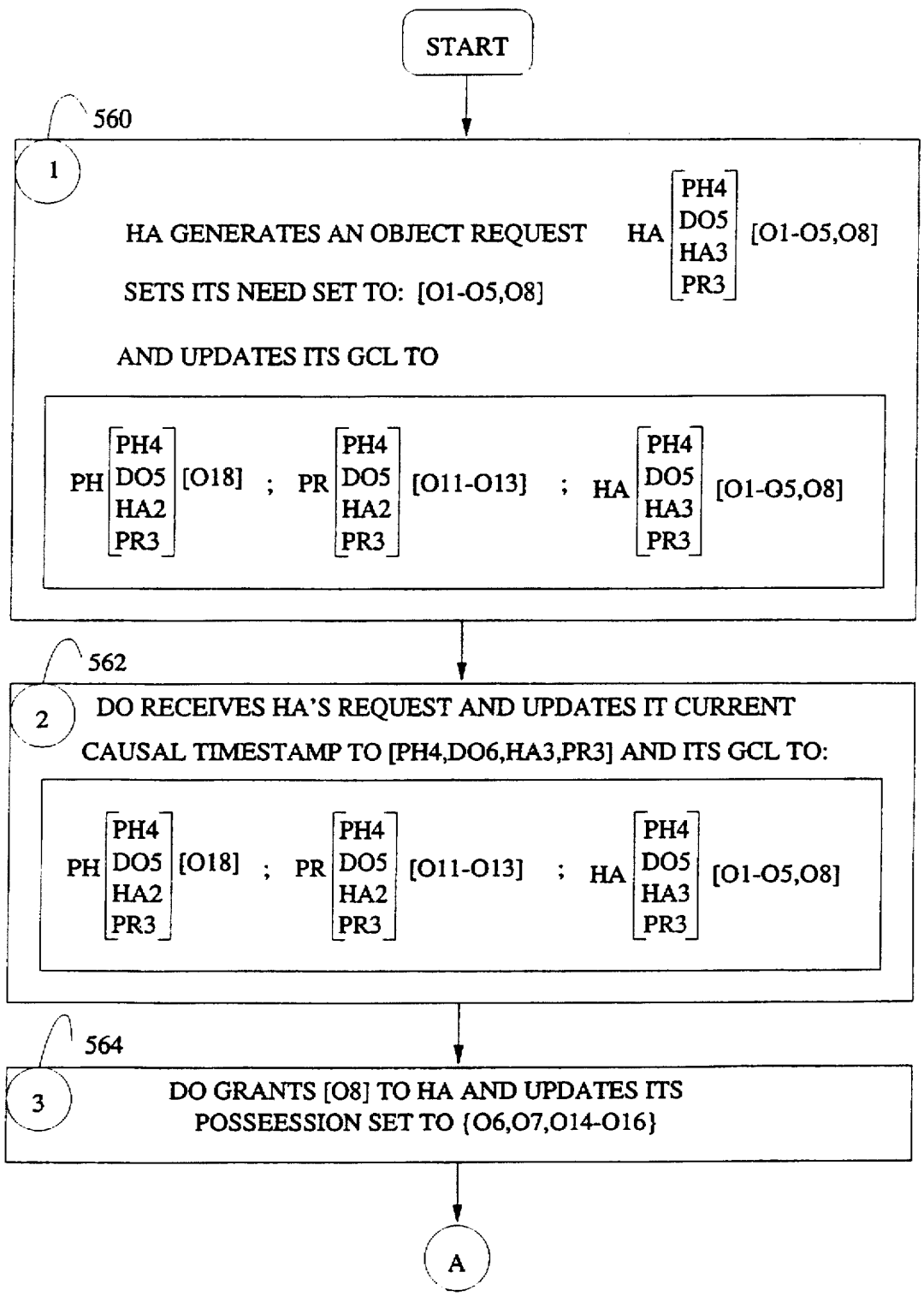

FIG. 31 illustrates a time line for sharing objects at time Tn for the particular patient requiring surgery. Each of the time lines are referenced with a particular time value, which is encircled, and a corresponding step number. Each of these functions will be described with reference to FIGS. 32–38. Referring to FIG. 32, at time TN1, step 560, the hospital administration generates an object request to schedule the patient for surgery. The object request includes the hospital administration's identity, its requesting causal time stamp, which equals its current causal time stamp at the time the object request was generated, and the needed objects. In addition, the hospital administration process sets its need set to include the needed objects {1–5 and 8}.

The hospital administration process then updates its grant causal list to include the pharmacy's object request, the patient's room object request, and the hospital administration's object request, in that order. Note that the pharmacy's object request has priority over the patient's object request and the hospital administration's request. The pharmacy has priority over the patient's room request, because even though their respective request causal time stamps are equal, PH precedes PR in the alphabet. Therefore, it has priority over the pharmacy's request. In relationship to the hospital administration's outstanding object request, the requesting causal time stamp of the pharmacy is less than the requesting causal time stamp of the hospital administration. This can be seen in that the current request value for the hospital administration in the request causal time stamp of the hospital administration is 3, while its corresponding value in the pharmacy's request causal time stamp is 2. Therefore, the pharmacy's request causal time stamp precedes the hospital's request causal time stamp. Similarly, the patient's rooms request causal time stamp precedes the hospital administration's request causal time stamp for the same reason.

At time TN2, step 562, the doctor's office receives the hospital administration's request and updates its current causal time stamp to PH4, D06, HA3, PR3. Note that the only value in the doctor's office current causal time stamp to be changed was the current request value for the hospital administration. It was changed from a 2 to a 3. In addition, the doctor's office updates its grant causal list to include the pharmacy's request followed by the patient's room request and finally the hospital administration's request. The prioritizing of the doctor's office grant causal list is identical to the prioritizing of the hospital administration's grant causal list discussed above. At time TN3, step 564, the doctor's office grants object 8 to the hospital administration and updates its possession set to include objects {6, 7 and 14–16}.

Figure 33:
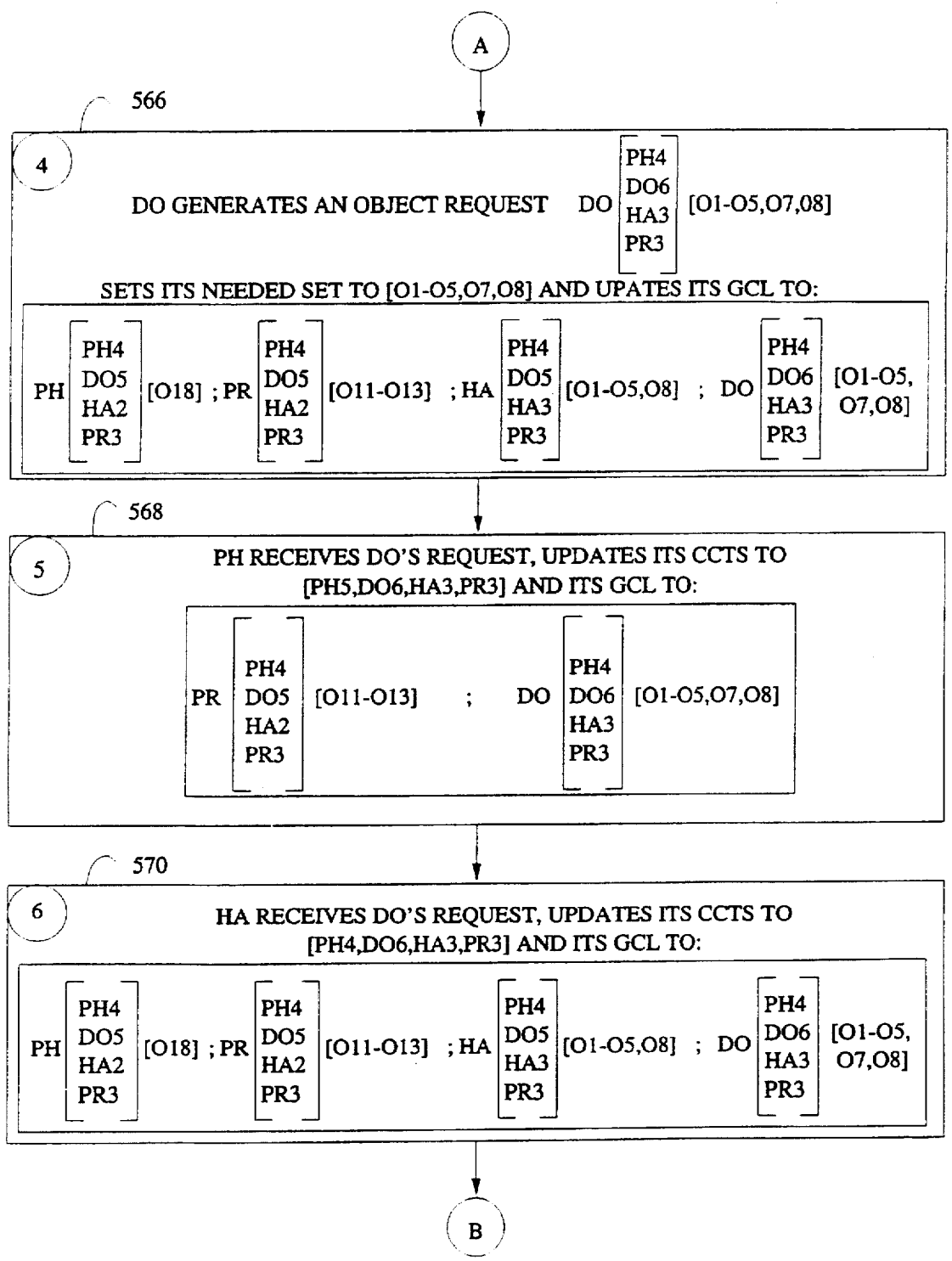
Figure 34:
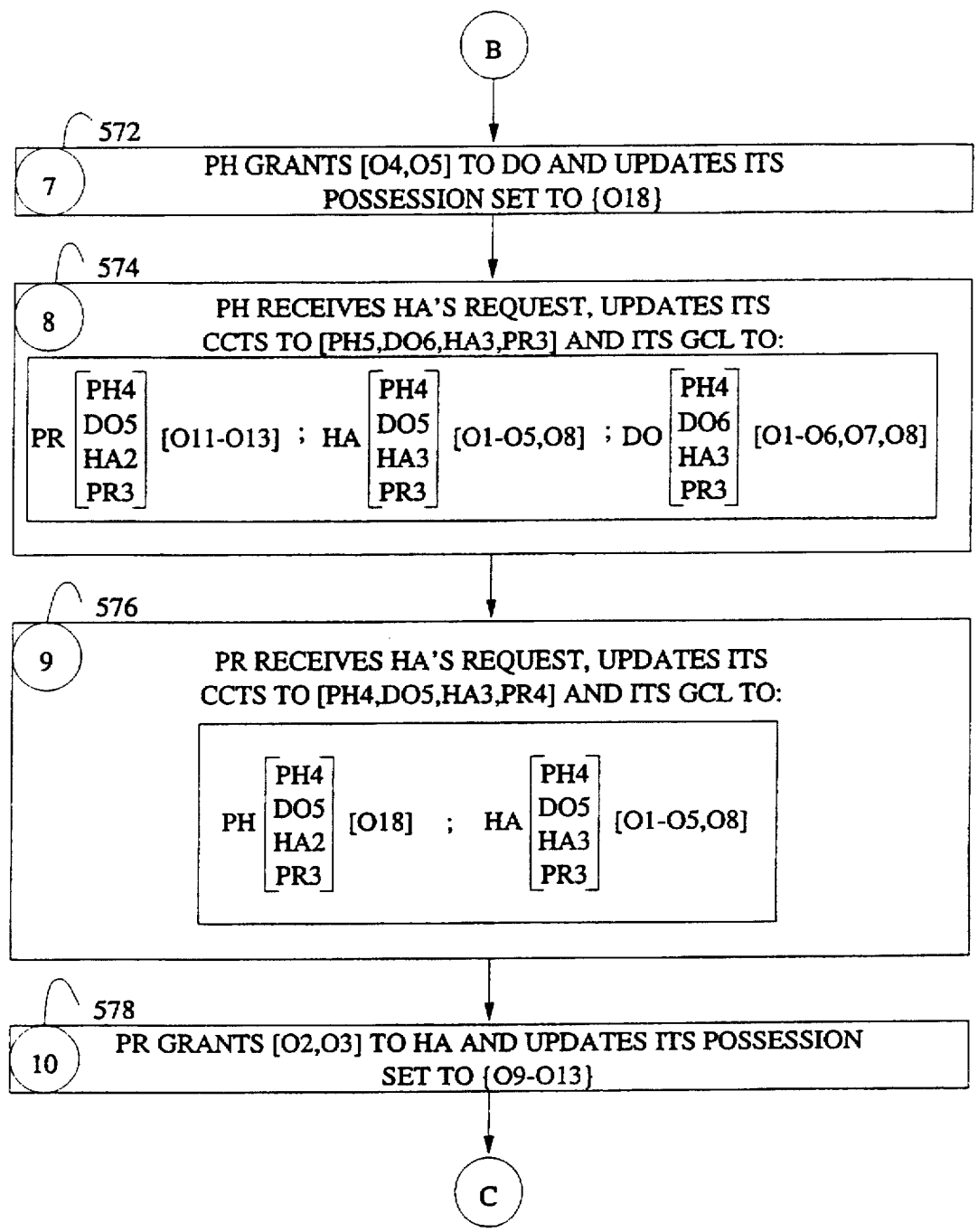
Figure 35:
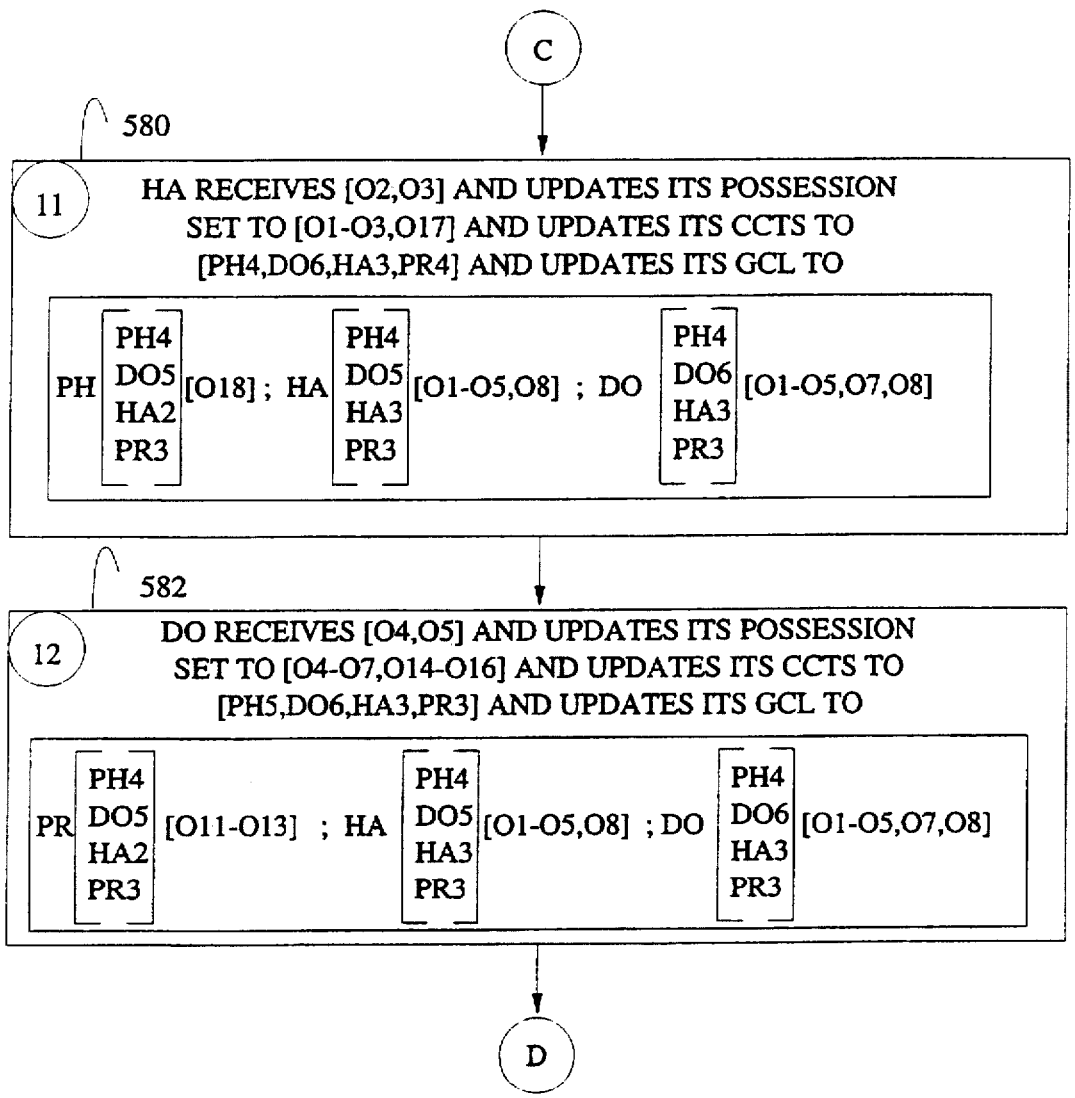
Figure 36:
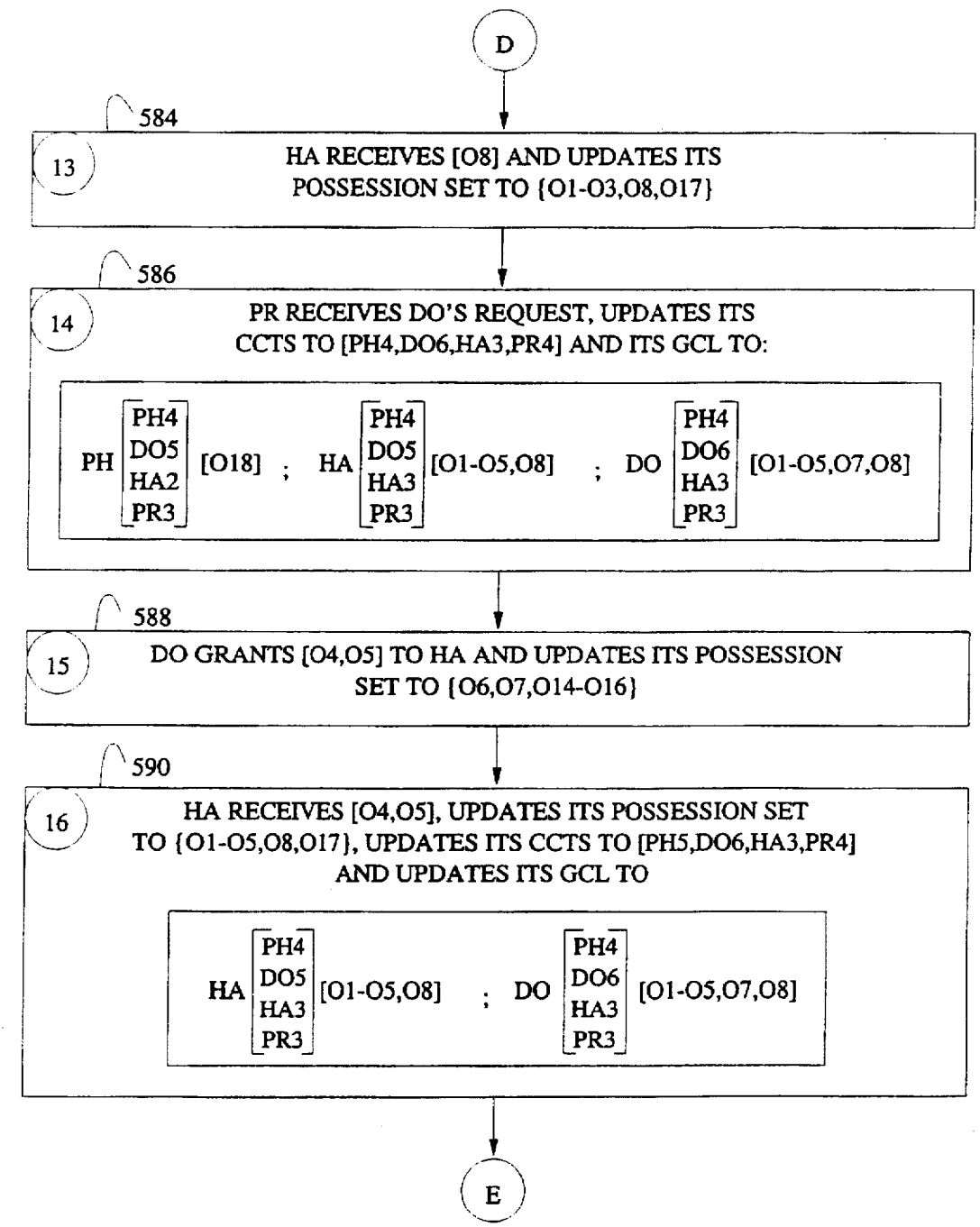

The example continues on FIG. 33 at time TN4, step 566, when the doctor's office generates an object request. The doctor's office object request includes the identity of the doctor's office, a request causal time stamp which equals the current causal time stamp known by the doctor's office, and the objects needed. In addition, the doctor's office sets its need set to include the needed objects. Finally, the doctor's office updates its grant causal list to include the prioritized object request of the pharmacy, followed by the patient's room, hospital administration, and the doctor's office. Note that the doctor's office object request is last, because its request causal time stamp is causally subsequent to any of the other request causal time stamps. In particular, the current request value for the doctor's office is 6, and the doctor's office request value is 5 in all the others, while the other current request values for the other processes in the request causal time stamp of D0 are at least equal to or greater than the corresponding values in the other request causal time stamps.

At time TN5, step 568, the pharmacy receives the doctor's office request and updates its current causal time stamp to PH5, D06, HA3, PR3. In addition, it updates its grant causal list to include the patient's room's object request followed by the doctor's office request. At time TN6, step 570, the hospital's administration receives the doctor's office request and updates its current causal time stamp to PH4, D06, HA3, PR3. In addition, it updates its grant causal list to prioritize the pharmacy's request followed by the patient's room request, hospital administration's, and the doctor's office request. The example continues on FIG. 34 at time TN7, step 572, wherein the pharmacy grants objects 4 and 5 to the doctor's office and updates its possession set to include only object 18. Note that the object grant generated by the pharmacy will include its current causal time stamp which, at this time, is PH5, D06, HA3, PR3. At time TN8, step 574, the pharmacy receives HA's request and updates its grant causal time stamp to be PH5, D06, HA3, PR3. In addition, it updates its grant causal list to include the prioritized request of the patient's room, followed by the hospital administration, and finally, the doctor's office.

At time TN9, step 576, the patient's room receives the hospital administration's request and updates its current causal time stamp to PH4, D05, HA3, PR4. In addition, it updates its grant causal list to include the pharmacy's request and the hospital administration's request. At time TN10, step 578, the patient's room grants objects 2 and 3 to the hospital administration. In addition, it updates its possession set to include objects {9–13}. Note that the object grant of objects 2 and 3 will include the current causal time stamp known by the pharmacy. The example continues on FIG. 35 at time TN11, step 580, wherein the hospital administration receives objects 2 and 3 from the patient's room and updates its possession set to include objects {1–3 and 17}. In addition, it updates its current causal time stamp to PH4, D06, HA3, PR4. Note that in the hospital administration's current causal time stamp the current request value for the patient's room has been updated from a 3 to a 4. All other current request values remain the same. Because the current request value for the patient's room has been changed, the hospital administration updates its grant causal list to remove the object request of the patient's room wherein, within the object request from the patient's room, the current request value of the patient's room was 3. Thus, with the current causal time stamp having a value of 4 for the current request value of the patient's room, it knows that any object request by the patient's room, wherein its current request value is less than 4, is obsolete.

At time TN12, step 582, the doctor's office receives objects 4 and 5 and updates its possession set to include objects {4–7 and 14–16}. In addition, the doctor's office updates its current causal time stamp to PH5, D06, HA3, PR3. Finally, the doctor's office updates its grant causal list to include the object request of the patient's room, the hospital administration, and the doctor's office. Note that, at this time, the doctor's office is still lacking object 8, and thus, it does not update its current request value for its grant causal list until object 8 has been obtained. The example continues on FIG. 36 at time TN13, step 584, wherein the hospital administration receives object 8 and updates its possession set to objects {1–3, 8, and 17}. Note that the hospital administration and the doctor's office were requesting object 8. Also note that in the grant causal list, the hospital administration's request has a higher priority than the doctor's office request. Therefore, it will receive object 8 prior to the doctor's office receiving object 8. This insures fair progress, which avoids deadlock.

At time TN14, step 586, the patient's room receives the doctor's office request and updates its grant causal list to include PH4, D06, HA3, PR4. In addition, it updates its grant causal list to include the pharmacy's request, the hospital administration's request, and the doctor's office request.

At time TN15, step 588, the doctor's office grants objects 4 and 5 to the hospital administration and updates its possession set to include only objects {6, 7 and 14–16}. Note that because the hospital administration has a higher priority in the grant causal list than the doctor's office, the doctor's office will grant the objects to the hospital administration even though these are objects needed by the doctor's office. When the hospital administration has exhausted its need for these objects, the hospital administration will subsequently grant them to the doctor's office or to another process based on its grant causal list.

At time TN16, step 590, the hospital administration receives objects 4 and 5, and updates its possession set to include objects {1–5, 8, and 17}. In addition, it updates its current causal time stamp to PH5, D06, HA3, PR4. Finally, the hospital administration updates its grant causal list to include the hospital administration's object request and the doctor's office request. Note that the hospital administration has deleted the pharmacy's object request from its grant causal list, because the current request value of the pharmacy in the current causal time stamp is greater than the current request value in the request causal time stamp of the pharmacy.

Figure 37:
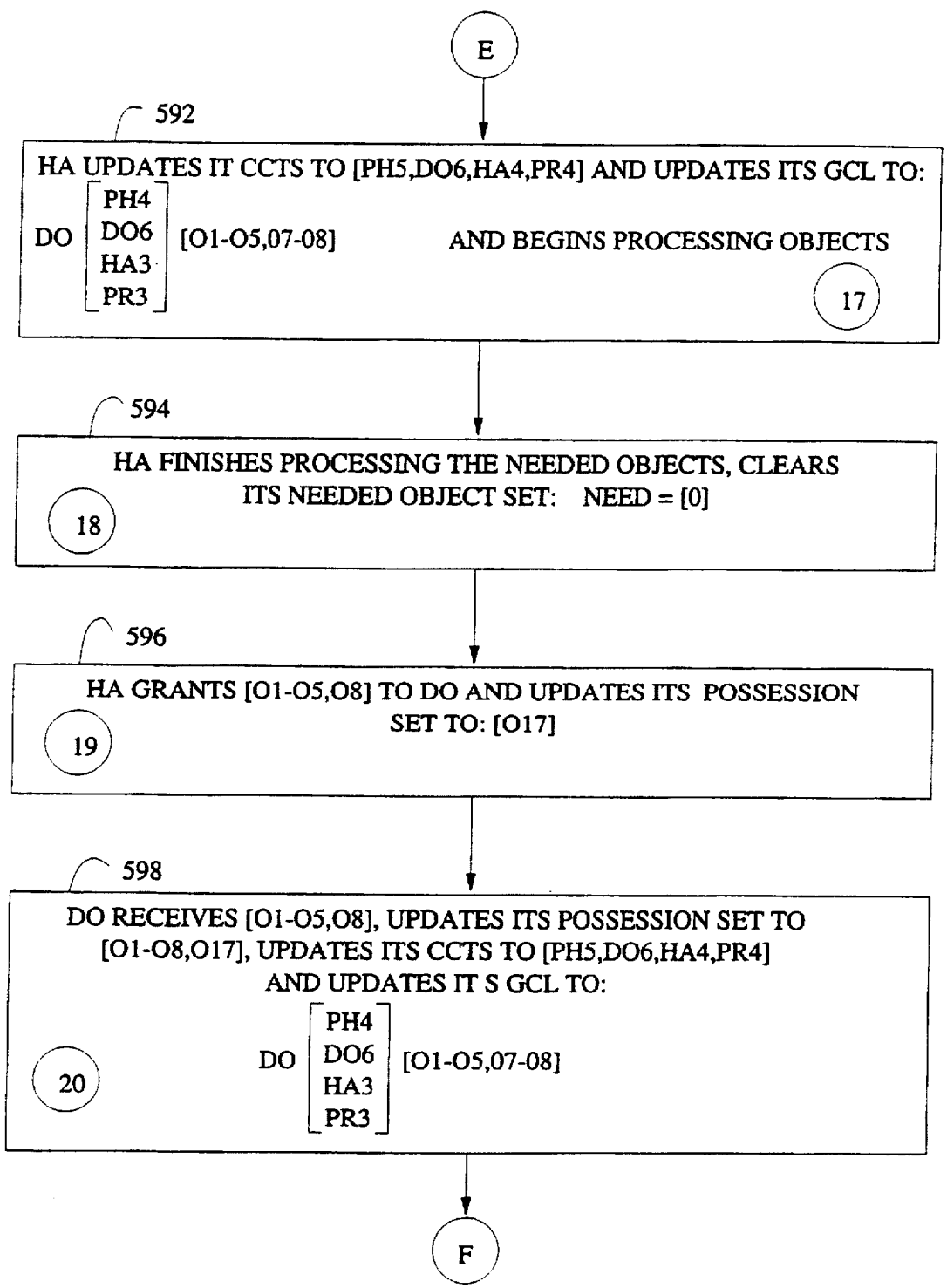
Figure 38:
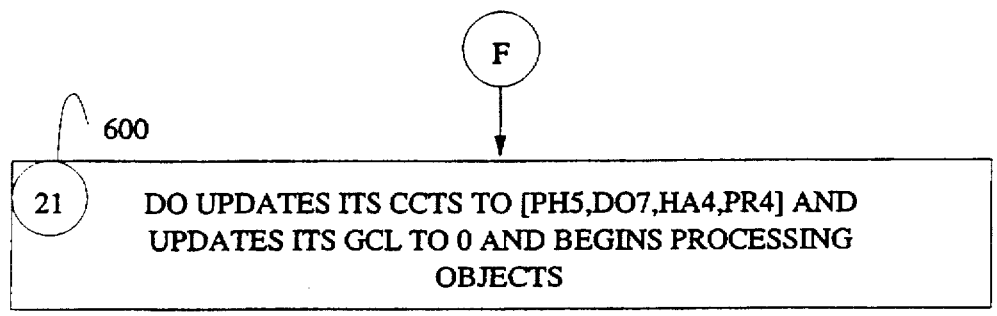

The example continues on FIG. 37 at time TN17, step 592, wherein the hospital administration updates its current causal time stamp to PH5, D06, HA4, PR4. Note that the current request value for the hospital administration has been incremented from a 3 to a 4 indicating that the outstanding object request of the hospital administration has been fulfilled. In addition, the hospital administration updates its grant causal list to include only the request from the doctor's office. Once this occurs, the hospital administration process transmits the objects to the client portion of the hospital administration processing unit such that the client portion can utilize the requested objects.

At time TN18, step 594, the hospital administration has finished processing the needed objects and clears its needed object set to 0. Next, at time TN19, step 596, the hospital administration grants objects 1–5 and 8 to the doctor's office and updates its possession set to include object {17}. At time TN20, step 598, the doctor's office receives objects 1–5 and 8 and updates its possession set to include objects {1–8 and 17}. In addition, it updates its current causal time stamp to reflect the change in the hospital administration's current request value. Finally, the doctor's office updates its current causal list to include only its request. Note that the doctor's office current causal list has deleted the hospital administration's request, the pharmacy's request and the patient's request. The example continues on FIG. 38 wherein at time TN21, step 600, the doctor's office updates its current causal time stamp to PH5, D07, HA4, PR4 and updates its grant causal list to 0. The current request value for the doctor's office has been incremented from a 6 to a 7 reflecting that the doctor's office request has been satisfied. Once this occurs, the doctor's office process transfers the needed objects to the client portion of the doctor's office processing unit for execution thereon.

Figure 40:
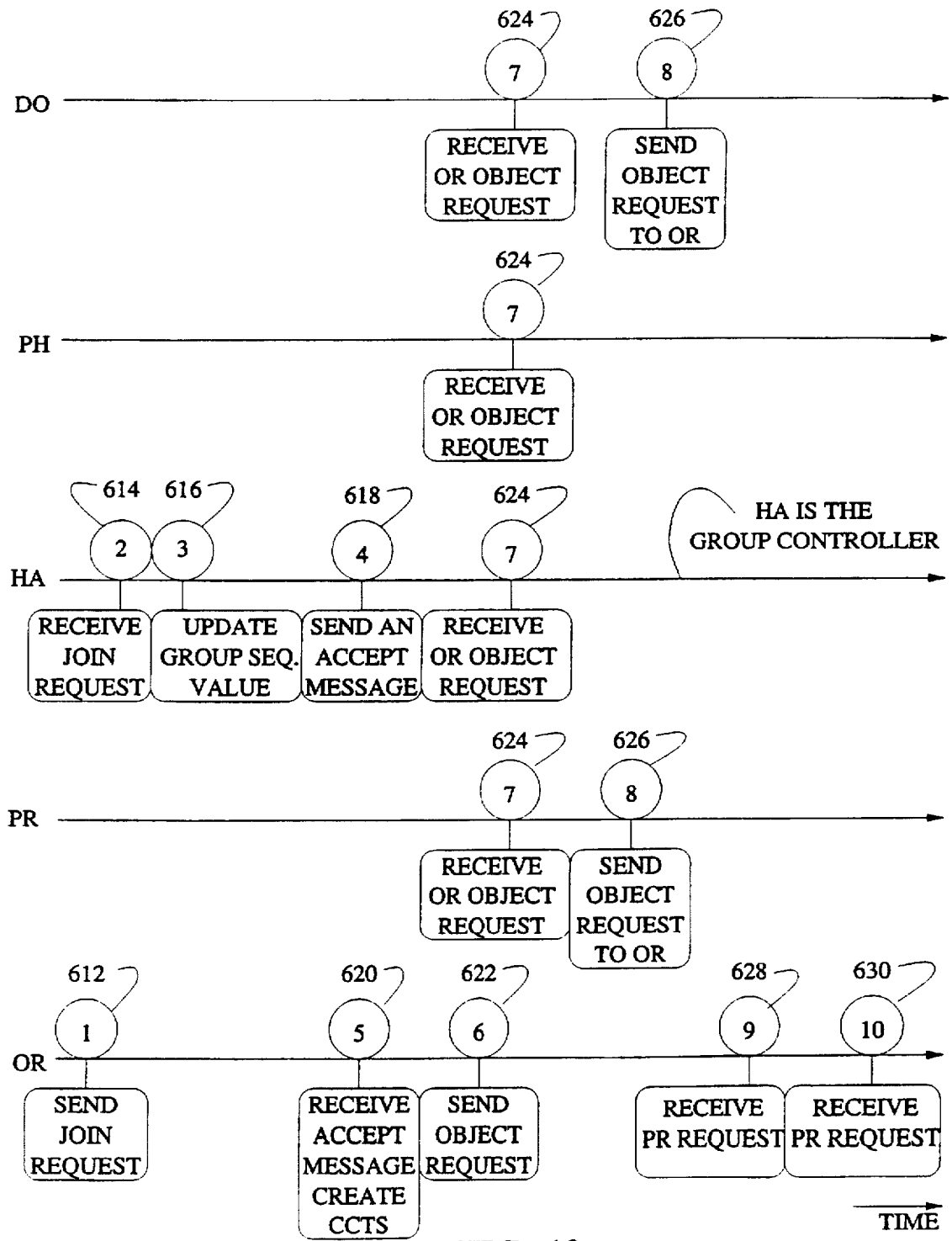

The next phase of the example is the actual patient surgery in which the operating room is to be added to the group of processes. This is illustrated in FIGS. 39–43. As shown in FIG. 39, the doctor's office 470, the pharmacy 472, the hospital administration 474, and the pharmacy 476 are each in different operating states. The doctor's office and the pharmacy are in the acquiring states while the pharmacy and the hospital administration are in the holding states. The respective information for each of the processes is also shown in FIG. 39. FIG. 40 illustrates a time line of activity signifying the addition of the operating room to the group of processes. Each time sequence is indicated by an encircled number and a corresponding step.

Figure 41:
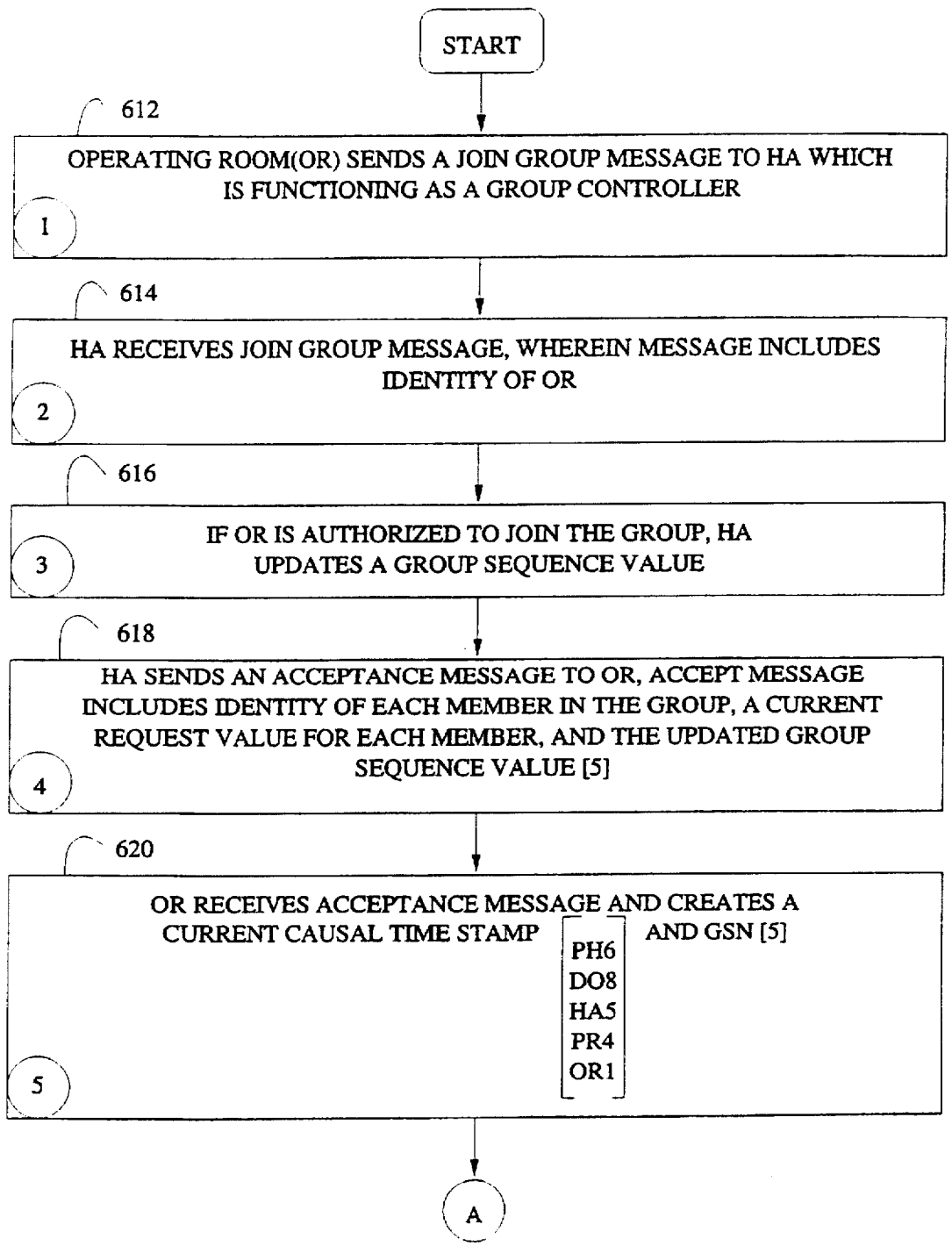

FIG. 41 illustrates the functions that occur for the particular time lines shown in FIG. 40. At time TX1, step 612, the operating room sends a join group message to the hospital administration. The hospital administration for this particular example is functioning as the group controller. At time TX2, step 614, the hospital administration receives the join message wherein the joined group message includes the identity of the operating room. At time TX3, step 616, the hospital administration determines whether the operating room is authorized to join the group and, if so, updates a group sequence value. In this case, the group sequence value is updated from a 4 to a 5. Refer to FIGS. 39, Items 484, 492, 505 and 512 for the existing group sequence value.

At time TX4, step 618, the hospital administration sends an acceptance message to the operating room. The acceptance message includes the identity of each member in the group, the doctor's office, the pharmacy, the hospital administration, and the patient's room, a current request value for each of the members as known by the hospital administration from its current causal time stamp, and the upgraded group sequence value 5. At time TX5, step 620, the operating room receives the acceptance message and creates a current causal time stamp. The current causal time stamp includes PH6, D08, HA5, PR4, OR1. In addition, the operating room sets its group sequence number to 5.

Figure 42:
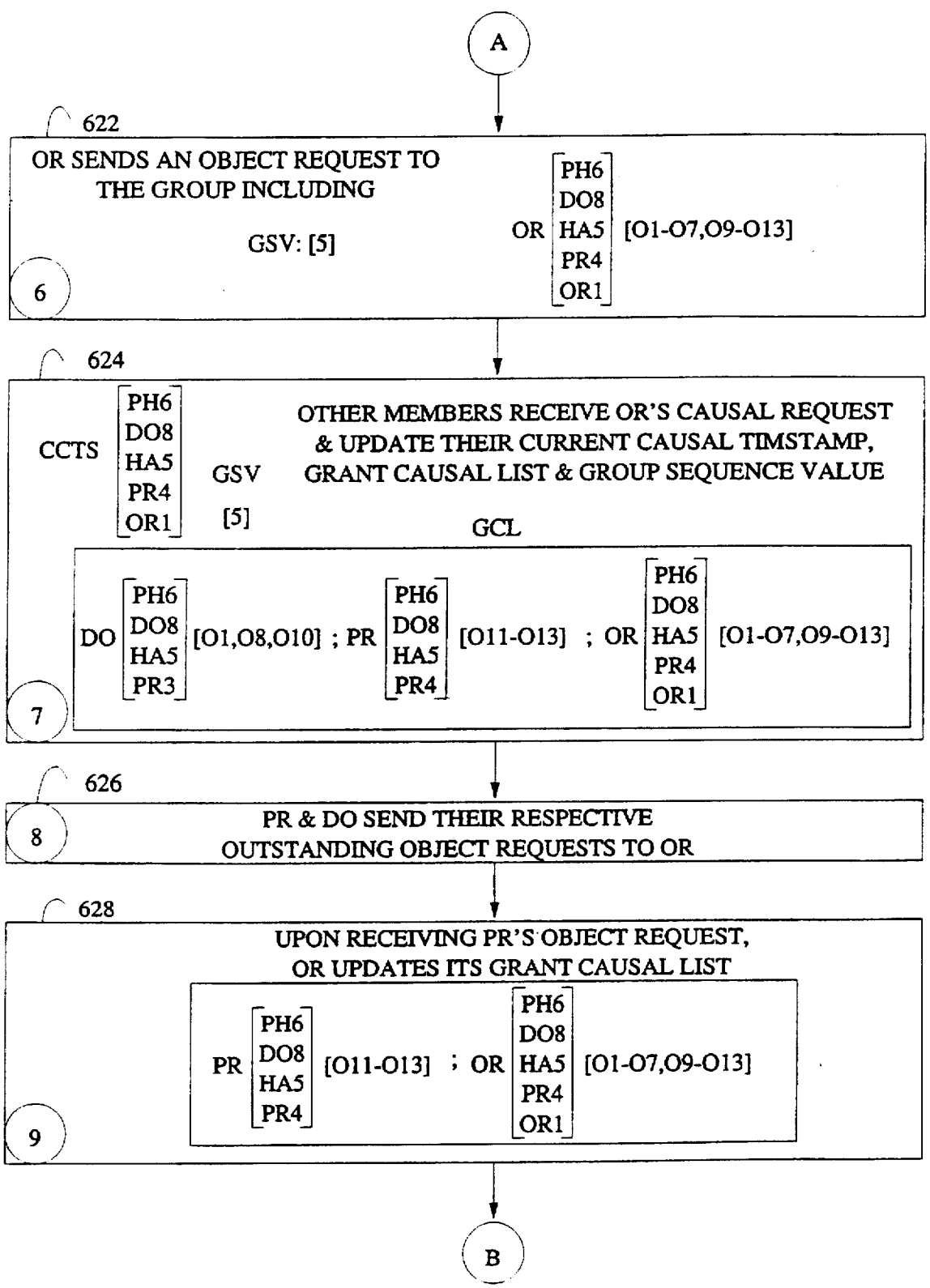

The example continues on FIG. 42 at time TX6, step 622, wherein the operating room sends an object request to the group wherein the object request includes the group sequence value 5, the identity of the operating room, its request causal time stamp, and the needed objects. At time TX7, step 624, the other members receive the operating room's object request and update their current causal time stamps, their grant causal list, and the group sequence number. As shown, the current causal time stamps are PH6, D08, HA5, PR4, OR1. Each will also increment their group sequence value to 5 and update their grant causal list to include the operating room's object request.

At time TX8, step 626, the pharmacy and doctor's office send their respective outstanding object requests to the operating room. At time TX9, step 628, the operating room updates its grant causal list to include the object request from the patient's room.

Figure 43:
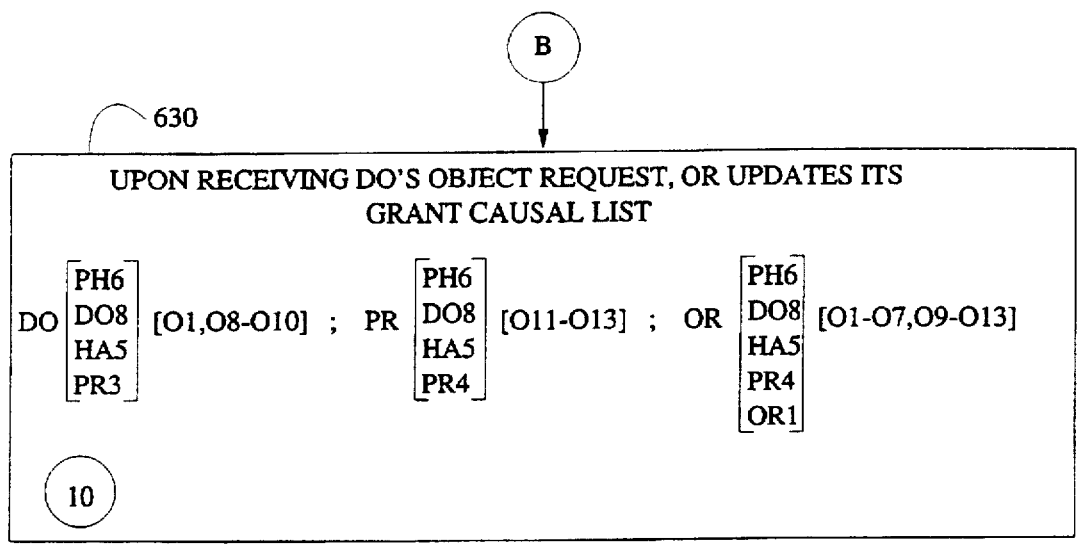

The example continues on FIG. 43, wherein at time TX10, step 630, the operating room receives the doctor's office object request and updates its grant causal list to include the doctor's office request, the patient's room request, and the operating room's request. Once this has been completed, the operating room has been completely added to the group of processes.

At some time later, the patient's surgery has been completed, and the operating room is being removed from the group of processes. At this time, FIG. 44 illustrates that each member has the same current causal time stamp and grant causal list, which are the current causal time stamp 632 of PH6, D09, HA5, PR5, OR2, and the grant causal list 634 of only a request from the pharmacy. The possession sets for each of the existing members is shown as 636 while the need sets are shown as 638. Note that the only process having an outstanding need is the pharmacy, which needs object 18.

Figure 45:
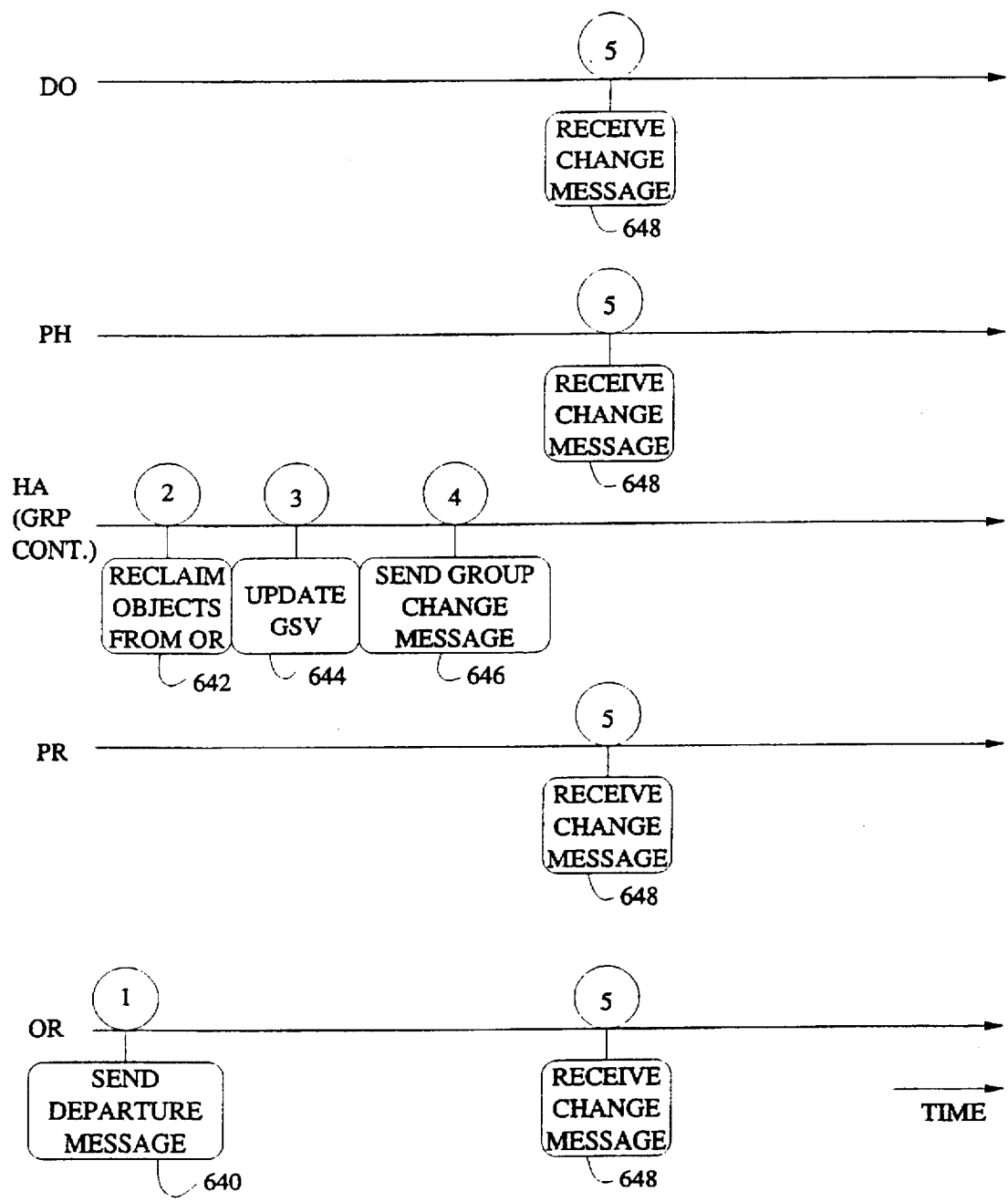
Figure 46:
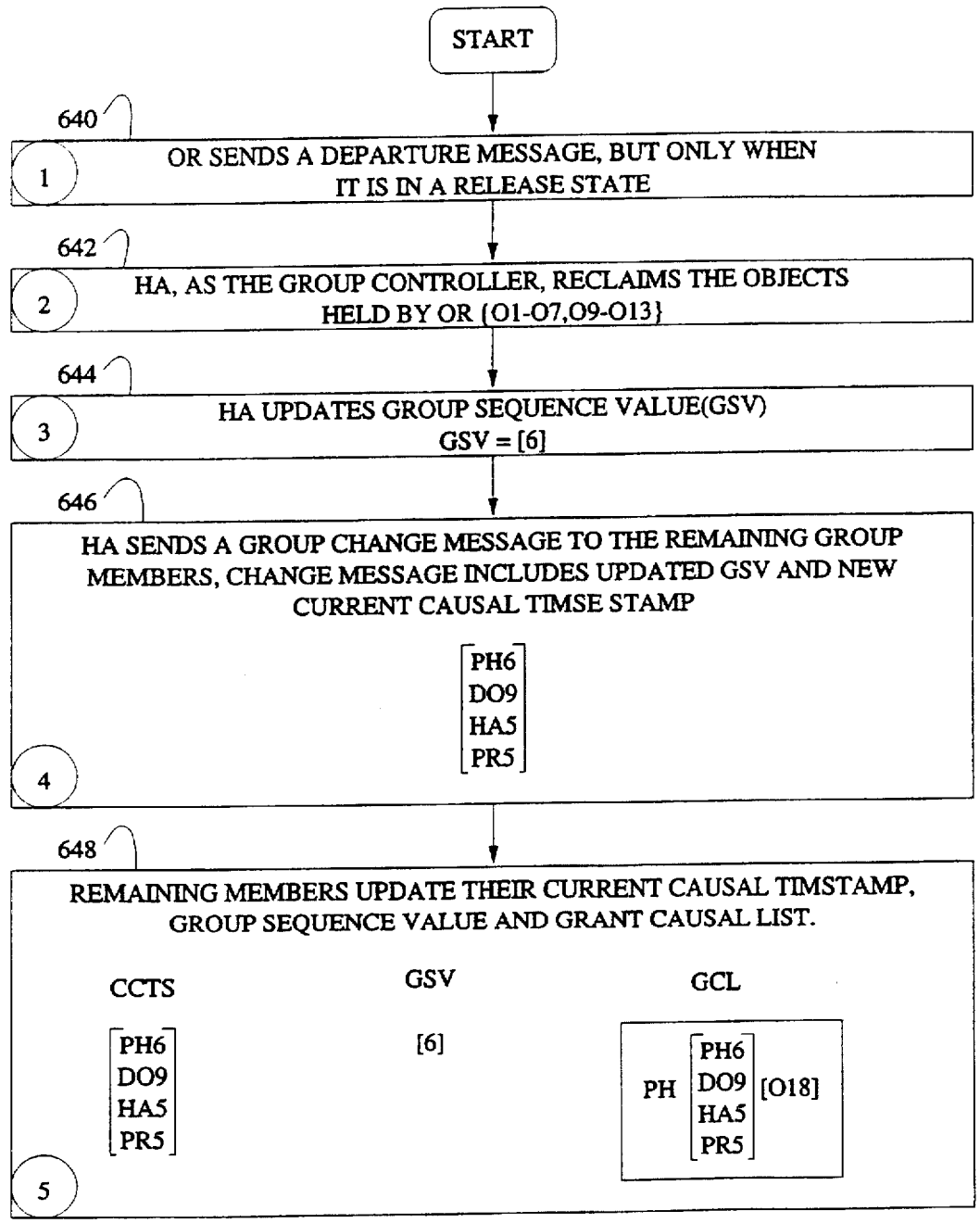

FIG. 45 illustrates a time line for the operating room to depart the group of processes. Each of the encircled numbers corresponds to a particular step which will be described with reference to FIG. 46. At time T1, step 640, the operating room sends a departure message but only when it is in the releasing state. Thus, if the operating room is in the acquiring state, or holding state, it cannot depart the group of processes.

At time T2, step 642, the hospital administration process, as the group controller, reclaims the objects held by the operating room. These objects are objects 1–7 and objects 9–13. At time T3, step 644, the hospital administration updates the group sequence value. The previous group sequence value was 5; now it is updated to 6. At time T4, step 646, the hospital administration sends a group change message to the remaining group members. The group change message includes the updated group sequence value and a new current causal time stamp. The current causal time stamp includes PH6, D09, HA5, PR5 which does not include the departing member of the group. Finally, at time T5, Step 648, the remaining members of the group update their current causal time stamp, group sequence value, and grant causal list. Each of these are shown to be PH6, D09, HAS, PR5 for the current causal time stamps, the group sequence value is 6, while the grant causal list includes the outstanding request for the pharmacy. Once this occurs, the members are aware that there are only four members left in the group, and the operation continues as described above.

The present invention provides a method and apparatus for sharing objects within a distributed computing system. The present method and apparatus insures that deadlock will be avoided in the distributed computing system. In addition, the present invention insures that fair progress is made such that each outstanding object request will eventually be fulfilled and further insures that object inconsistencies are avoided.

What is claimed is:

1. In a multiprocessing environment that performs a plurality of processes, wherein the plurality of processes are supported by at least one processing unit, a method for sharing objects among the plurality of processes, the method comprising the steps of:

a) sending, by a process of the plurality of processes, an object request that includes identity of at least some objects of a set of needed objects and a request causal time stamp that indicates, as known by the process, current request value for each process of the plurality of processes;

b) entering, by the process, the request causal time stamp and the identity of the at least some objects of the object request into a grant causal list;

c) updating, by the process, the grant causal list based on a causal connection order of request causal time stamps and a predetermined order;

d) from time to time, receiving another object request from another process of the plurality of processes;

e) when the another object request is received, updating, by the process, the grant causal list to include the another object request based on the causal connection order and the predetermined order;

f) from time to time, receiving, by the process, an object grant, wherein the object grant includes an object and a grant causal time stamp from a granting process that sent the object grant;

g) determining whether the process currently possesses a needed object identified by one of the object requests in the grant causal list and the one of the object requests is of a higher order for the needed object than the object request of the process;

h) when the one of the object requests is of the higher order for the needed object, granting the needed object to a needing process affiliated with the one of the object requests.

2. The method of claim 1, wherein the causal connection order is determined by:

comparing request causal time stamps for each entry in the grant causal list; and when a request causal time stamp for a first process is causally precedent to a request causal time stamp for a second process, establishing a causal connection between the first and second processes, wherein a first process' object request has a higher order than a second process' object request.

3. The method of claim 1, wherein step (d) further comprises:

comparing a request causal time stamp of the another process with a current time stamp of the process; and when any current request value in the current time stamp is less than a corresponding current request value in the request causal time stamp of the another process, updating the current causal time stamp.

4. The method of claim 3, wherein step (a) further comprises:

when the object request is generated, setting the request causal time stamp equal to the current time stamp.

5. The method of claim 3, wherein step (h) further comprises:

generating an object grant message to include identity of the needed object and a grant causal time stamp, wherein the grant causal time stamp is equal to the current time stamp of the process.

6. The method of claim 1, wherein step (f) further comprises:

comparing a current time stamp of the process with the grant causal time stamp; and when any current request value in the current time stamp is less than corresponding current request values in the grant causal time stamp of the granting process, updating the current time stamp.

7. The method of claim 1, wherein step (f) further comprises:

updating an object possession set to include the needed object.

8. The method of claim 1 further comprises the step of:

determining whether the needed object gives the process all objects of the set of needed objects based on the object possession set.

9. The method of claim 8, further comprises:

when the needed object gives the process all objects of the set of needed objects, providing the set of needed objects for utilization; and when the set of needed objects are no longer needed, releasing the set of needed objects for subsequent grants.

10. The method of claim 8 further comprises, when the needed object gives the process all objects of the set of needed objects, updating the current request status of the process within the process' current time stamp.

11. The method of claim 1 further comprises:

invalidating a first object request of a particular process when a second object request of the particular process is received and the current request value of the second object request is more current than the current request value of the first object request, or when a grant causal time stamp or request causal time stamp is received and includes a current request value for the particular process that is more current than the current request value of the first object request.

12. The method of claim 1 further comprises:

when all objects of the set of needed objects are in possession, determining whether one of the objects of the set of needed objects is a read only object;

when the read only object is received, copying the read only object; and after copying the read only object, removing the read only object from the set of needed objects.

13. A method for granting an object in a multiprocessing environment that includes a plurality of processes, wherein the plurality of processes are supported by at least one processing unit, the method comprising the steps of:

a) from time to time, receiving, by a process of the plurality of processes, an object request from another process of the plurality of processes;

b) upon receiving the object request updating, by the process, a grant causal list to include the object request based on a causal connection order and a predetermined order when the grant causal list includes at least one other object request;

c) determining whether the process currently possesses a needed object identified by one of the object requests in the grant causal list and the one of the object requests is of a higher order for the needed object; and d) when the one of the object requests is of the higher order for the needed object, granting the needed object to a needing process affiliated with the one of the object requests.

14. The method of claim 13, wherein the causal connection order is determined by:
comparing request causal time stamps for each entry in the grant causal list; and
when a request causal time stamp for a first process is causally precedent to a request causal time stamp for a second process, establishing a causal connection between the first and second processes, wherein a first process' object request has a higher order than a second process' object request.

15. The method of claim 13, wherein the step (b) further comprises:
prior to updating, determining whether an object requested in the object request is a surplus object; and
when the object is a surplus object, granting the object to the another process.

16. An object allocation processor comprising:
memory for storing an object allocation algorithm, for storing identity of currently possessed objects, and for storing identity of needed objects; and
a processor operably coupled to the memory to execute the object allocation algorithm, wherein the memory further includes, for storing the object allocation algorithm,
sending means for storing program instructions that cause the processor to generate an object request that includes identity of at least some objects of a set of needed objects and a request causal time stamp that indicates, as known by the process, current request value for each process of the plurality of processes;
entering means for storing program instructions that cause the process to enter the request causal time stamp and the identity of the at least some objects of the object request into a grant causal list;
request receiving means for storing program instructions that cause the processor to, from time to time, receive another object request;
updating means for storing program instructions that cause the processor to update the grant causal list based on a causal connection order of request causal time stamps and a predetermined order;
grant receiving means for storing program instructions that cause the processor to, from time to time, receive object grant, wherein the object grant includes an object and a grant causal time stamp from a granting process that sent the object grant;
determining means for storing program instructions that cause the process to determine whether a needed object identified by one of the object requests in the grant causal list is currently possessed and the one of the object requests is of a higher order for the needed object than the object request of the process; and
granting means for storing program instructions that cause the processor to grant the needed object to the one of the object requests of the higher order for the needed object.

17. The object allocation processor of claim 16, wherein the updating means further stores program instructions to determine the causal connection order including:
comparing request causal time stamps for each entry in the grant causal list; and
when a request causal time stamp for a first process is less than a request causal time stamp for a second process, establishing a causal connection between the first and second processes, wherein a first process' object request has a higher order than a second process' object request.

18. A processing entity comprising:
a processing unit;
memory operably coupled to the processing unit, wherein the memory stores operating instructions and data for the processing unit;
an object allocation section operably coupled to the processing unit, wherein, when instructed by the processing unit, the object allocation section retrieves a set of needed objects, the object allocation section includes:
sending means for storing program instructions that cause the processor to generate an object request that includes identity of at least some objects of a set of needed objects and a request causal time stamp that indicates, as known by the process, current request value for each process of the plurality of processes;
entering means for storing program instructions that cause the process to enter the request causal time stamp and the identity of the at least some objects of the object request into a grant causal list;
request receiving means for storing program instructions that cause the processor to, from time to time, receive another object request;
updating means for storing program instructions that cause the processor to update the grant causal list based on a causal connection order of request causal time stamps and a predetermined order when more than one object request is present in the grant causal list;
grant receiving means for storing program instructions that cause the processor to, from time to time, receive object grant, wherein the object grant includes an object and a grant causal time stamp from a granting process that sent the object grant;
determining means for storing program instructions that cause the process to determine whether a needed object identified by one of the object requests in the grant causal list is currently possessed and the one of the object requests is of a higher order for the needed object; and
granting means for storing program instructions that cause the processor to grant the needed object to the one of the object requests of the higher order for the needed object.

19. The processing entity of claim 18, wherein the updating means further stores program instructions to determine the causal connection order including:
comparing request causal time stamps for each entry in the grant causal list; and
when a request causal time stamp for a first process is less than a request causal time stamp for a second process, establishing a causal connection between the first and second processes, wherein a first process' object request has a higher order than a second process' object request.

20. A processor readable medium for storing an object allocation algorithm that causes a processor, when reading the object allocation algorithm, to function in a predetermined manner, the processor readable medium comprising:
sending means for storing program instructions that cause the processor to generate an object request that includes identity of at least some objects of a set of needed objects and a request causal time stamp that indicates, as known by the process, current request value for each process of the plurality of processes;

entering means for storing program instructions that cause the process to enter the request causal time stamp and the identity of the at least some objects of the object request into a grant causal list;

request receiving means for storing program instructions that cause the processor to, from time to time, receive another object request;

updating means for storing program instructions that cause the processor to update the grant causal list based on a causal connection order of request causal time stamps and a predetermined order;

grant receiving means for storing program instructions that cause the processor to, from time to time, receive object grant, wherein the object grant includes an object and a grant causal time stamp from a granting process that sent the object grant;

determining means for storing program instructions that cause the process to determine whether a needed object identified by one of the object requests in the grant causal list is currently possessed and the one of the object requests is of a higher order for the needed object; and granting means for storing program instructions that cause the processor to grant the needed object to the one of the object requests of the higher order for the needed object.

21. The processor readable medium of claim 20, wherein the updating means further stores program instructions to determine the causal connection order including:

comparing request causal time stamps for each entry in the grant causal list; and when a request causal time stamp for a first process is causally precedent to a request causal time stamp for a second process, establishing a causal connection between the first and second processes, wherein a first process' object request has a higher order than a second process' object request.

* * * * *